United States Patent
Formico et al.

(10) Patent No.: US 9,591,843 B2
(45) Date of Patent: Mar. 14, 2017

(54) ILLUMINATION SYSTEM AND METHOD

(71) Applicant: Broan-NuTone LLC, Hartford, WI (US)

(72) Inventors: Karen Formico, Mequon, WI (US); Jeffery Emmerich, Delavan, WI (US)

(73) Assignee: Broan-NuTone LLC, Hartford, WI (US)

( * ) Notice: Subject to any disclaimer, the term of this patent is extended or adjusted under 35 U.S.C. 154(b) by 0 days.

(21) Appl. No.: 14/467,491

(22) Filed: Aug. 25, 2014

(65) Prior Publication Data

US 2014/0362560 A1 Dec. 11, 2014

Related U.S. Application Data

(63) Continuation-in-part of application No. 13/292,759, filed on Nov. 9, 2011, now Pat. No. 8,845,118.

(51) Int. Cl.
*A01M 1/04* (2006.01)
*A01M 29/12* (2011.01)
(Continued)

(52) U.S. Cl.
CPC .............. *A01M 29/12* (2013.01); *A01M 1/04* (2013.01); *A01M 1/2044* (2013.01);
(Continued)

(58) Field of Classification Search
CPC ........ A01M 29/12; A01M 29/10; A01M 1/04; A01M 1/2044; A01M 2200/012;
(Continued)

(56) References Cited

U.S. PATENT DOCUMENTS

| | | | |
|---|---|---|---|
| 4,479,667 A | 10/1984 | Major | |
| 5,647,164 A | 7/1997 | Yates et al. | |

(Continued)

FOREIGN PATENT DOCUMENTS

| | | |
|---|---|---|
| JP | 2002159880 A | 6/2002 |
| KR | 1020080074402 A | 8/2008 |
| WO | WO-2013070618 A1 | 5/2013 |

OTHER PUBLICATIONS

"U.S. Appl. No. 13/292,759, Final Office Action mailed Mar. 6, 2014", 9 pgs.

(Continued)

*Primary Examiner* — Peggy Neils
(74) *Attorney, Agent, or Firm* — Schwegman Lundberg & Woessner, P.A.

(57) ABSTRACT

Some embodiments provide an illumination system with an outer housing including a base, a central housing pivotably coupled to the base including a fluid inlet, and an upper housing including a fluid outlet. The inner housing defines a chamber and is coupled to the base, and includes a fluid aperture adjacent to the base, and a fluid aperture adjacent to the upper housing and a viewing aperture. The chamber houses an evaporator system not visible through the outer housing, and an illumination device. Some embodiments include a repellent system with a base including a fluid inlet pivotably coupled to a main housing enclosing an inner region, and including an upper portion with at least one fluid outlet. In some embodiments, an evaporator system within the inner region is not visible through the main housing. Some embodiments include an evaporator assembly that includes a lockable evaporator support to render the system non-refillable.

27 Claims, 39 Drawing Sheets

(51) Int. Cl.
| | |
|---|---|
| *F21V 33/00* | (2006.01) |
| *F21K 2/00* | (2006.01) |
| *F21K 99/00* | (2016.01) |
| *B05B 17/00* | (2006.01) |
| *A01M 1/20* | (2006.01) |
| *F21V 15/01* | (2006.01) |
| *A01M 29/10* | (2011.01) |
| *F21W 131/109* | (2006.01) |
| *F21S 9/02* | (2006.01) |
| *F21S 9/03* | (2006.01) |
| *F21W 131/10* | (2006.01) |
| *F21Y 101/02* | (2006.01) |
| *F21Y 103/00* | (2016.01) |
| *F21S 8/08* | (2006.01) |
| *F21V 21/08* | (2006.01) |
| *F21Y 101/00* | (2016.01) |

(52) U.S. Cl.
CPC .......... *A01M 1/2077* (2013.01); *A01M 29/10* (2013.01); *B05B 17/00* (2013.01); *F21K 2/00* (2013.01); *F21K 9/00* (2013.01); *F21V 15/01* (2013.01); *F21V 33/006* (2013.01); *A01M 2200/012* (2013.01); *F21S 8/08* (2013.01); *F21S 9/02* (2013.01); *F21S 9/03* (2013.01); *F21V 21/0824* (2013.01); *F21W 2131/10* (2013.01); *F21W 2131/109* (2013.01); *F21Y 2101/00* (2013.01); *F21Y 2101/02* (2013.01); *F21Y 2103/00* (2013.01)

(58) Field of Classification Search
CPC ... F21V 15/01; F21K 9/00; F21S 8/08; F21W 2131/10; F21W 2131/109; F21Y 2103/00; F21Y 2101/02
See application file for complete search history.

(56) References Cited

U.S. PATENT DOCUMENTS

| | | | |
|---|---|---|---|
| 5,799,436 A | 9/1998 | Nolen et al. | |
| 5,857,769 A | 1/1999 | Beggs | |
| 6,033,212 A | 3/2000 | Bonnema et al. | |
| 6,095,574 A | 8/2000 | Dean | |
| 6,854,208 B1 | 2/2005 | Chuang et al. | |
| 6,968,124 B1 | 11/2005 | Varanasi et al. | |
| 7,455,245 B2 | 11/2008 | Sipinski et al. | |
| 7,503,668 B2 | 3/2009 | Porchia et al. | |
| 8,371,740 B2 | 2/2013 | Pestl et al. | |
| 8,382,332 B2 | 2/2013 | Zakula et al. | |
| 8,485,696 B2 | 7/2013 | Pringle et al. | |
| 8,845,118 B2 | 9/2014 | Formico et al. | |
| 2002/0078529 A1 | 6/2002 | Schwarz | |
| 2005/0224508 A1 | 10/2005 | Tajiri et al. | |
| 2006/0123694 A1 | 6/2006 | Welch | |
| 2006/0237554 A1 | 10/2006 | Colarusso | |
| 2007/0236912 A1 | 10/2007 | Porchia et al. | |
| 2008/0066372 A1 | 3/2008 | Fleming | |
| 2011/0139890 A1 | 6/2011 | Soldan et al. | |
| 2013/0114244 A1 | 5/2013 | Formico et al. | |
| 2014/0063782 A1* | 3/2014 | Shapiro ................. | A01M 29/12 362/96 |
| 2015/0144712 A1 | 5/2015 | Formico et al. | |
| 2015/0144713 A1 | 5/2015 | Formico et al. | |

OTHER PUBLICATIONS

"U.S. Appl. No. 13/292,759, Non Final Office Action mailed Sep. 13, 2013", 7 pgs.
"U.S. Appl. No. 13/292,759, Notice of Allowance mailed May 23, 2014", 8 pgs.
"U.S. Appl. No. 13/292,759, Response filed Dec. 13, 2013 to Non Final Office Action mailed Sep. 13, 2013", 15 pgs.
"International Application Serial No. PCT/US2012/063726, International Preliminary Report on Patentability mailed May 22, 2014", 8 pgs.
"International Application Serial No. PCT/US2012/063726, International Search Report mailed Mar. 18, 2013", 5 pgs.
"U.S. Appl. No. 14/608,996, Non Final Office Action mailed Jul. 30, 2015", 25 pgs.
"U.S. Appl. No. 14/608,996, Response filed Jun. 8, 2015 to Restriction Requirement mailed Apr. 30, 2015", 11 pgs.
"U.S. Appl. No. 14/608,996, Restriction Requirement mailed Apr. 30, 2015", 7 pgs.
"U.S. Appl. No. 14/608,996, Response filed Oct. 30, 2015 to Non Final Office Action mailed Jul. 30, 2015", 14 pgs.
"U.S. Appl. No. 14/609,073, Examiner Interview Summary mailed Oct. 9, 2015", 3 pgs.
"U.S. Appl. No. 14/609,073, Non Final Office Action mailed Aug. 7, 2015", 27 pgs.
"U.S. Appl. No. 14/609,073, Response filed Jun. 8, 2015 to Restriction Requirement maile May 14, 2015", 11 pgs.
"U.S. Appl. No. 14/609,073, Response filed Nov. 9, 2015 to Non Final Office Action mailed Aug. 7, 2015", 15 pgs.
"U.S. Appl. No. 14/609,073, Restriction Requirement mailed May 15, 2014", 7 pgs.
"U.S. Appl. No. 13/292,759, Response filed May 6, 2014 to Final Office Action mailed Mar. 6, 2014", 16 pgs.
"U.S. Appl. No. 14/608,996, Advisory Action mailed Apr. 6, 2016", 3 pgs.
"U.S. Appl. No. 14/608,996, Examiner Interview Summary mailed Oct. 9, 2015", 3 pgs.
"U.S. Appl. No. 14/608,996, Final Office Action mailed Jan. 25, 2016", 24 pgs.
"U.S. Appl. No. 14/608,996, Non Final Office Action mailed Jun. 17, 2016", 23 pgs.
"U.S. Appl. No. 14/608,996, Response filed Apr. 25, 2016 to Final Office Action mailed Jan. 25, 2016", 12 pgs.
"U.S. Appl. No. 14/609,073, Final Office Action mailed Jan. 29, 2016", 24 pgs.
"U.S. Appl. No. 14/609,073, Response filed Apr. 29, 2016 to Final Office Action mailed Jan. 29, 2016", 13 pgs.
"Application Serial No. Response filed Mar. 25, 2016 to Final Office Action mailed Jan. 25, 2016", 12 pgs.
"U.S. Appl. No. 14/608,996, Response filed Sep. 19, 2016 to Non Final Office Action mailed Jun. 17, 2016", 13 pgs.
"U.S. Appl. No. 14/609,073, Non Final Office Action mailed Jun. 22, 2016", 28 pgs.
"U.S. Appl. No. 14/609,073, Response filed Sep. 22, 2016 to Non Final Office Action mailed Jun. 22, 2016", 14 pgs.
"U.S. Appl. No. 14/608,996, Final Office Action mailed Dec. 23, 2016", 26 pgs.
"U.S. Appl. No. 14/609,073, Final Office Action mailed Dec. 27, 2016", 24 pgs.

\* cited by examiner

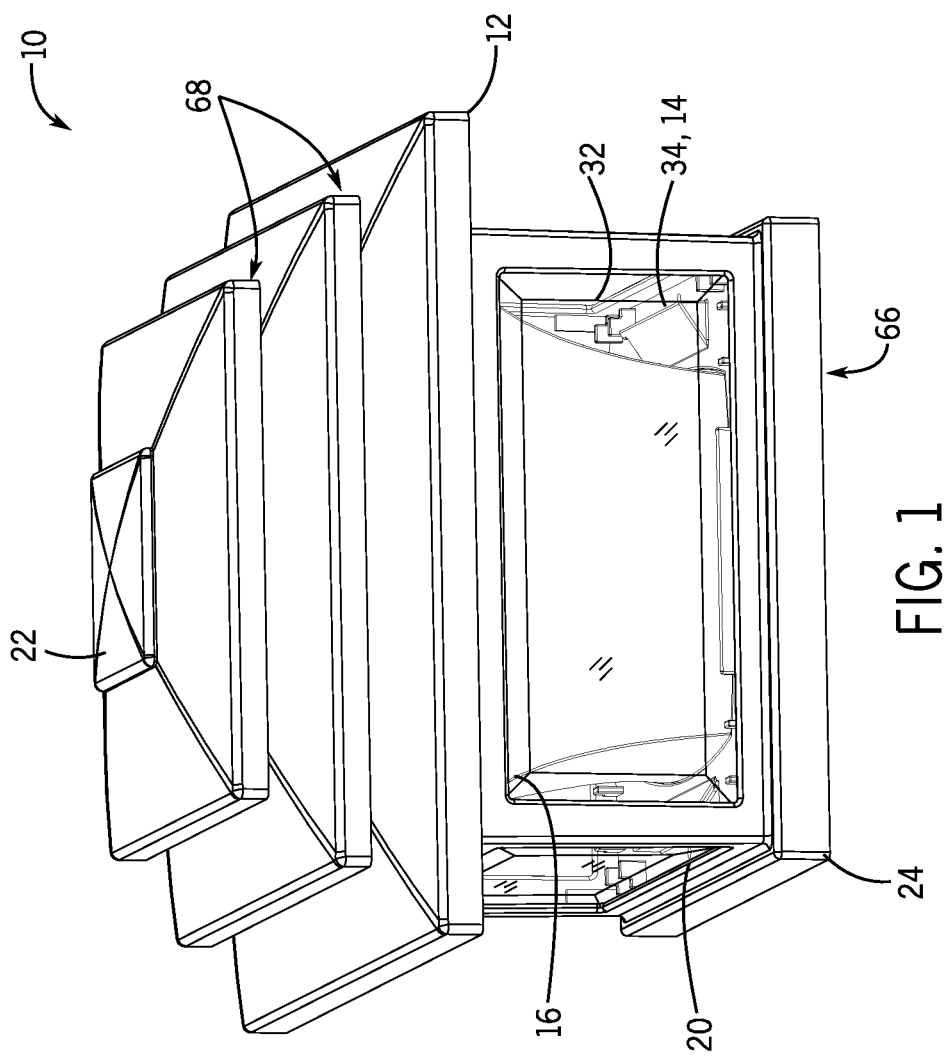

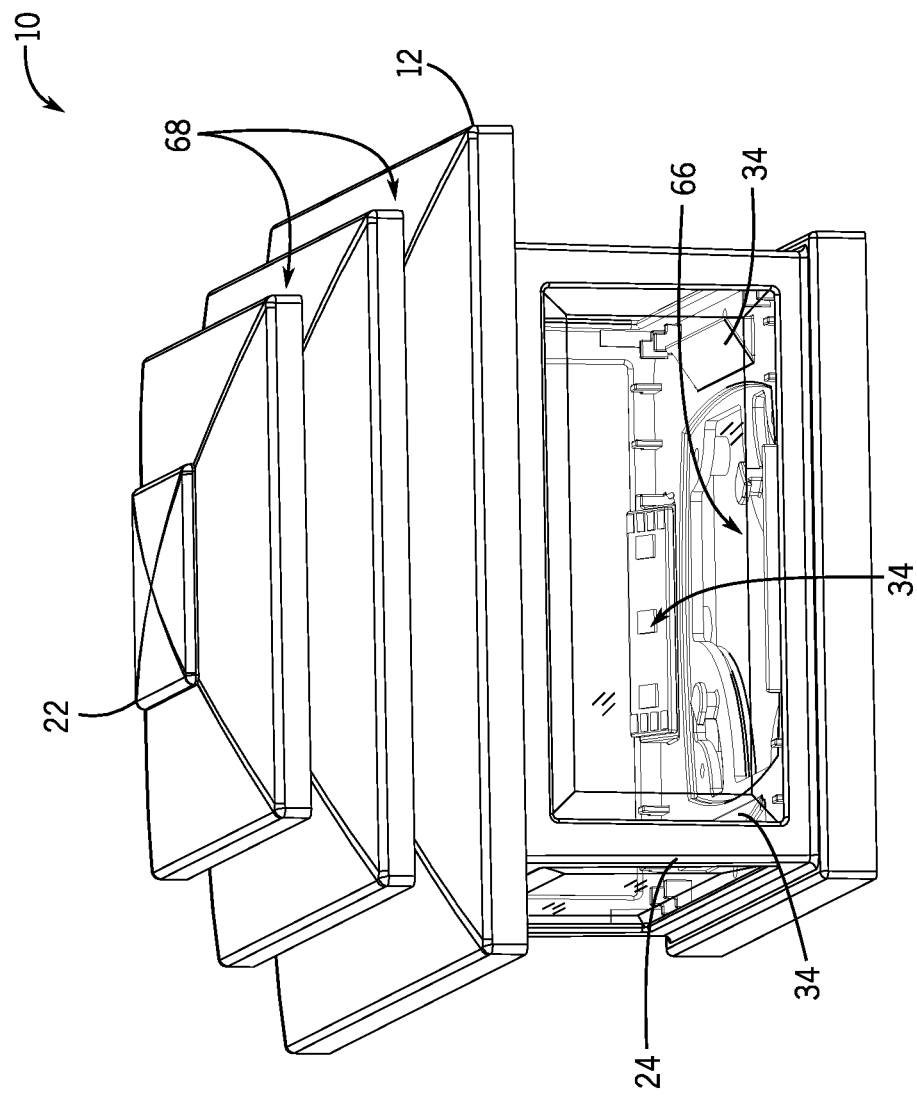

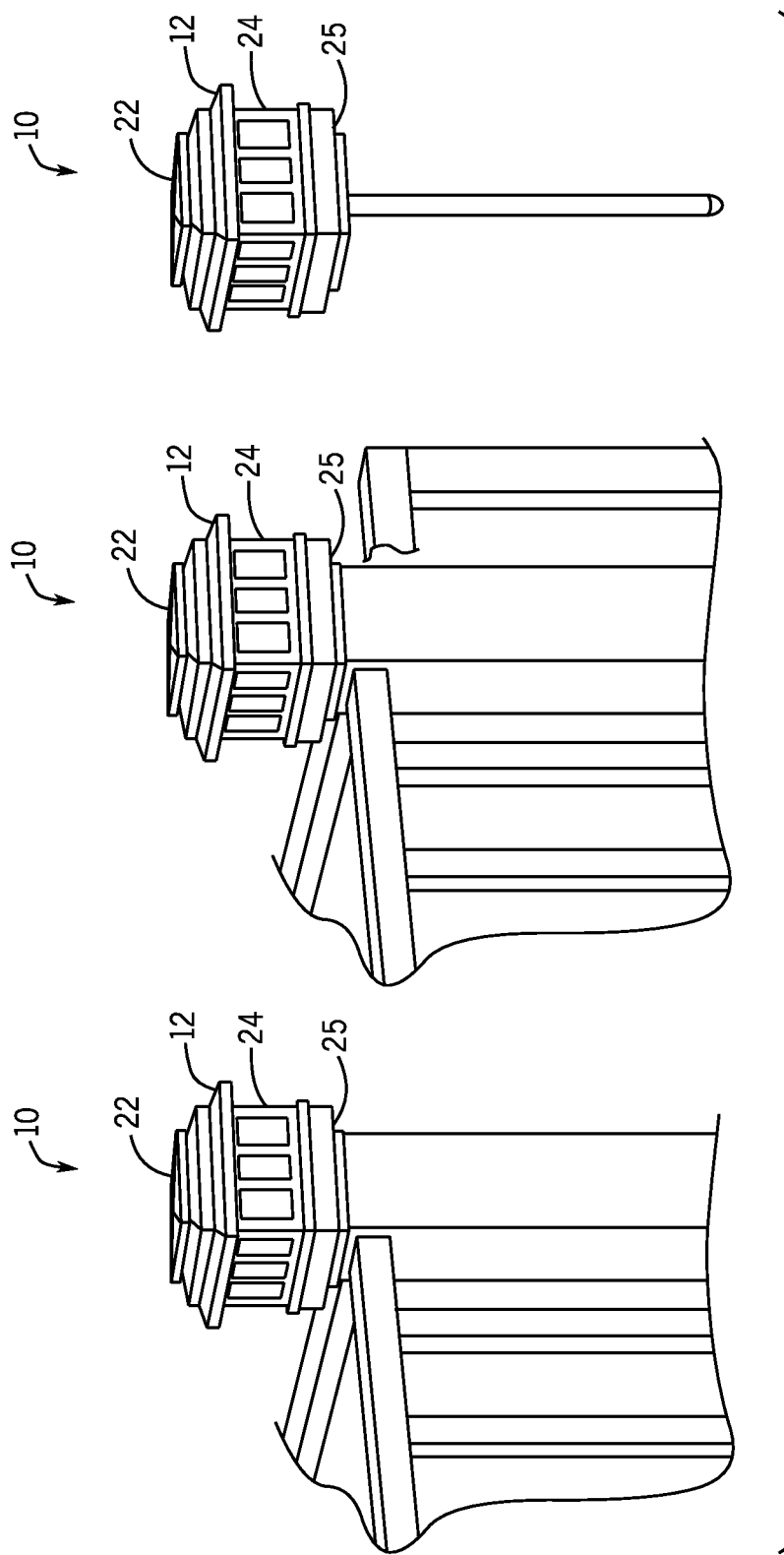

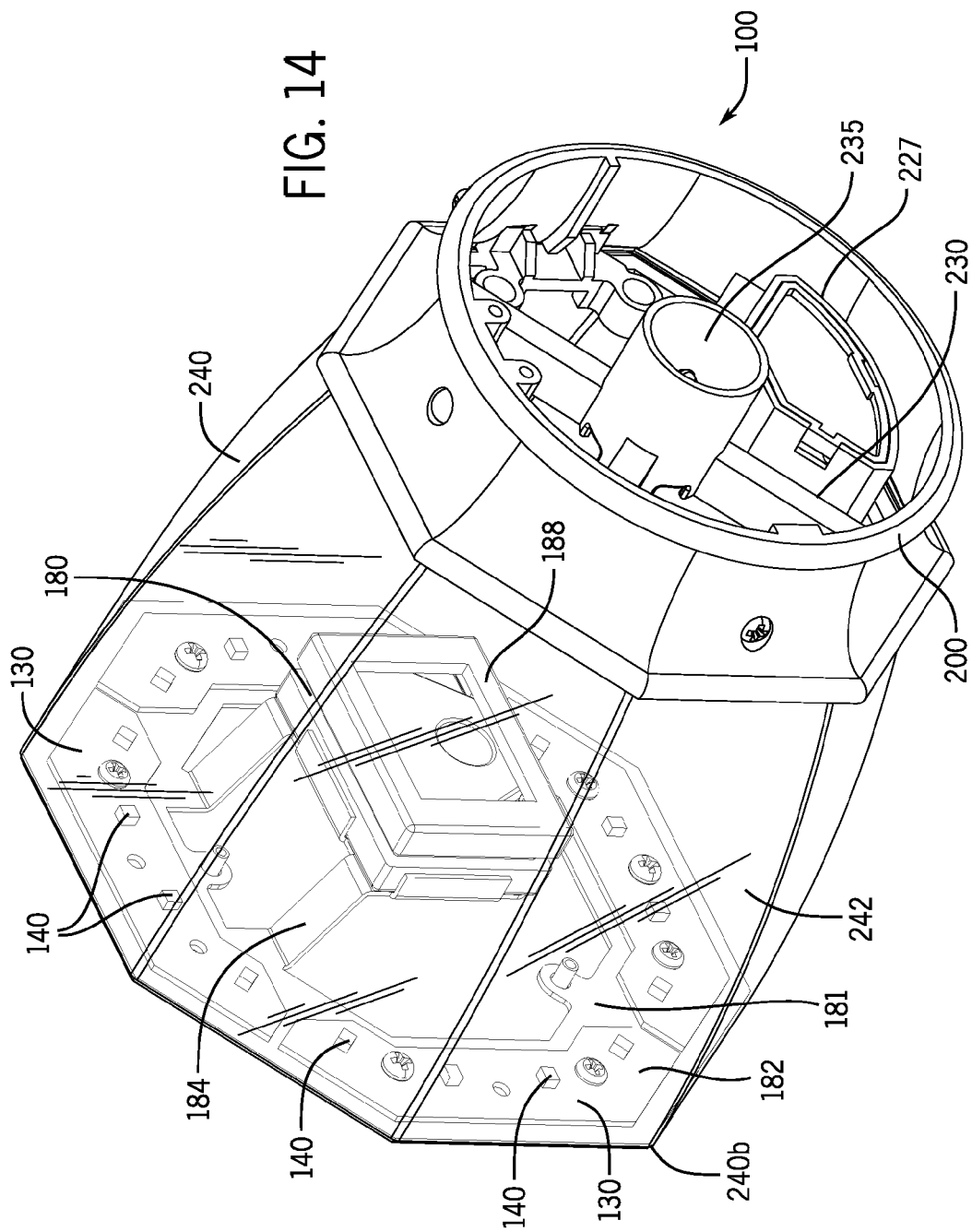

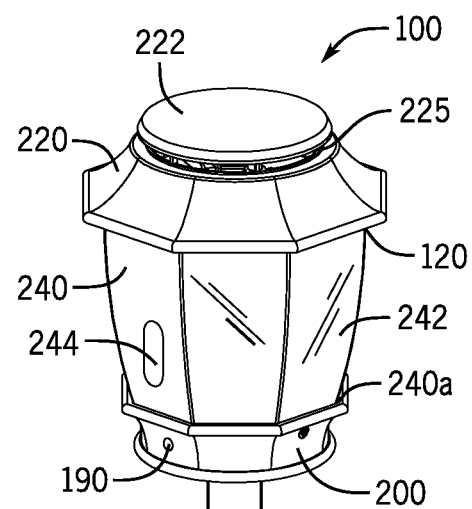
FIG. 16B

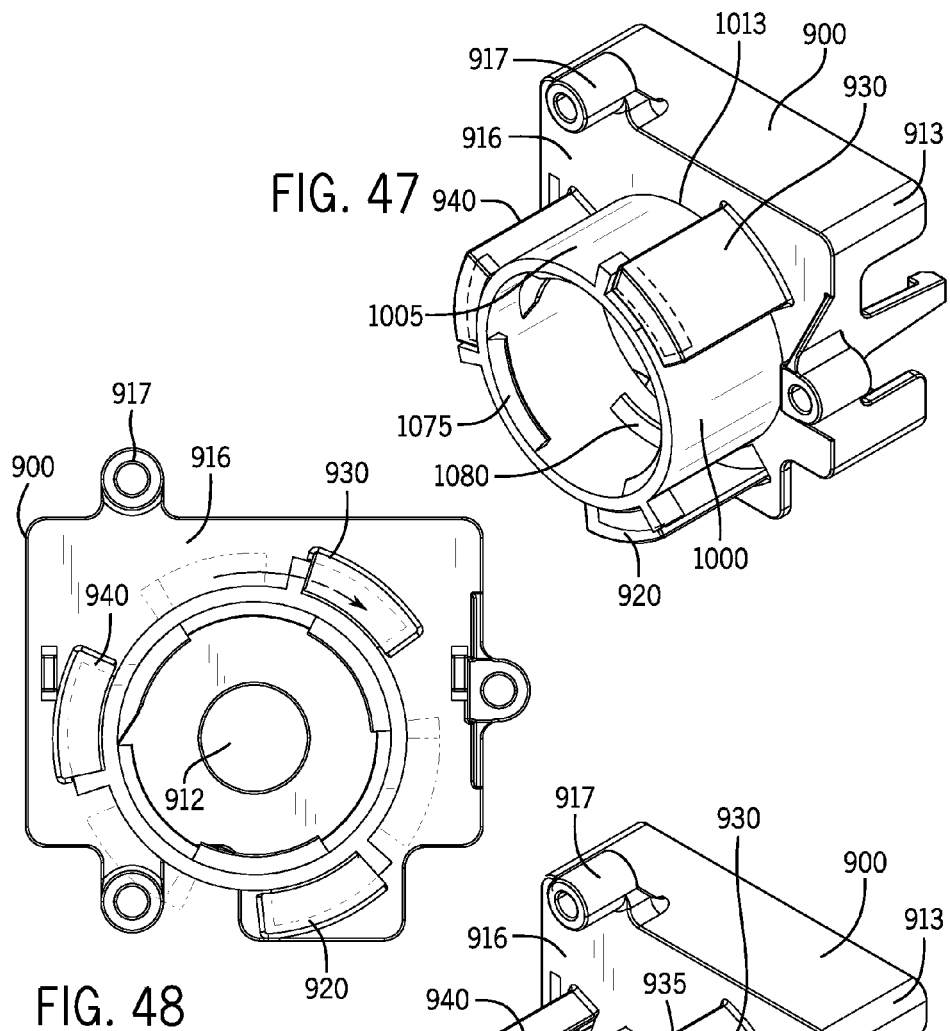
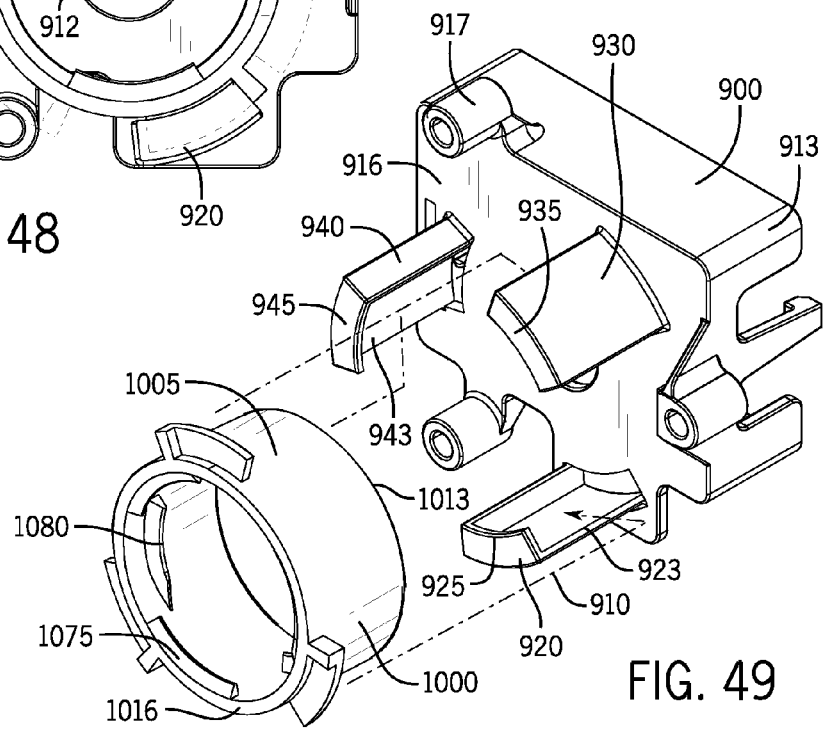

ILLUMINATION SYSTEM AND METHOD

CLAIM OF PRIORITY

This application is a Continuation-in-Part of and claims the benefit of priority under 35 U.S.C. Section 120 to U.S. patent application Ser. No. 13/292,759, filed Nov. 9, 2011, which is incorporated herein by reference in its entirety.

BACKGROUND

Some illumination systems can provide lighting for outdoor activities, however, some bothersome pests, such as mosquitoes, moths, other insects, some mammals, and other potential pests can be attracted to the illumination provided by some illumination systems. Moreover, some outdoor activities, regardless of illumination, can attract at least some of the aforementioned pests due to the presence of humans or animals. In order to repel some of these pests, various chemicals, such as insect repellents and/or pesticides, or other deterrents/repellents can be used either by spraying in the general vicinity, such as a porch, yard, or pool area, or by topical application to skin, or application to clothing, or other surfaces. However, some of these chemicals can release undesirable odors, and/or may be undesirable to apply to human skin or articles of clothing. Single-use repellents such as citronella candles and coils tend to leave residue, and require frequent attention and replacement. Electrical repellent systems including torches, zappers, and traps are costly, require frequent maintenance, and be range limited.

SUMMARY

Some embodiments of the invention provide an illumination system that can include an outer housing including a base, a central housing pivotably coupled to the base including at least one fluid inlet, and an upper housing including at least one fluid outlet coupled to the central housing. The central housing comprises at least one side that comprises a viewing region. Further, the inner housing defines a chamber and is coupled to the base, and includes a first fluid aperture substantially adjacent to the base and a second fluid aperture substantially adjacent to the upper housing and a viewing aperture. The illumination system also includes an evaporator system disposed within the chamber so that the evaporator system is not visible through the outer housing, and at least one illumination device positioned substantially between the inner housing and the central housing.

Some embodiments of the invention include an illumination system with an evaporator system that comprises a reservoir, a wick, and an evaporator assembly. In some embodiments, the reservoir contains at least one of a pest repellent or a pesticide. In some embodiments, the evaporator assembly is coupled to the reservoir, and the wick is positioned in the evaporator assembly, the evaporator assembly configured and arranged to output thermal energy.

Some embodiments of the invention include an evaporator assembly that includes a lockable evaporator support comprising at least one key and an attachment cap, where the attachment cap includes at least one lock configured and arranged to engage the at least one key. In some embodiments, the attachment cap is configured and arranged to couple the reservoir to the evaporator assembly by rotatably engaging the at least one key with the at least one lock to render the reservoir non-refillable.

In some embodiments, the viewing region is positioned on the at least one side positioned at least partially aligned to the viewing aperture to enable a user to at least partially view the reservoir through the viewing region and the viewing aperture. In some embodiments, the illumination system comprises at least one indicator, the at least one indicator configured and arranged to provide illumination when the evaporator system is operational. In some embodiments, the illumination device comprises at least one of a light-emitting diode, an incandescent bulb, a compact fluorescent bulb, or a halogen bulb. In some embodiments, the illumination device is configured and arranged to emit a dynamic illumination event. In some embodiments, the inner housing comprises at least partially blocks light transmission.

Some embodiments of the illumination system further comprise a support assembly coupled to the base, and comprising a stem. Some embodiments of the illumination system further comprise a fluid flow path defined by the fluid inlet, the first fluid aperture, the second fluid aperture, and the fluid outlet. In some embodiments, the fluid flow path passes immediately adjacent to the evaporator system and incorporates at least some fraction of a fluid from the reservoir.

Some embodiments of the illumination system further comprise at least one hinge coupled to the base and at least one hinge coupling coupled to the central housing. In some embodiments, the central housing and inner housing and upper housing can be rotated away from the base using the at least one hinge coupled to the at least one hinge coupling.

Some embodiments of the invention includes a repellent system comprising a base including at least one fluid inlet, a main housing at least partially enclosing an inner region and including an upper portion comprising at least one fluid outlet. The main housing is pivotably coupled to a base with at least one hinge, and the hinge includes a hinge coupler extending from the main housing and coupled to the base using a hinge bolt. The repellent system includes at least one latch configured and arranged to secure the main housing to the base, and an evaporator system being disposed within the inner region so that the evaporator system is not visible through the main housing.

Some embodiments of the repellent system include an evaporator system that comprises a reservoir, a wick, and an evaporator assembly. In some embodiments, the reservoir contains at least one of a pest repellent or a pesticide. In some embodiments, the evaporator assembly is coupled to the reservoir, and the wick is positioned in the evaporator assembly, the evaporator assembly configured and arranged to output thermal energy. In some embodiments, the evaporator assembly includes a lockable evaporator support comprising at least one key and an attachment cap, and the attachment cap includes at least one lock configured and arranged to engage the at least one key.

In some embodiments of the repellent system, the attachment cap is configured and arranged to couple the reservoir to the evaporator assembly by rotatably engaging the at least one key with the at least one lock to render the reservoir non-refillable. In some embodiments, the main housing at least partially blocks light transmission to prevent a user from seeing the evaporator system.

Some embodiments of the repellent system further comprise a support assembly coupled to the base, and comprising a stem. Some embodiments of the repellent system further comprise a fluid flow path defined by the fluid inlet, the inner region, and the fluid outlet. In some embodiments, the fluid flow path passes immediately adjacent to the evaporator system and incorporates at least some fraction of a fluid from the reservoir.

Some embodiments of the repellent system include at least one latch comprising a latching coupler extending from the main housing, and configured and arranged to couple to a latch aperture extending from the base.

DESCRIPTION OF THE DRAWINGS

FIG. 1 is a perspective view of an illumination system according to one embodiment of the invention.

FIG. 2 is a perspective view of an outer housing of the illumination system of FIG. 1.

FIG. 4A illustrates perspective views of the illumination system of FIG. 1 coupled to different adapters.

FIG. 14 is a bottom perspective view of the illumination system of FIG. 12A according to another embodiment of the invention.

FIG. 16B is a perspective view of the illumination system of FIG. 12B coupled to a support structure according to another embodiment of the invention

FIG. 47 illustrates a perspective view of a lockable evaporator support coupled to an attachment cap in accordance with at least one embodiment of the invention.

FIG. 48 illustrates a top view of a lockable evaporator support coupled to an attachment cap in accordance with at least one embodiment of the invention.

FIG. 49 illustrates an exploded assembly perspective view of a lockable evaporator support and attachment cap in accordance with at least one embodiment of the invention.

DETAILED DESCRIPTION

Figure 3A:
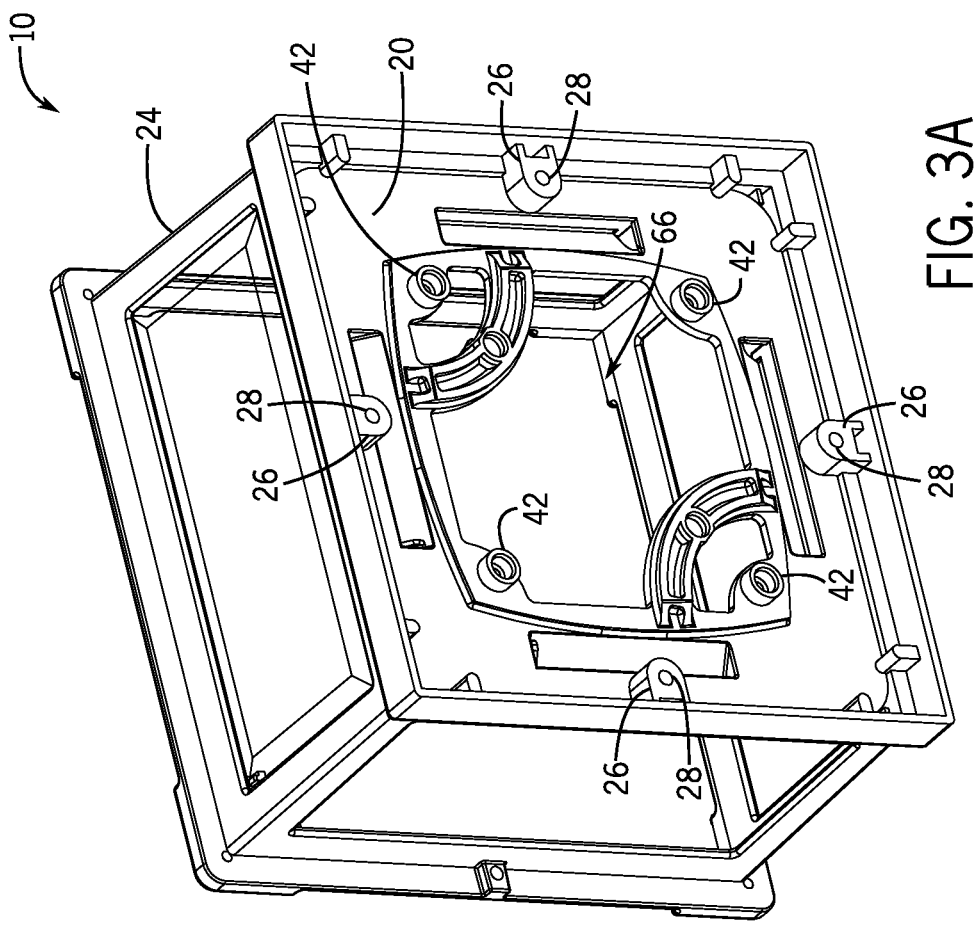
FIG. 3A is a bottom perspective view of a portion of the outer housing of the illumination system of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

FIG. 1 illustrates an illumination system 10 according to one embodiment of the invention. The illumination system 10 can include an outer housing 12, at least one illumination device 14, an inner housing 16, and an evaporator system 18. In some embodiments, at least a portion of the elements of the system 10 can be disposed within, and/or supported by the outer housing 12. Moreover, after assembly, some portions of the outer housing 12 can be substantially fluid resistant or can be configured and arranged to limit fluid influx within the outer housing 12. For example, in some embodiments, a user can employ the illumination system 10 in some outdoor applications. Accordingly, in some embodiments, the illumination system 10 can be configured and arranged to limit an amount of precipitation from entering the outer housing 12 and contacting some elements positioned within the outer housing 12. For example, as described in further detail below, at least a portion of the elements positioned within the outer housing 12 can be operated by an electrical current, and, accordingly, preventing a substantial volume of precipitation from contacting the elements can at least partially reduce risks of short circuit events and other damage to the illumination system 10.

As shown in FIGS. 1 and 2, in some embodiments, the outer housing 12 can comprise a substantially cubical or square shape. In some embodiments, the outer housing 12 can be configured in other shapes such as spherical, pyramidal, a regular or an irregular polygon, or other shapes. In some embodiments, the outer housing 12 can be configured and arranged to take any shape desired by a manufacturer or the user.

In some embodiments, the outer housing 12 can comprise multiple elements. The outer housing 12 can include a base 20, an upper housing 22, and a central housing 24. In some embodiments, the outer housing 12 can be configured so that at least a portion of the outer housing 12 elements are substantially integral with each other. In other embodiments, at least some of the outer housing 12 elements are manufactured separately and later coupled together to form the outer housing 12. Moreover, in some embodiments, the outer housing 12 can comprise multiple materials, such as a metal, an alloy, a polymer, polycarbonate, a resin, a composite, and other materials. Further, in some embodiments, different portions of the outer housing 12 can comprise different materials. For example, in some embodiments, the central housing 24 can comprise a metal-containing material, and the base 20 can comprise a polymer (e.g., polycarbonate). In some embodiments, each portion of the outer housing 12 can comprise substantially similar materials.

Figure 3B:
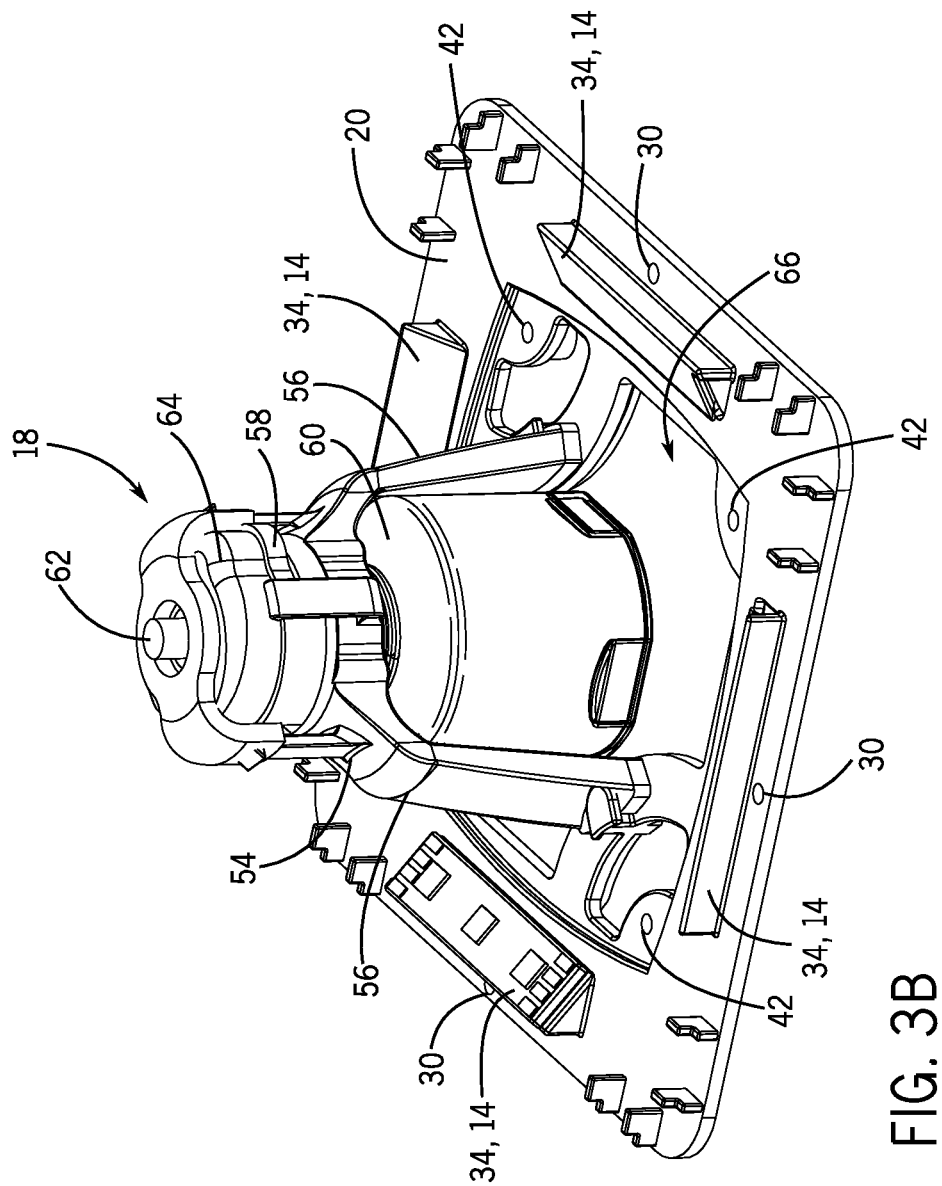
FIG. 3B is a perspective view of a portion of an illumination system according to one embodiment of the invention.

In some embodiments, the base 20 can be coupled to the central housing 24, as shown in FIG. 3A. In some embodiments, the central housing 24 can comprise four substantially similar sides (e.g., a substantially square configuration) and each of the four sides can comprise at least one flange 26 extending inward. At least some of the flanges 26 can comprise a coupling aperture 28 that can be configured and arranged to receive at least one coupling structure (e.g., a screw, a nail, a fastener, adhesive, etc.). In some embodiments, the central housing 24 can be dimensioned so that the base 20 can be disposed within the central housing 24 and can be supported and retained in position by one or more of the flanges 26. Moreover, in some embodiments, the base 20 can comprise receiving apertures 30, as shown in FIG. 3B. For example, in some embodiments, the base 20 can be configured and arranged so that when the base 20 can be coupled to the central housing 24, the receiving apertures 30 and the coupling apertures 28 can substantially align so that a coupling structure (not shown) can be disposed through the apertures 28, 30. This can aid in coupling together the base 20 and the central housing 24. In other embodiments, as previously mentioned, the base 20 can be substantially integral with the central housing 24, and no coupling is necessary.

Figure 4B:
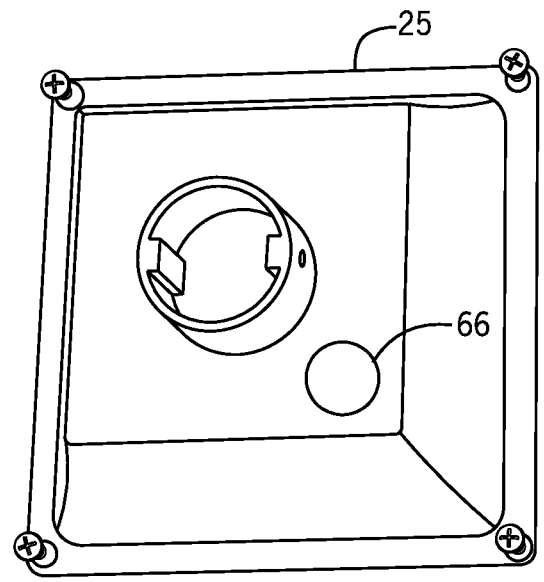
FIG. 4B is a bottom view of an adapter according to one embodiment of the invention.

In some embodiments, the outer housing 12 can comprise an adapter 25. Referring to FIGS. 4A and 4B, the adapter 25 can be coupled to the base 20 and/or the central housing 24 to enable versatile positioning of the illumination system 10. In some embodiments, the adapter 25 can comprise multiple configurations and/or the outer housing 12 can be configured and arranged to be coupled to multiple adapters 25. For example, as shown in FIG. 4A, multiple adapters 25 can be coupled to the outer housing 12 so that the illumination system 10 can be coupled to structures of multiple sizes (e.g., multiple circumferences, perimeters, areas, volumes, etc.). By way of example only, the adapter 25 can be configured to receive a substantially cylindrical support structure, a support post including a first size, and a support post including another, different size. In some embodiments, the adapter 25 can be configured and arranged to receive any structure so that the illumination system 10 can be supported by, and coupled to, a relatively stable structure in any location (e.g., a fence post, a support post for a deck, a support for a patio, etc.).

Figure 5:
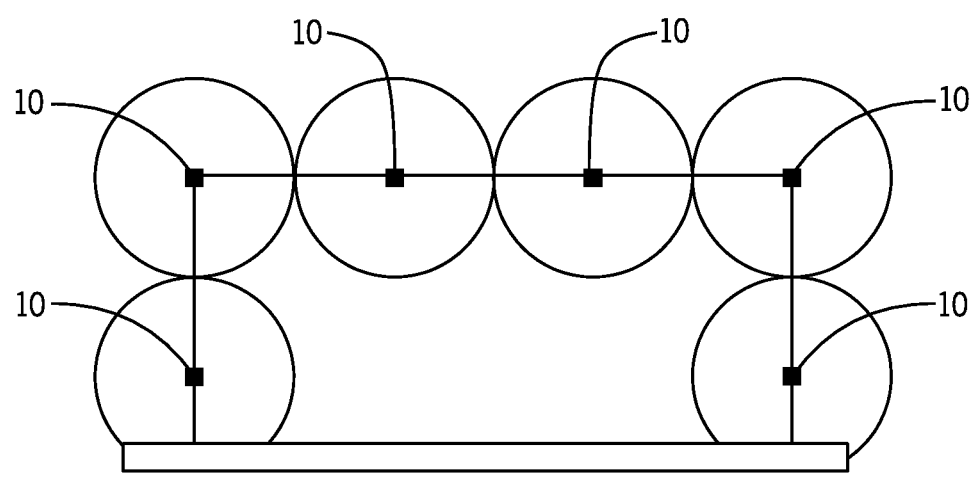
FIG. 5 is a diagram representing a plurality of illumination systems according to one embodiment of the invention.

As shown in FIG. 5, in some embodiments, a plurality of illumination systems 10 can be coupled to multiple support structures. By way of example only, as shown in FIG. 5, multiple illumination systems 10 can be coupled to the support posts around at least a portion of a perimeter of a gathering area (e.g., an outdoor/indoor patio, deck, entertainment region, any other region where humans or other animals would gather) to provide illumination, pest control, or other desirable benefits, some of which are described in further detail below. Moreover, in some embodiments, the illumination systems 10 can be coupled to the support posts at regular and/or irregular intervals (e.g., a substantially daisy-chained configuration).

In some embodiments, the central housing 24 can comprise a plurality of panels 32. As shown in FIG. 1, in some embodiments, each side of the central housing 24 can comprise at least one panel 32. In some embodiments, the central housing 24 can comprise different numbers of panels 32 relative to sides (e.g., more sides than panels 32 or more panels 32 than sides). Moreover, in some embodiments, at least some of the panels 32 can be substantially transparent and/or substantially translucent. For example, at least a portion of the panels 32 can comprise glass (e.g., any form of glass, such as substantially transparent glass or substantially translucent glass, such as frosted glass), polycarbonate, or other materials through which illumination can be visible to observers. Although, in some embodiments, at least one of the panels 32 can be substantially opaque so that illumination cannot be visible through the panel 32. In some embodiments, at least a portion of the central housing 24 can be uncoupled so that the panels 32 can be installed or replaced within the sides of the central housing 24.

In some embodiments, the illumination device 14 can be coupled to a portion of the outer housing 12. In some embodiments, the illumination system 10 can comprise multiple illumination devices 14 coupled to portions of the outer housing 12. For example, in some embodiments, at least a portion of the illumination devices 14 can be coupled to the base 20. The illumination devices 14 can be coupled to the base 20 at substantially regular intervals. For example, the illumination devices 14 can be disposed substantially adjacent to at least a portion of the panels 32, as shown in FIG. 1. In some embodiments, the base 20 can comprise at least one electrical socket 34 to which illumination devices 14 can be coupled (e.g., installed) for use. Moreover, the illumination devices 14 can be oriented substantially parallel to the panels 32. In some embodiments, the illumination devices 14 can be disposed substantially adjacent to at least some corners of the base 20 and/or the central housing 24. In other embodiments, the illumination devices 14 can be coupled to any other portion of the outer housing 12 desired by the manufacturer or the user.

In some embodiments, the illumination devices 14 can be electrically coupled to a power source. In some embodiments, the base 20 can be electrically coupled to a generally low-voltage (e.g., 12 volts) current source such as battery (not shown), a photovoltaic system (not shown), or other current source, such as an alternating current source (e.g., current originating from a structure, such as house or other building). For example, in some embodiments, electrical connections, such as wiring, can be coupled to the illumination devices 14 and/or electrical sockets 34 and routed through some portions of the outer housing 12 (e.g., the adapter 25) to a current source. Moreover, in some embodiments, the battery can be installed within the outer housing 12 or electrically coupled to the illumination system 10. Additionally, in some embodiments, a photovoltaic cell (not shown) can be coupled to the upper housing 22 or other portions of the outer housing 12 to capture any solar energy needed to operate the illumination system 10. Moreover, in some embodiments, the illumination system 10 can comprise any combination of power sources.

Figure 6:
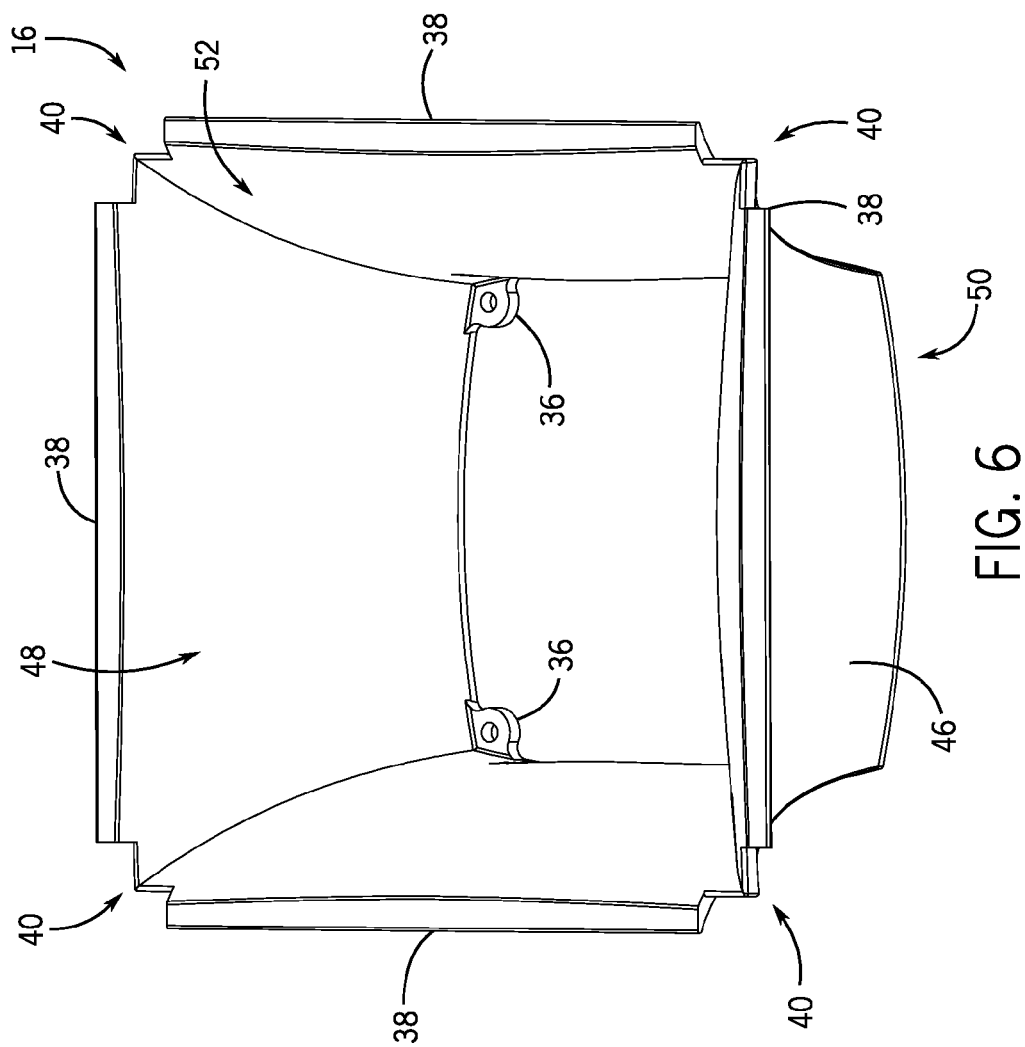
FIG. 6 is a perspective view of an inner housing of the illumination system of FIG. 1.
Figure 7:
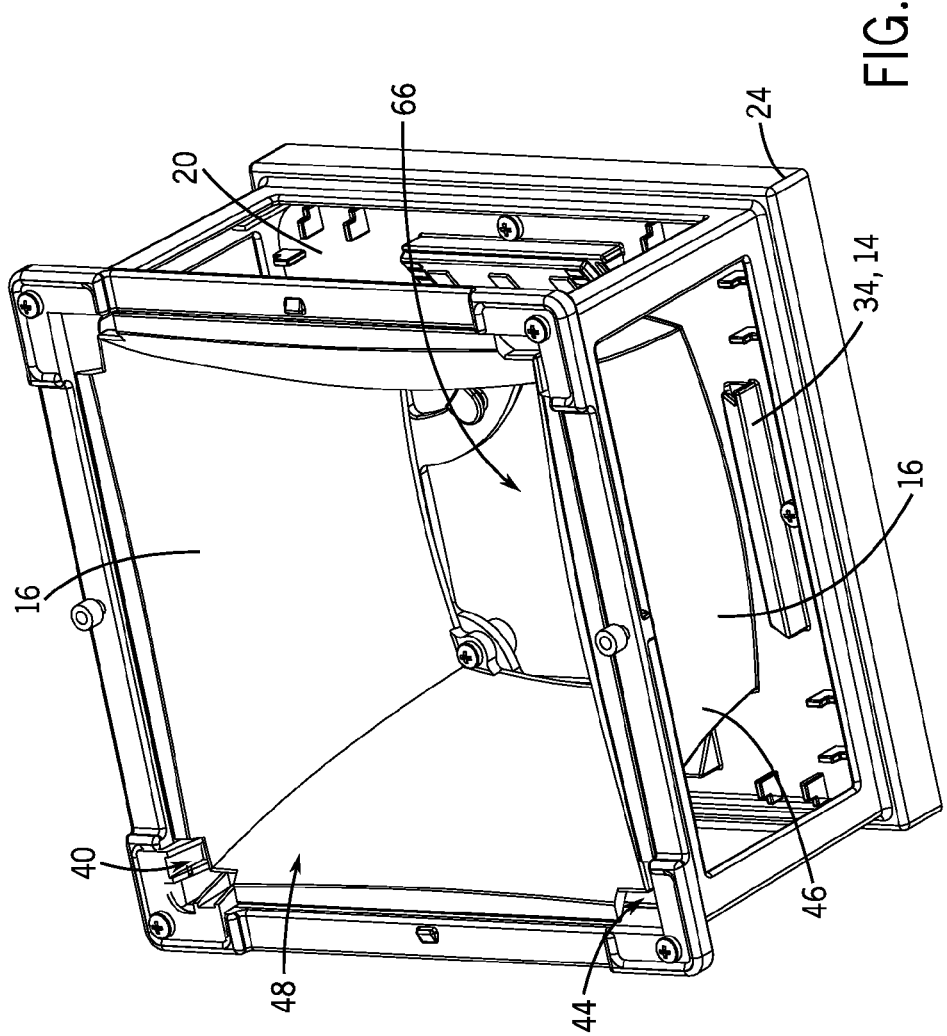
FIG. 7 is a perspective view of a portion of the illumination system of FIG. 1.
Figure 8:
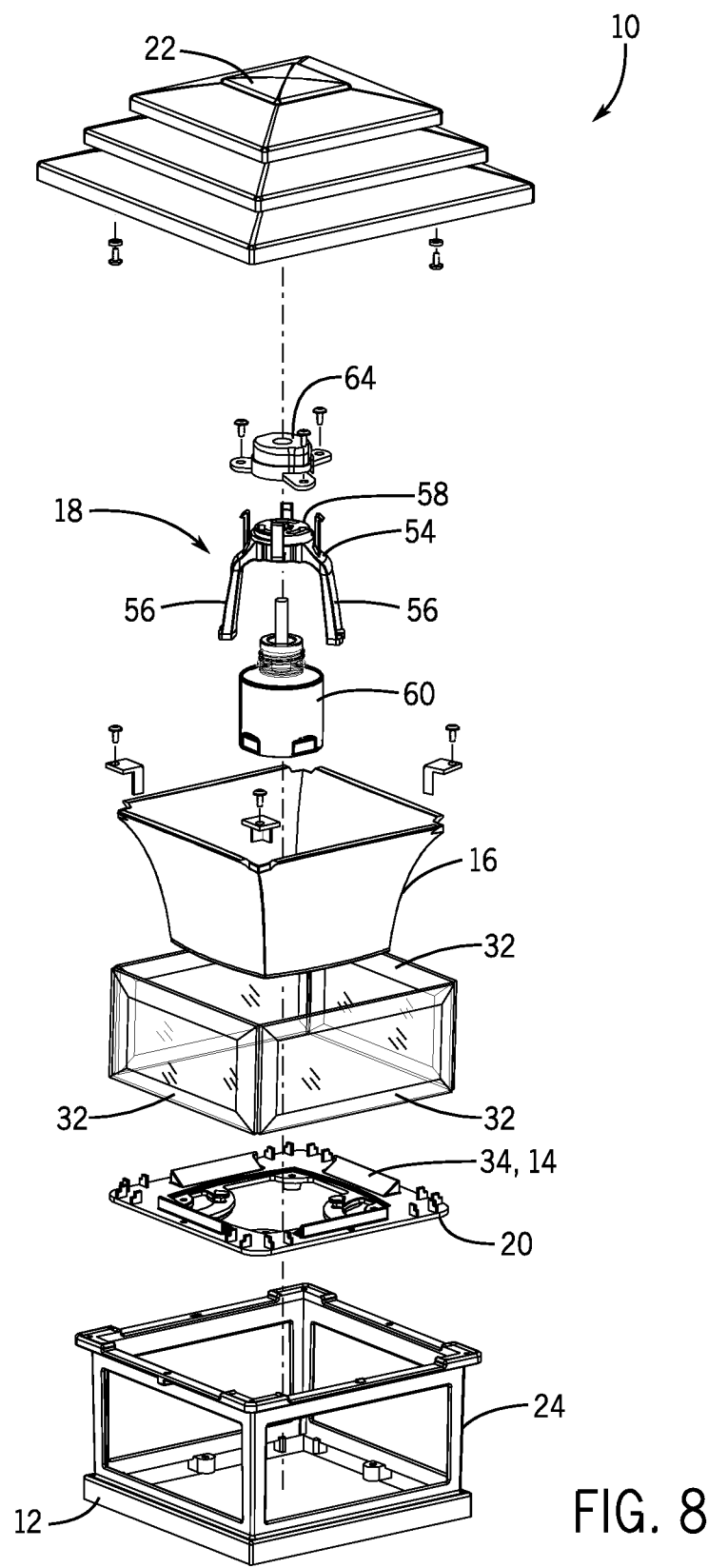
FIG. 8 is an exploded view of an illumination system according to one embodiment of the invention.

In some embodiments, the inner housing 16 can be coupled to the outer housing 12. For example, the inner outer housing 12 can be at least partially disposed within the outer housing 12, as shown in FIG. 1. In some embodiments, the inner housing 16 can be coupled to the base 20 and/or the central housing 24. For example, as shown in FIGS. 6-8, in some embodiments, the inner housing 16 can comprise one or more coupling flanges 36, one or more positioning flanges 38, and one or more positioning recesses 40. Moreover, in some embodiments, the base 20 can comprise one or more receiving apertures 42 and the central housing 24 can include one or guide flanges 44 extending inward from at least some of its sides. Accordingly, in some embodiments, the inner housing 16 can be inserted within the outer housing 12 so that the coupling flanges 36 of the inner housing 16 substantially align with the receiving apertures 42 of the base 20 so that the two elements can be coupled together (e.g., via coupling structures such as adhesives, conventional fasteners, welding, brazing, etc.). Moreover, the guide flanges 44 can at least partially engage the positioning flanges 38 and the positioning recesses 40 can at least partially align with, and engage, upper corners of the central housing 24 to substantially align the inner housing 16 in a desired position (e.g., so that the coupling flanges 36 substantially align with the receiving apertures 42).

In some embodiments, an outer surface 46 of the inner housing 16 can comprise an at least partially reflective surface. For example, the inner housing 16 can be coupled to the base 20 so that one or more of the illumination devices 14 are substantially adjacent to the outer surface 46. As a result, in some embodiments where the outer surface 44 is at least partially reflective, at least a portion of the illumination provided by one or more of the illumination devices 14 can be directed outward (e.g., to an outer environment through one or more of the panels 32). In some embodiments, at least a portion of the outer surface 46 can be substantially non-reflective so that at least a portion of the illumination provided by the illumination devices 14 is not reflected by some portions of the outer surface 46.

In some embodiments, the inner housing 16 can comprise a substantially opaque configuration. For example, the inner housing 16 can be configured and arranged to prevent any light transmission from or to a chamber 48 disposed within the inner housing 16. For example, as described in further detail below, the evaporator system 18 can be at least partially disposed within the chamber 48 so that at least a portion of the evaporator system 18 can be obscured from view.

Furthermore, in some embodiments, the inner housing 16 can comprise a first fluid aperture 50 and a second fluid aperture 52. For example, the first fluid aperture 50 can be substantially immediately adjacent to one or more of the coupling flanges 36 and the second fluid aperture 52 can be disposed at a substantially opposite portion of the inner housing 16 relative to the first fluid aperture 50. In some embodiments, the inner housing 16 can comprise a substantially inverted frusto-pyramidal configuration so that the first fluid aperture 50 comprises a smaller perimeter relative to the second fluid aperture 52. In other embodiments, the inner housing 16 can comprise other configurations (e.g., cylindrical, cubical, rectangular, etc.) and the first and second fluid apertures 50, 52 can comprise substantially similar perimeters or substantially different perimeters. Additionally, as shown in FIGS. 6 and 8, in some embodiments, at least some sides of the inner housing 16 can comprise substantially angled, bent, or an otherwise non-planar configuration, although, in other embodiments, at least a portion of the sides of the inner housing 16 can comprise one or more substantially planar configurations.

In some embodiments, the evaporator system 18 can be at least partially disposed within the chamber 48 defined by the inner housing 16. As previously mentioned, by positioning the evaporator system 18 within the inner housing 16, in some embodiments comprising a substantially opaque inner housing 16, the evaporator system 18 can be at least partially obscured from view so that anyone adjacent to the illumination system 10 cannot readily visualize the evaporator system 18. Furthermore, at least some of the fluids or other substances that can be contained within the evaporator system 18 can be at least partially susceptible to ultra-violet radiation (e.g., sunlight). Accordingly, by disposing the evaporator system 18 within the inner housing 16, the evaporator system 18 can be at least partially shielded from direct exposure to ultra-violet radiation.

Figure 9:
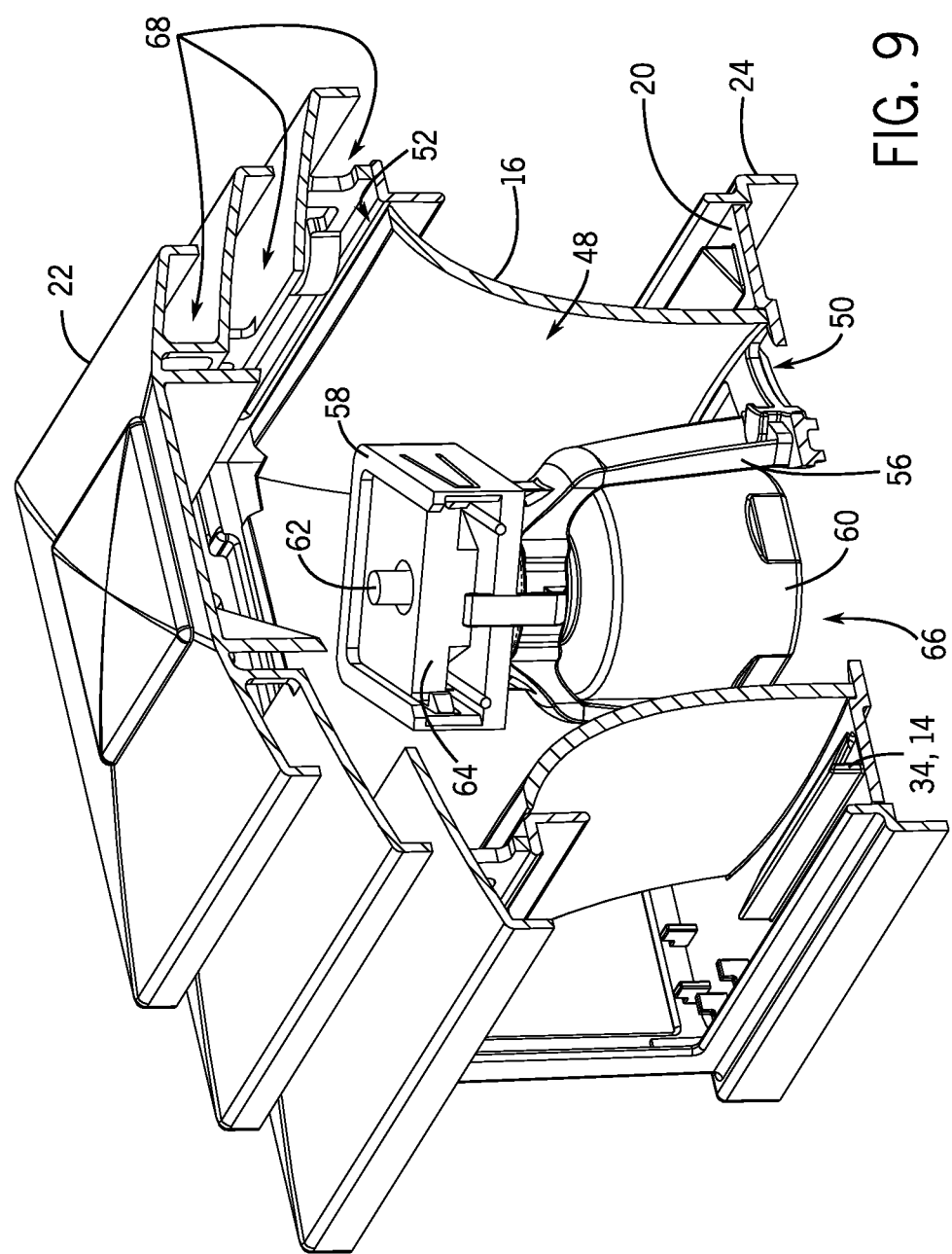
FIG. 9 is a partial cross-sectional view of the illumination system of FIG. 1.

As shown in FIG. 9, in some embodiments, the evaporator system 18 can be at least partially supported by and/or coupled to the outer housing 12. In some embodiments, the evaporator system 18 can comprise a support apparatus 54 that can be configured and arranged to couple together the evaporator system 18 and at least a portion of the base 20. For example, as shown in FIGS. 8 and 9, the support apparatus 54 can include at least two support members 56 and a receiving member 58. In some embodiments, the evaporator system 18 can comprise at least one reservoir 60 (e.g., a bottle or other structure capable of receiving a fluid) and the receiving member 58 and the support members 56 can be configured and arranged to receive the reservoir 60.

By way of example only, in some embodiments, the reservoir 60 can comprise a bottle including a neck portion and the support apparatus 54 can at least partially function to couple the reservoir 60 to the base 20. For example, the receiving member 58 can be disposed over at least some of the neck portion and the support members 56 can be spaced apart to receive the reservoir 60, as shown in FIGS. 8 and 9. In some embodiments, the support members 56 can be coupled to the base 20 via conventional fasteners, adhesives, welds, braze, and other coupling devices and methods. For example, the support members 56 can be reversibly coupled to the base 20 (e.g., via conventional fasteners) so that the user can access the reservoir 60 (e.g., the user can repeatedly access the reservoir 60 to add a fluid to the reservoir 60). In some embodiments, the reservoir 60 can be directly coupled to the base 20 or other portions of the outer housing 12. Moreover, in some embodiments, more than one reservoir 60 can be either directly coupled to the base 20 or coupled to the base 20 via multiple support apparatuses 54.

Figure 10:
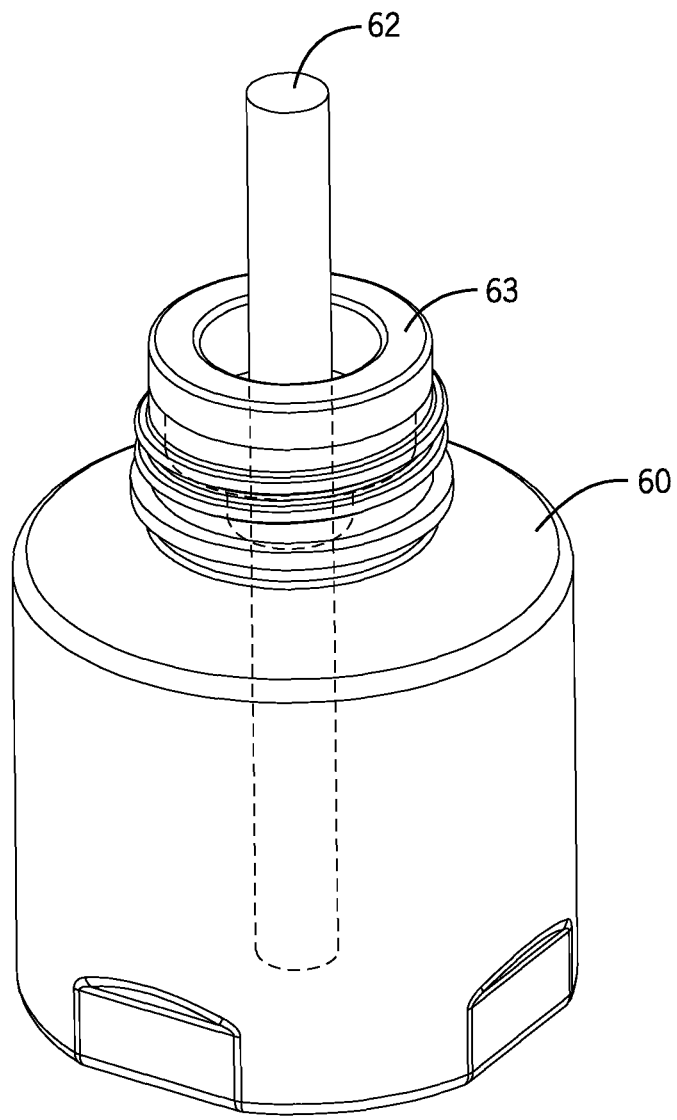
FIG. 10 is a perspective view of a reservoir and wick according to one embodiment of the invention.

In some embodiments, at least one wick 62 can be at least partially disposed within the reservoir 60. As shown in FIG. 10, in some embodiments, the at least one wick 62 can extend at least a length of the reservoir 60. For example, in some embodiments, the at least one wick 62 can comprise a length that is greater than the length of the reservoir 60. In some embodiments, the at least one wick 62 can be configured and arranged to enable transfer of the volatile fluid from within the reservoir 62 to a position outside of the reservoir 60. For example, because the at least one wick 62 can at least partially extend out of the reservoir 60 (e.g., protrude from the neck of the reservoir 60), the at least one wick 62 can function to absorb the volatile fluid within the reservoir 60 and transfer the fluid outside of the reservoir 60 (e.g., via capillary action, diffusion, etc.).

In some embodiments, the reservoir 60 can comprise a wick support structure 63 disposed within an opening of the reservoir 60. For example, as shown in FIG. 10, the wick support structure 63 can be disposed at least partially within the neck portion of the reservoir 60 and can function to support and retain the at least one wick 62 in position during operations of the illumination system 10. Moreover, in some embodiments, the volatile fluid within the reservoir 60 can be expended during operations of the evaporator system 18 and the user can access the reservoir 60 by uncoupling the support apparatus 54 from the outer housing 12 and then removing the wick support structure 63 to add further quantities of the volatile fluid to the reservoir 60. The wick support structure 63 can also function to at least partially seal the reservoir 60 so that the only material amounts of volatile fluid exiting the reservoir 60 do so via the wick 60 and are not subject to significant amount of natural evaporation.

In some embodiments, the evaporator system 18 can comprise an evaporator member 64. In some embodiments, the evaporator member 64 can generally comprise a structure configured and arranged to output thermal energy (e.g., a heater, such as resistance heater). As previously mentioned, the base 20 can be electrically connected to a current source to provide electrical current to the illumination devices 14. In some embodiments, the evaporator member 64 and/or other portions of the evaporator system 18 can be electrically connected to the current source and/or the base 20 so that the evaporator member 64 can output thermal energy when receiving power from the current source.

In some embodiments, the evaporator member 64 can be removably coupled to the evaporator system 18 to volatilize the pest-affecting substance or any other substance within the reservoir 60. For example, in some embodiments, the at least one wick 62 can be disposed within the evaporator system 18 so that it is substantially adjacent to the evaporator member 64. As shown in FIG. 3B, in some embodiments, the evaporator member 64 can be substantially immediately adjacent (e.g., substantially circumscribe) to at least a portion of the reservoir 60 (e.g., within or immediately adjacent to the neck portion of the reservoir 60) and/or a portion of the at least one wick 62. As a result, in some embodiments, the thermal energy produced by the evaporator member 64 can volatilize the substance within the reservoir 60. Further, as the substance volatilizes, further volumes of the substance can be drawn upward through the at least one wick 62 so that the volatile substance can be substantially continuously released by the evaporator system 18 when the evaporator member 64 is activated.

In some embodiments, the upper housing 22 can be coupled to the central housing 24. The upper housing 22 can be coupled to the central housing 24 using conventional coupling technique, such as, but not limited to, conventional fasteners, welding, adhesives, brazing, snap-fittings, grille springs, etc. For example, in some embodiments, the upper housing 22 can be coupled to the central housing 24 via one or more conventional fasteners, such as screws, bolts, and/or nails. Moreover, in some embodiments, the upper housing 22 can be reversibly coupled to the central housing 24 so that a user can easily remove the upper housing 22 to access any elements coupled to, or disposed within, the central housing 24.

In some embodiments, the upper housing 22 can be coupled to the central housing 24 at a position substantially opposed to the adapter 25 and the base 20 (i.e., an upper portion of the illumination system 10). In some embodiments, by coupling the upper housing 22 to the central housing 24 at a position substantially opposite the base 20, the upper housing 22 can substantially enclose some portions of the illumination system 10, such as, but not limited to some or all of the illumination devices 14, the evaporator system 18, the base 20, and some other elements. In some embodiments, the illumination system 10 can be at least partially disposed in an outdoor environment, and the upper housing 22 can function to at least partially reduce the chances of precipitation contacting some of the components of the illumination system 10 that are electrically connected to a current source (e.g., the evaporator system 18, the illumination device 14, etc.).

Figure 11:
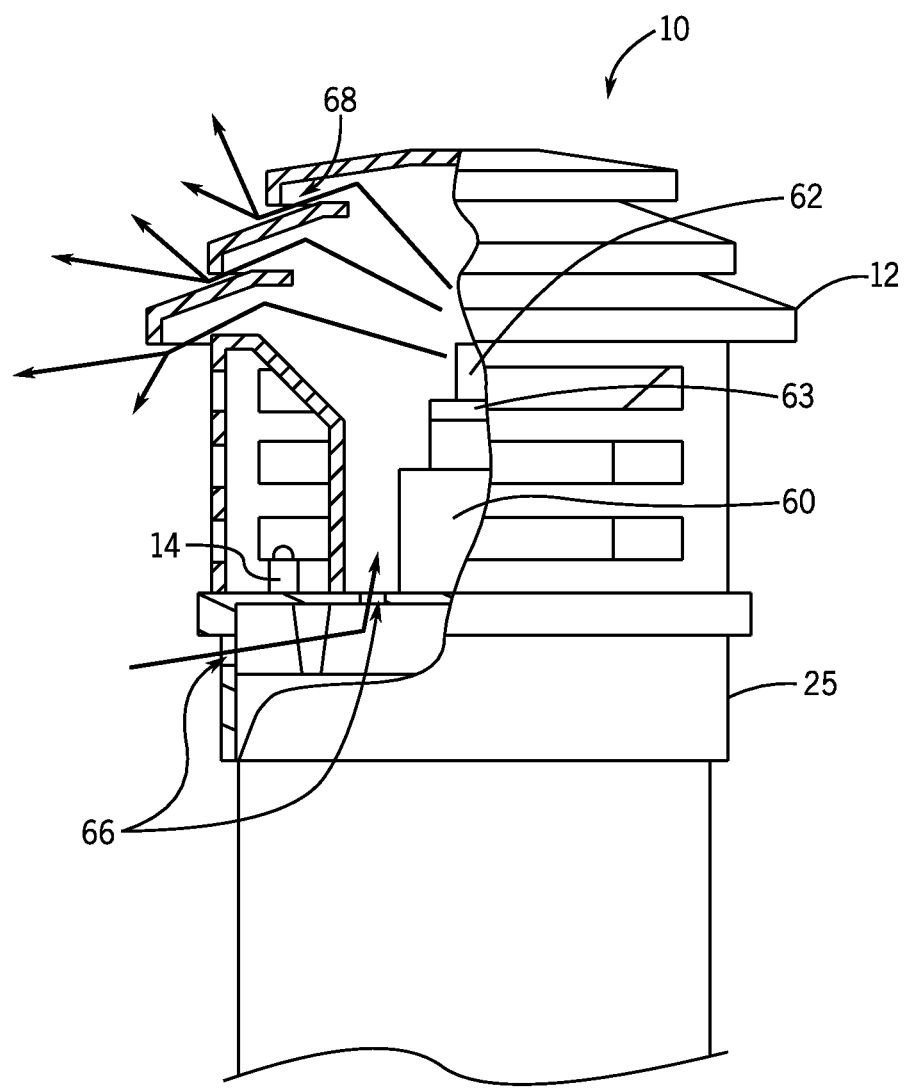
FIG. 11 is a partial cross-sectional view of an illumination system and fluid flow path according to one embodiment of the invention.

In some embodiments, the illumination system 10 can comprise at least one fluid inlet 66 and at least one fluid outlet 68. For example, some portions of the outer housing 12 can comprise the fluid inlet 66 and the fluid outlet 68. As shown in FIGS. 4B and 11, in some embodiments, the central housing 24, the adaptor 25, and/or the base 20 can comprise one or more fluid inlets 66. For example, in some embodiments, the adaptor 25 can comprise at least one fluid inlet 66, as shown in FIGS. 4B and 11. Moreover, the base 20 can comprise an inlet 66, in addition to, or in lieu of, the inlet 66 through the adaptor 25. In some embodiments, the upper housing 22 can comprise one or more fluid outlets 68. For example, as shown in FIGS. 9 and 11, the upper housing 22 can be configured and arranged to include a plurality of fluid outlets 68 in multiple layers extending from a position substantially adjacent to the central housing 24 toward a position substantially distal to the central housing 24. In some embodiments, the upper housing 22 can comprise a different configuration and can comprise a single fluid outlet 68 at a position substantially distal to the central housing 24 (e.g., a top portion of the upper housing 22). In some other embodiments, the fluid inlets 66 and fluid outlets 68 can be disposed through other portions of the illumination system 10.

In some embodiments, as a result of the positioning of some of the fluid inlets 66 and some of the fluid outlets 68, at least a portion of the fluid that is volatized by the evaporator system 18 can be distributed to the environment around the illumination system 10. As illustrated by the arrows in FIG. 11, when the evaporator member 64 is activated and a fluid (e.g., air) circulates through the fluid inlets 66 disposed through portions of the adaptor 25 and/or the base 20 and the first fluid aperture 50 of the inner housing 16. The fluid can receive portions of the volatized substance (e.g., via diffusion) and can carry the volatized substance through the second fluid aperture 52 of the inner housing 16 and the fluid outlets 68, and into the environment. For example, the natural convection process of air passing through the fluid flow path (e.g., represented by the arrows in FIG. 11) that includes the fluid inlets 66, the fluid apertures 50, 52 and the fluid outlets 68 can pass substantially adjacent to the evaporator system 18 (e.g., the fluid flow path can substantially pass around and/or through portions of the evaporator system 18), which can lead to the air carrying the volatized fluid out of the outer housing 12.

Some embodiments of the invention can include an illumination system 100 that comprises a low voltage outdoor light fixture that can include an integrated mosquito repellent release device designed for permanent installation. In some embodiments, the repellent is not included, but can be added by a user and/or a reseller, and/or or sold separately. In some embodiments, installation of the illumination system 100 can be accomplished using a ground stake or an optional deck mounting flange. In some embodiments, the illumination system 100 can provide both illumination and mosquito protection over a large radius, with the flexibility to have multiple devices wired in series to cover larger areas. In some embodiments, a control device can permit operation of lighting and repellent device separately or together. Embodiments of the illumination system 100 including a mosquito repellent release device can be designed to secure repellent from children, and enable convenient replacement of a repellent container as needed. In some embodiments, the illumination system 100 includes a light fixture that is designed to be mounted with an in-ground stake or optional deck mounting flange for deck rail or post installation (e.g., similar to the system 10 shown in FIG. 4A).

Figure 12A:
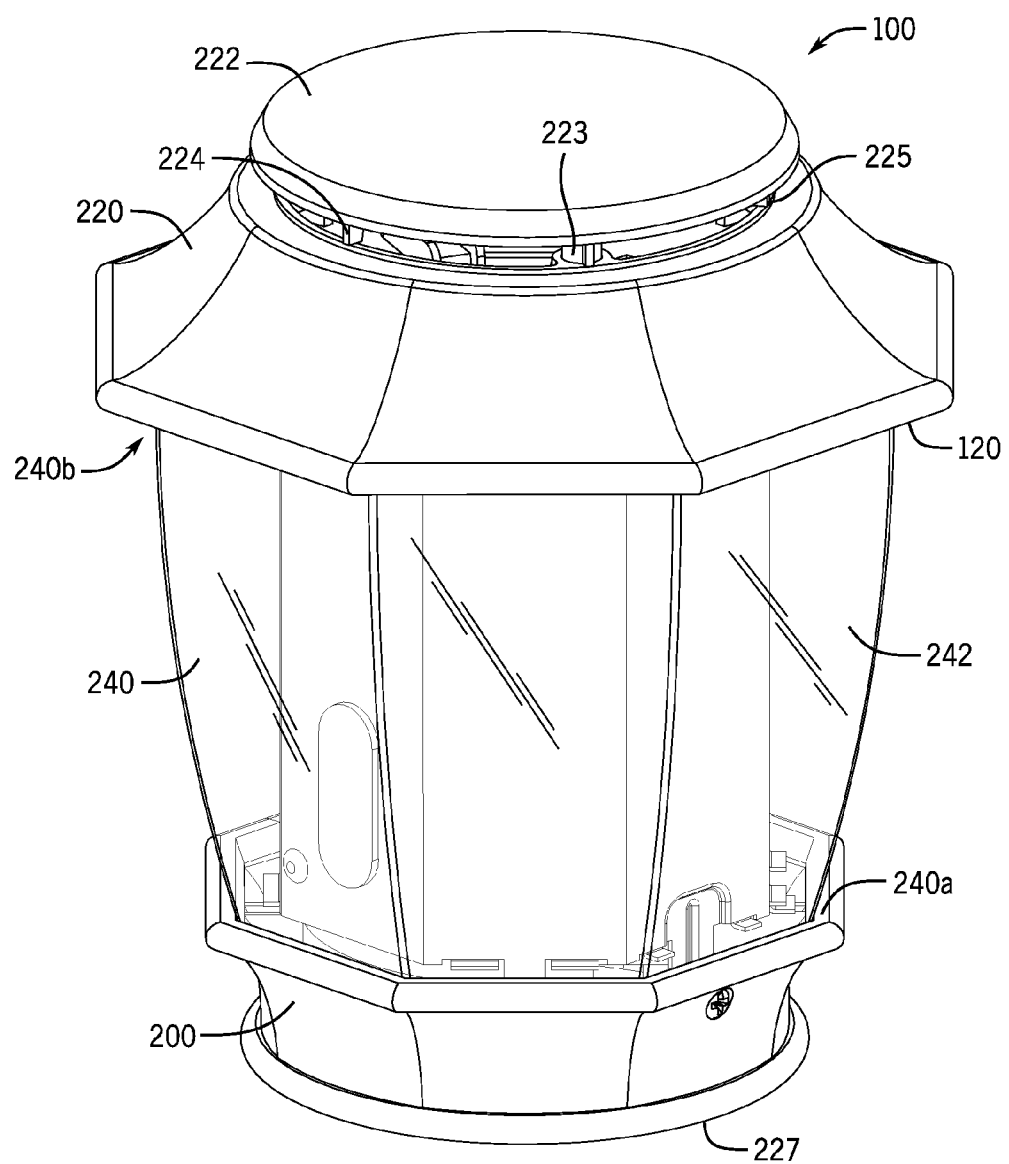
FIG. 12A is a perspective view of an illumination system including an internal view according to another embodiment of the invention.

Some embodiments of the invention can include an outer housing 120 comprising a vented top cover. For example, FIG. 12A is a perspective view of an illumination system including an internal view that shows an illumination system 100 including an outer housing 120 that can comprise multiple elements. In some embodiments, at least a portion of the elements of the system 100 can be disposed within, coupled to, and/or supported by the outer housing 120. In some embodiments, the outer housing 120 can include a base 200, and a central housing 240 at least partially enclosing one or more functional devices. In some embodiments, the base 200 can be coupled to a lower end 240a of a central housing 240, which in turn can be coupled to an upper housing 220 at the upper end 240b of the central housing 240.

In some embodiments, after assembly, some portions of the outer housing 120 can be substantially fluid resistant or can be configured and arranged to limit fluid influx within the outer housing 120. For example, in some embodiments, a user can employ the illumination system 100 in some outdoor applications, and the illumination system 10 can be configured and arranged to limit an amount of precipitation from entering the outer housing 120 and contacting some elements positioned within the outer housing 120. As described in further detail below, at least a portion of the elements positioned within the outer housing 120 can be operated by an electrical current, and, accordingly, preventing a substantial volume of precipitation from contacting the elements can at least partially reduce risks of short circuit events and other damage to the illumination system 100. In this instance, ingress of fluid precipitation, dirt or debris into the outer housing 120 of the illumination system 100 can be at least partially prevented using a cap 222. As illustrated in at least FIGS. 12A-12B, a cap 222 can form a portion of the outer housing 120 and can be coupled to the upper housing 220.

In some embodiments, the outer housing 120 can include one or more exhaust venting slots. In some embodiments, the cap 222 can be coupled to the upper housing 220 that includes a separation distance forming a fluid outlet 225. In some embodiments, the cap 222 can comprise at least one support spacer 224 and at least one extension 223, each of which can be positioned between the upper housing 220 and the cap 222 when the cap 222 is coupled to the upper housing 220. In some embodiments, the upper housing 220 can include at least one vent or slot forming an air outlet comprising the fluid outlet 225. In some embodiments, the fluid outlet 225 can comprise a single vent or slot. In some further embodiment, the fluid outlet 225 can comprise a plurality of vents or slots. In some embodiments, the fluid outlet 225 can extend around a partial circumference of the upper housing 220. In some other embodiments, the fluid outlet 225 can extend around the circumference of the upper housing 220. In some embodiments, the combined open area of multiple exhaust venting slots can be equal or greater than 5.72 square inches.

In some embodiments, the central housing 240 can comprise one or more sides 242. In some embodiments, the central housing can include a plurality of coupled sides 242. For example, in some embodiments, the central housing 240 can comprise a substantially octagonal shape comprising a plurality of sides (i.e., eight substantially equally-sized sides 242). In some embodiments, the cross sectional shape of the central housing 240 is substantially octagonal. In some other embodiments, at least some portion of the outer housing 120 (including for example the central housing 240) can be configured in other shapes such as spherically shaped (with one substantially circumferentially continuous side 242), a pyramidal shape (that could include at least three sides), regular or irregular polygonal shaped (with various numbers of sides 242 depending on the number of vertices), or in other shapes. Further, in some embodiments, the outer housing 120 can be configured and arranged to take any shape desired by a manufacturer or the user.

In some embodiments, the outer housing 120 can be configured so that at least a portion of the outer housing 120 elements are substantially integral with each other. In other embodiments, at least some of the outer housing 120 elements are manufactured separately and later coupled together to form the outer housing 120. Moreover, in some embodiments, the outer housing 120 can comprise multiple materials, such as a metal, an alloy, a polymer (such as a polycarbonate), a thermoset or thermoformed resin, a composite, a glass or glass-ceramic, and other materials. Further, in some embodiments, different portions of the outer housing 120 can comprise different materials (i.e., a combination of one or more of the aforementioned materials). For example, in some embodiments, the upper housing 220 can comprise a metal-containing material and the base 200 can comprise a polymer (such as a polycarbonate) or vice versa. In some embodiments, each portion of the outer housing 120 can comprise substantially similar materials. For example, in some embodiments, the base 200 and the upper housing 220 can each comprise a metal-containing material or a polymer-containing material. In some embodiments, any portion of the outer housing 120 can include a material that comprises a metal exterior with protective finish. In some embodiments, the finish and color can be created using a powder coated finish that matches other exterior metal parts.

As described earlier, in some embodiments, the outer housing 120 can at least partially enclose one or more functional devices. In some embodiments, these functional devices can comprise one or more light sources, and/or one or more systems for expelling pest repellent. In some embodiments, the illumination system 100 can include one or more light sources that are at least partially hidden within the outer housing 120, and are configured and arranged to emit light that can be diffused and reflected from at least a portion of the outer housing 120. Further, in some embodiments, the illumination system 100 can include a system that is capable of expelling at least one pest repellent and is at least partially hidden within the outer housing 120.

Figure 12B:
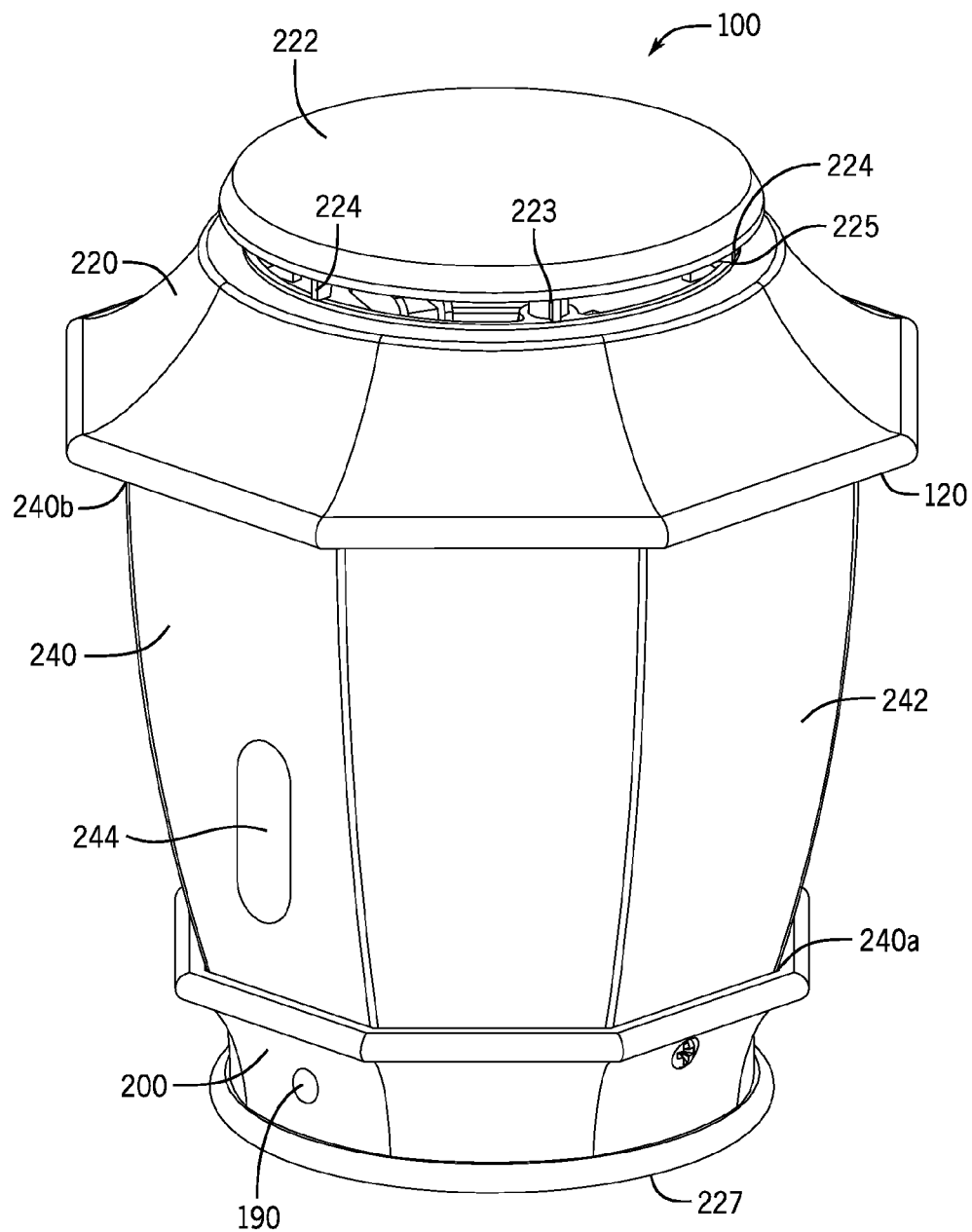
FIG. 12B is a perspective view of an illumination system of FIG. 12A including an opaque central housing according to another embodiment of the invention.

Some embodiments accomplish light diffusion and illumination from the outer housing while providing a structure that enables one or more functional devices to be at least partially shielded from view. In some embodiments, the central housing 240 can comprise a substantially opaque configuration. FIG. 12B is a perspective view of an illumination system 100 of FIG. 12A including an opaque central housing 240 according to another embodiment of the invention. As illustrated, in some embodiments, the central housing 240 can comprise a material that is at least partially translucent or opaque. For example, in some embodiments, the central housing 240 can include at least one window 242 that is at least partially translucent or opaque. In some other embodiments, the central housing 240 can comprise a material that includes portions that are translucent or opaque, and portions that are substantially optically transparent. In some embodiments for example, at least a portion of the at least one window 242 can comprise glass (e.g., any form of glass, such as substantially transparent glass or substantially translucent glass, such as frosted glass), polycarbonate, or other materials through which illumination can be visible to observers. In some embodiments, the central housing 240 can comprise a glass with matte exterior finish. In some embodiments, the glass can be acid etched or sandblasted.

In some embodiments, specific portions of the at least one window 242 can comprise regions that are optically transparent. For example, in some embodiments the at least one window 242 can comprise a viewing region 244. In this instance, a user can be provided with an option to peer into the illumination system 100 to check the status or function of one or more devices enclosed within the outer housing 120. Moreover, as illustrated in FIG. 12B, in some embodiments, the illumination system 100 can include at least one indicator 190. In some embodiments, the operational status of one or more devices enclosed within the outer housing can be monitored using at least one indicator 190. In some embodiments, the at least one indicator 190 can be used to monitor the operational status of a system that is capable of expelling at least one pest repellent, and is at least partially hidden within the outer housing 120.

Figure 13:
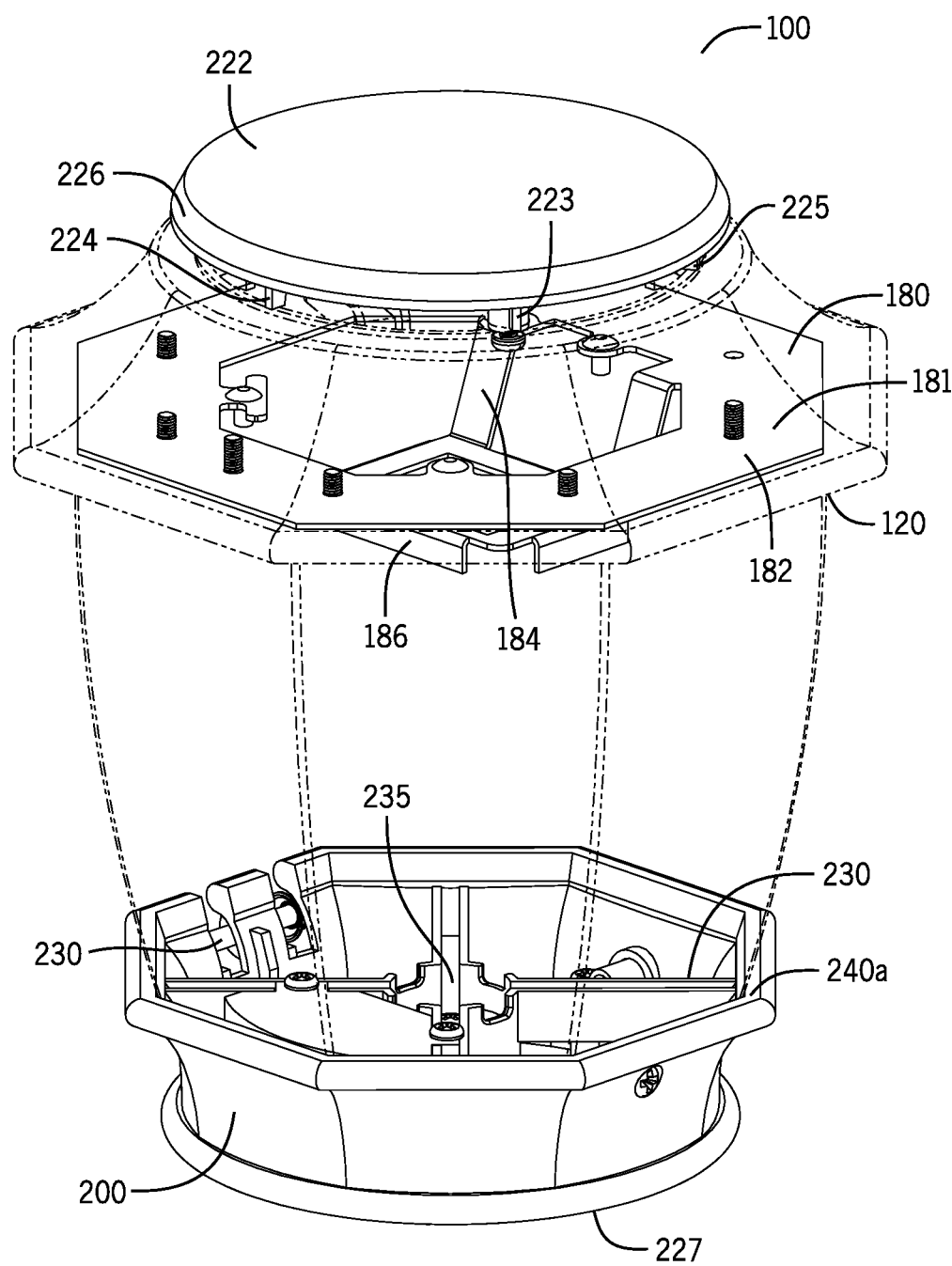
FIG. 13 is a perspective internal view of the illumination system of FIG. 12A according to another embodiment of the invention.

In some embodiments, an evaporator system 180 can be at least partially disposed within the central housing 240 so that at least a portion of the evaporator system 180 can be obscured from view. For example, FIG. 13 illustrates a perspective internal view of the illumination system of FIG. 12A, where the upper housing 220 and the central housing 240 are shown in dotted lines and transparent to represent their location with respect to components within the outer housing 120 that would normally be shielded from view (by at least the central housing 240 that can be opaque and/or substantially light blocking). The evaporator system 180 can be coupled to the outer housing 120, and can include a support assembly 181 that comprises a support base 182, at least one support member 184 extending from the support base 182, and an evaporator support 186 that can be coupled to the at least one support member 184. As illustrated in FIG. 14, showing a bottom perspective view of the illumination system 100 of FIG. 12A, an evaporator assembly 188 can be coupled to the evaporator support 186. FIGS. 13 and 14 also illustrate structural features of the base 200 that can be coupled to the lower end 240a of the central housing 240. For example, in some embodiments, the base 200 can comprise at least one support member 230 coupled to at least one support aperture 235 that can be used for coupling to one or more support structures. In some embodiments, the base 200 can also include at least one hinge 250 capable of being coupled to a hinge coupling 246 coupled to the central housing 240 to allow the central housing 240 to be pivoted about the base 200 to provide a user with access to the inside of the illumination system 100. Further, as shown in FIG. 14, the base 200 can include at least one fluid inlet 227. The base 200 can include one or more exhaust vents or slots forming the fluid inlet 227. For example, in some embodiments, the base 200 can include at least one fluid inlet 227 that can be configured to function as an air intake. In some embodiments, the at least one fluid inlet 227 can comprise a single vent or slot. In some further embodiments, the at least one fluid inlet 227 can comprise a plurality of vents or slots. In some embodiments, the at least one fluid inlet 227 can extend around a partial circumference of the base 200. In some other embodiments, the at least one fluid inlet 227 can extend around the circumference of the base 200. In some embodiments, the combined open area of multiple air intake slots can be equal or greater than 5.72 square inches.

In some embodiments, fluid entering the fluid intake 227 can pass into the inner housing 160 from the first aperture 169a and into the evaporator system 180, and can exhaust out of the inner housing 160 through the second aperture 169b, and through at least one vent or slot forming a fluid outlet 225. Further, in some embodiments, when provided with a repellent source, the evaporator assembly 188 can disperse one or more pest repellents that can flow out of the illumination system 100 through the fluid outlets 225, and fluid (e.g., air) can flow into the illumination system 100 from the at least one fluid inlet 227 in the base 200.

In some embodiments of the invention, the base 200 can include a metal with protective finish. For example, in some embodiments, the protective finish can comprise a finish and color that include a powder coat finish that matches other exterior metal parts of the illumination system 100. In some embodiments, the base 200 can be secured to a tubular metal stem or a short metal stem that can be coupled to a deck mounting flange with threaded pipe connections.

In some embodiments, the illumination system 100 can include one or more light sources. Some embodiments of the illumination system 100 can include one or more light sources comprising illumination devices positioned within the outer housing 120. As illustrated in FIG. 14, some embodiments of the illumination system 100 can include a plurality of illumination devices 140. As shown, in some embodiments, the illumination devices 140 can be coupled to the support base 182 of the support assembly 181, and can be distributed at a substantially equal distance apart, and can be positioned circumferentially within the central housing 240. In some other embodiments, more or less illumination devices 140 shown in FIG. 14 can be positioned within the central housing 240. Further, in some embodiments, the illumination devices 140 can be positioned coupled to other regions of the support base 182, to other components coupled to the support base 182, or can be coupled to other structures that can be enclosed within the outer housing 120.

In some embodiments, the illumination devices 140 and the evaporator system 180 can be controlled together or switched separately. For example, in some embodiments, the illumination devices 140 can be controlled with an on/off switch or timer (not shown), and the mosquito repellent vaporizer (the evaporator system 180) can be controlled by an on/off switch or conventional timer (not shown). As described earlier, and as illustrated in FIG. 12B, in some embodiments, the operational status of one or more devices enclosed within the outer housing 120 can be monitored using the aforementioned at least one indicator 190. In some embodiments, the at least one indicator 190 can be used to monitor the operational status of the evaporator system 180. In some embodiments, the at least one indicator 190 can light and be visible when the evaporator system 180 is activated. In some embodiments, the at least one indicator 190 can comprise an LED. For example, in some embodiments, operation of the evaporator system 180 can be indicated using the at least one indicator 190 that comprises a green LED pilot light. In other embodiments, the operation of the evaporator system 180 can be indicated using the at least one indicator 190 that can comprise other colored LED's. Further, as depicted in FIG. 12B, in some embodiments, the at least one indicator 190 can be located on the base 200, and can be positioned adjacent to at least one viewing region 244 on the central housing 240. In some other embodiments, the at least one indicator 190 can comprise more than one LED, an incandescent bulb, or a display (e.g., an LED display, or an LCD display, or an electroluminescent display). In some further embodiments, the at least one indicator 190 can be positioned on other regions of the illumination 100. For example, in some embodiments, the at least one indicator 190 can be positioned on other portions of the base 200 and/or on some portion of the central housing 240, or on some portion of the upper housing 220.

In some embodiments, the illumination system 100 can include at least one LED assembly 130 that can comprise at least one illumination device 140. Some embodiments of the illumination system 100 can include a plurality of LED assembly 130. As shown, in some embodiments, the at least one LED assembly 130 can be coupled to the support base 182 of the support assembly 181. The at least one LED assembly 130 can be distributed at a substantially equal distance apart, and can be positioned circumferentially within the central housing 240. In some other embodiments, more or fewer numbers of LED assembly 130 shown in FIG. 14 can be positioned within the central housing 240. In some embodiments, the LED assembly 130 can be coupled to the upper housing 220. In some other embodiments, the LED assembly 130 can be coupled to another portion of the outer housing 120. For example, in some embodiments, the LED assembly 130 can be positioned within the central housing 240, the base 200, or in both the base 200 and the central housing 240. In some embodiments, parts of the at least one LED assembly 130 can be integral, or can be made in one or more pieces, and fastened together with hidden fasteners or other means of assembly. Further, in some embodiments, the illumination devices 140 can be positioned coupled to other regions of the support base 182, to other components coupled to the support base 182, or can be coupled to other structures that can be enclosed within the outer housing 120.

In some embodiments, the LED assembly 130 can include a material that is capable of managing heat generated by the LEDs (illumination devices 140) without loss in mechanical and electrical properties. In this instance, the LED assembly 130 can comprise a plastic or other nonconductive material. In some embodiments, the illumination devices 14, 140 can include incandescent, fluorescent, compact fluorescent, halogen, and/or other lights and lamps. Further, these lights can comprise flood lights, globe lights, light-emitting diodes (LEDs), or other similar lighting apparatuses, including a combination of any of the above. Moreover, in some embodiments, the illumination systems 10, 100 can comprise other illumination configurations. For example, in some embodiments, the illumination systems 10, 100 can comprise a combination of LEDs and other illumination devices as disclosed in U.S. patent application Ser. Nos. 12/902,077 and 12/902,065. The entire contents of these applications are hereby incorporated by reference in this disclosure. Briefly, the illumination systems 10, 100 can comprise the capability to emit illumination at different intensities and at different times. Also, in some embodiments, the systems 10, 100 can radiate multiple colors of light at different intensities over a predetermined time period.

In some embodiments, the illumination devices 14, 140 can include a number of LEDs that is selected to meet a specified light output and light spread. For example, in some embodiments, a total number of LEDs can be selected to meet a total fixture light output that is 30 lumens as measured inside a 3-meter integrating sphere with absorption correction, and the LED life (to 80% of original brightness) can be a minimum of 1800 hours without LED color shift. In some embodiments, the LED color temperature can be 3000 K, and the color temperature may not exceed 100 K from one fixture to another fixture.

Figure 15B:
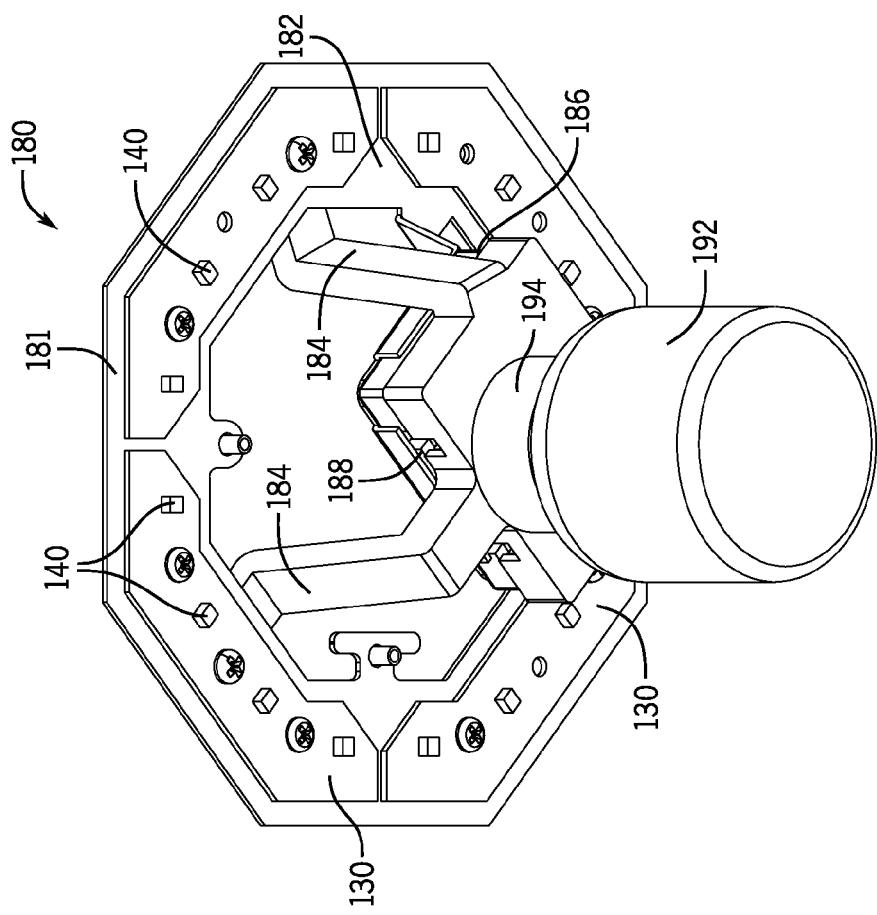
FIG. 15B is a bottom perspective view of a portion of an evaporator system according to one embodiment of the invention.
Figure 15A:
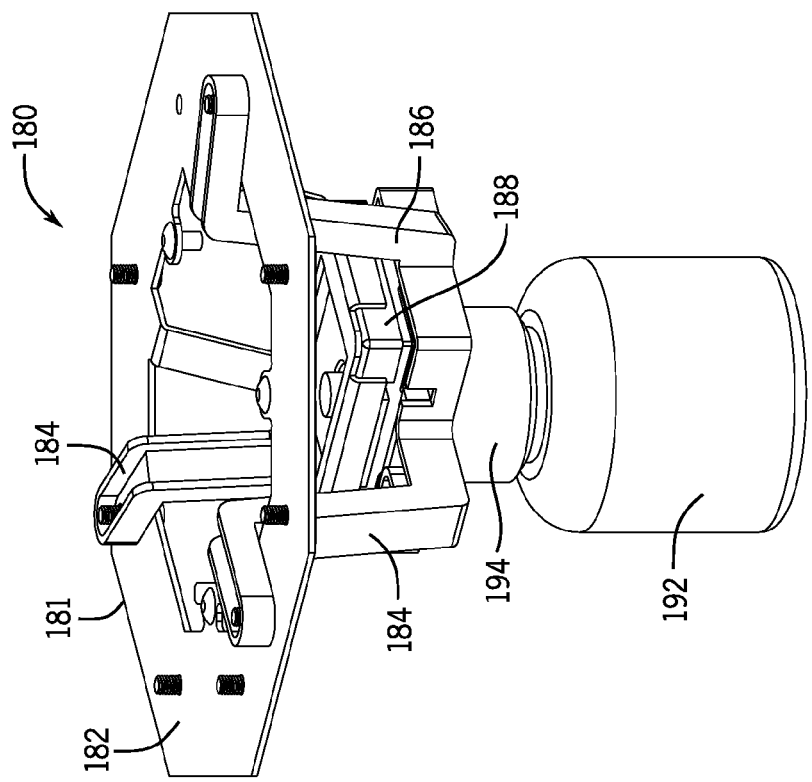
FIG. 15A is a perspective view of a portion of an evaporator system according to one embodiment of the invention.

Some embodiments of the invention include a repellent source coupled to the evaporator system 180. In some embodiments, by coupling a repellent source to the evaporator system 180, a pest repellent can flow from the source into the evaporator assembly 188. The evaporator system 180, as illustrated in FIG. 14, includes the evaporator assembly 188 that can be coupled to the evaporator support 186. FIG. 15A is a perspective view of a portion of the evaporator system 180, and FIG. 15B is a bottom perspective view of a portion of the evaporator system 180 according to another embodiment of the invention. As illustrated, in some embodiments of the invention, the evaporator system 180 includes the support assembly 181, support base 182, and at least one support member 184 extending from the support base 182. In some embodiments, the evaporator support 186 can be coupled to a reservoir 192 using an attachment cap 194.

In some embodiments, the reservoirs 60, 192 can contain any fluid, mist, liquid, or any other substance. In some embodiments, if the reservoir 192 contains at least one repellent, repellent can flow from the reservoir 192 through the attachment cap 194 and into the evaporator assembly 188. In some embodiments, when reservoir 192 is coupled to evaporator system 180, the evaporator assembly 188 can disperse one or more pest repellents that can flow out of the illumination system 100 through the fluid outlets 225. As used throughout, all references to the term "pest" should be understood to include pests of humans and animals (e.g., insects, rodents, arthropods, any disease-carrying animal or insect, or any other animal generally considered to be a conventional pest). In some embodiments, the pest-affecting substances can comprise a synthetic substance, an organic substance, a natural substance, and/or any other substance that can affect pest behavior.

In some embodiments, the reservoirs 60, 192 can contain a volatile fluid capable of being volatilized. By way of further example, in some embodiments, the reservoirs 60, 192 can comprise a volatile liquid that can include one or more pest-affecting substances. In some embodiments, the pest-affecting substance can function as a pest repellent, a pesticide (e.g., a compound capable of killing or substantially incapacitating a pest), a pest attractant (e.g., a compound capable of drawing insects near to the illumination system 10, 100), or any other substance capable of being recognized by a pest. For example, in some embodiments, the pest-affecting substance can comprise one or more of permethrin, bifenthrin, prallethrin, allethrin, esbiothrin, tretramethrin, d-tetramethrin, phenothrin, metofluthrin, metofluthrin and petroleum distillate, profluthrin, dimefluthrin, transfluthrin, imiprothrin, empenthrin, dichlorvos, tetfluthrin, phenothrin, cypermethrin, etofenprox, pacardin, n,n-diethyl-m-toluamide, N,N-diethyl-3-methylbenzamide, any pyrethroid-containing compound, any allyl sulfide, garlic oil, garlic paste, garlic emulsion, and any other conventional pest-affecting substance. In some further embodiments, the reservoirs 60, 192 can comprise a volatile liquid that can include one or more fragrances, deodorization substances, air sanitizers, aromatherapy substances, volatile medical compounds, or any combination thereof.

In some embodiments, the evaporator system 180 can comprise a positive temperature coefficient heating device. For example, in some embodiments, the heating device can comprise a positive temperature coefficient heating device with a part number Z26R 1072 supplied by Zobele (Zobele Industrie Chimiche S.P.A), with an electrical rating of 12V, 0.465 amps, 5.58 watts, and an operating temperature of 140° C. In some embodiments, the evaporator system 180 can include a conventional quick disconnect plug, allowing the evaporator system 180 to be available as a separate service part.

Figure 16A:
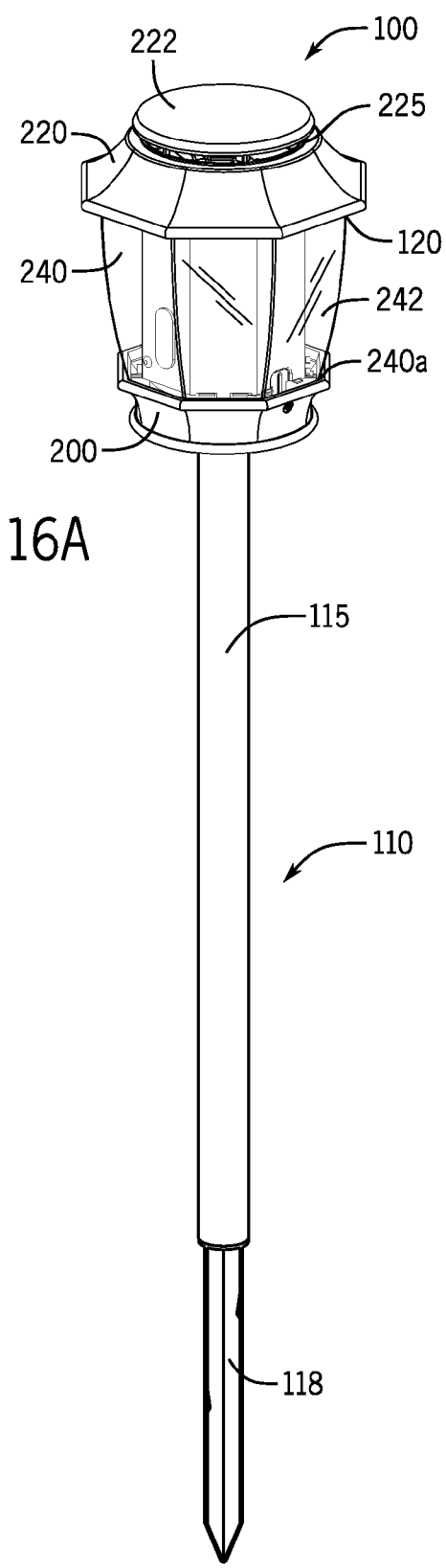
FIG. 16A is a perspective view of the illumination system of FIG. 12A coupled to a support structure according to another embodiment of the invention.
Figure 17:
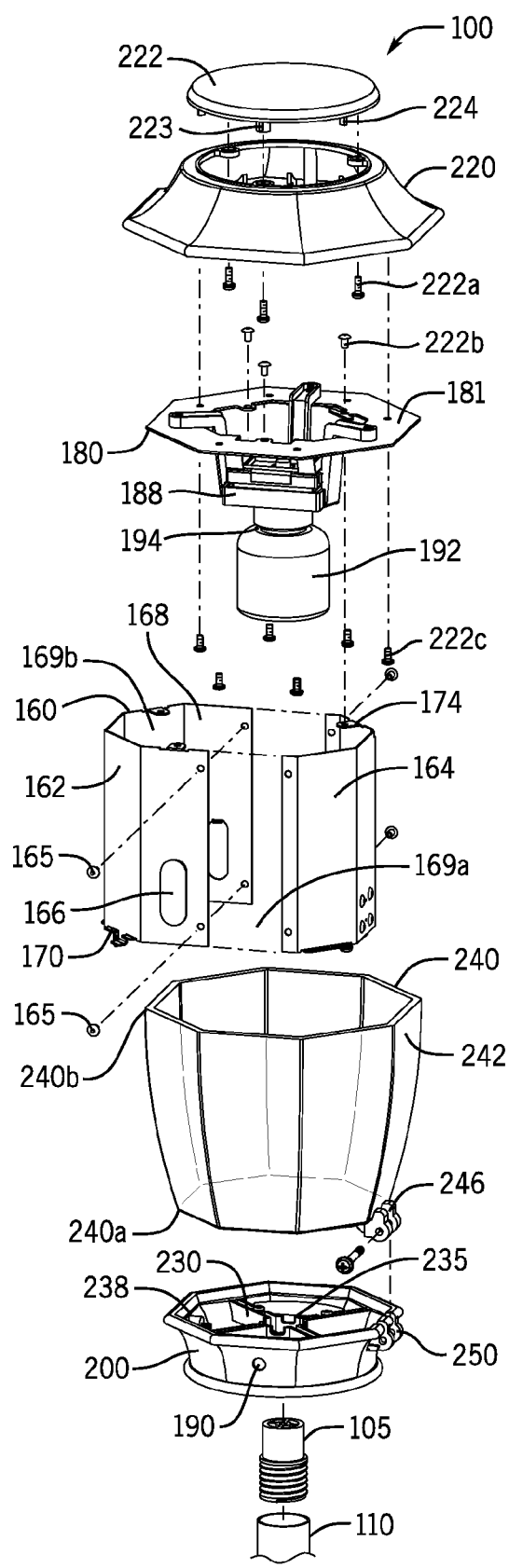
FIG. 17 is an exploded assembly view of an illumination system according to another embodiment of the invention.
Figure 21:
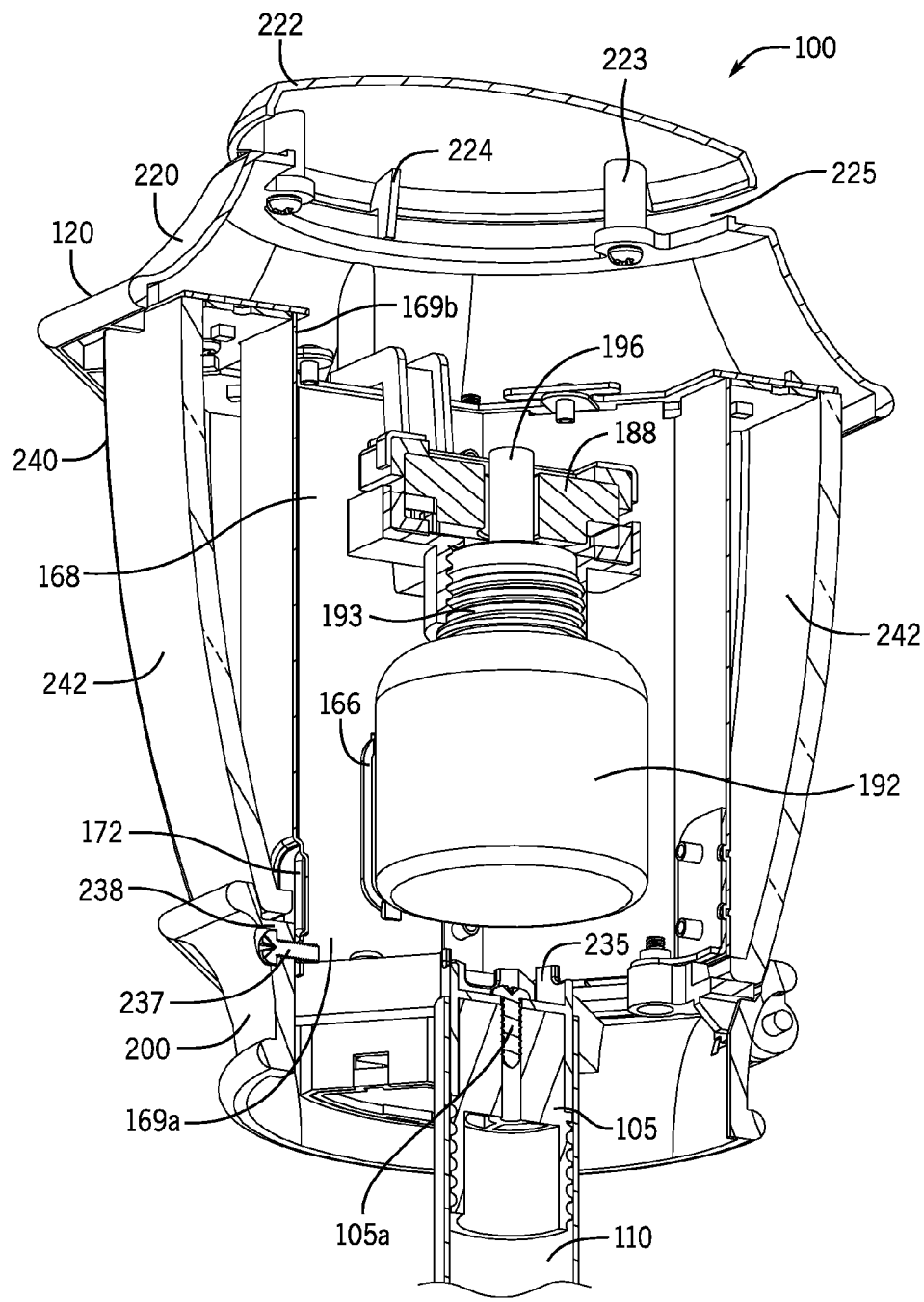
FIG. 21 is a partial cross-sectional view of the illumination system of FIG. 12A according to another embodiment of the invention.

In some embodiments, the illumination system 100 can be positioned (permanently or semi-permanently) using at least one support apparatus such as a ground stake or an optional deck mounting flange. In some embodiments, the illumination system 100 can include one or more fixtures that are designed to enable the illumination system 100 to be mounted to a ground surface or optionally to a deck or deck rail using a deck mounting flange (e.g., similar to the system 10 shown in FIG. 4A). For example, FIG. 16A is a perspective view of the illumination system of FIG. 12A coupled to a support structure 110, and FIG. 16B is a perspective view of the illumination system of FIG. 12B coupled to a support structure 110 according to another embodiment of the invention. As shown, some embodiments of the invention include a support structure 110 that includes at least a stem 115 coupled to a ground stake 118. In some embodiments, the ground stake 118 is threaded to couple with threads in the stem 115. In some embodiments, the illumination system 100 can be provided as a completely assembled device except for ground mounting stake 118 and tubular stem 115. In some embodiments of the invention, at least a portion of the support structure 110 can include a tubular metal stem 115. In some embodiments, the stem 115 can comprise a metal with protective finish, and can include a finish and color that comprises a powder coat finish that matches other exterior metal parts of the illumination system 100. In some embodiments, the stem 115 can comprise an approximate size of 25.4 mm outside diameter, and can be 46 cm in length. Further, in some embodiments, the stem 115 can be substantially free of burrs and sharp edges, and can be sized to fit a ground mounting stake and optional deck mounting flange. In some embodiments, connections to the base 200 and ground stake 118 can be made with male and female pipe threads. The threads can be generally free of powder coating, and may not be visible after product is assembled. In some embodiments, the stem 115 can be coupled to the illumination system 100 using one or more fasteners, clips, or other coupling mechanisms. In some embodiments, the stem 115 can couple to at least the support aperture 235 coupled to the at least one support member 230 in the base 200. Further, as depicted in the exploded view of an illumination system 100 shown in FIG. 17, in some embodiments, the stem 115 can couple to the support aperture 235 using a support coupler 105. In some embodiments, the support coupler 105 can be positioned in the support aperture 235 at one end, and can extend away from the base 200, and the stem 115 can be coupled to the other end of the support coupler 105. In some embodiments, the stem 115 and the support aperture 235 can be coupled using a pressure fit. In some embodiments, the stem 115 can coupled with the support coupler 105 using a pressure fit. In some further embodiments, the support aperture 235, the stem 115, and/or the support coupler 105 can be coupled using a thread. For example, as shown in FIG. 17, in some embodiments, at least one end of the support coupler 105 can include a thread that can be used to couple with the stem 115. Moreover, as shown in FIG. 21, illustrating a partial cross-sectional view of the illumination system 100 of FIG. 12A, in some embodiments, the support coupler 105 can be secured to the base 200 within the support aperture 235 using at least one fastener 105*a*. In this instance, the support coupler 105 can be inserted into the base 200 within the support aperture 235, secured with the at least one fastener 105*a*, and the stem 115 can be reversible threaded into the support coupler 105.

Figure 18:
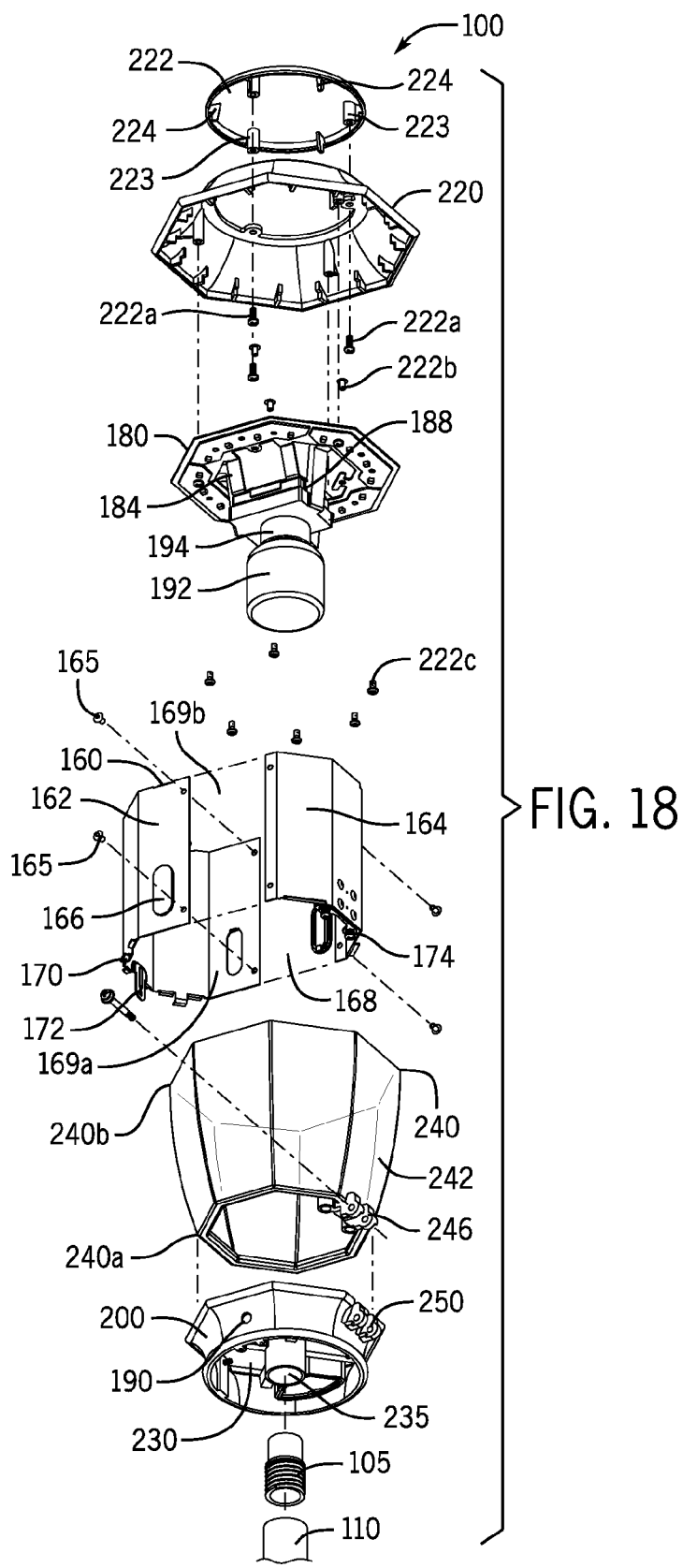
FIG. 18 is an exploded assembly view of an illumination system according to another embodiment of the invention.

Referring to the exploded assembly views of FIGS. 17 and 18, in some embodiments, the various components of the illumination system 100 can be assembled and coupled using one or more screws and/or fasteners. For example, in some embodiments, as described earlier, and illustrated in at least FIGS. 12A-12B, a cap 222 can form a portion of the outer housing 120 and can be coupled to the upper housing 220. The upper housing 220 can be coupled to the central housing 240 using conventional coupling technique, such as, but not limited to, conventional fasteners, welding, adhesives, brazing, snap-fittings, grille springs, etc. For example, in some embodiments, the upper housing 220 can be coupled to the central housing 240 via one or more conventional fasteners, such as screws, bolts, and/or nails (including screws 222*c*). Moreover, in some embodiments, the upper housing 220 can be reversibly coupled to the central housing 240 (using the screws 222*c*) so that a user can easily remove the upper housing 220 to access any elements coupled to, or disposed within, the central housing 240. Further, in some embodiments, the cap 222 can be coupled to the upper housing 220 using one or more of the extensions 223. In some embodiments, the extensions 223 can comprise screw receptacles, and the cap 222 can be secured to the upper housing 220 using screws 222*a* coupled into the extensions 223. In some embodiments, at least one support spacer 224 and at least one extension 223 can extend between the cap 222 and the upper housing 220. In some embodiments, the space between the cap 222 and the upper housing 220 (forming the fluid outlet 225) can be determined by the extent to which screws 222*a* extend into the at least one extension. Further, in some embodiments, the at least one support spacer 224 can coupled with the upper housing 220 to define minimum distance between the cap 222 and the upper housing 220.

In some embodiments, the outer housing 120 of the illumination system 100 can enclose other functional and/or structural components. For example, in some embodiments, the illumination system 100 can include an inner housing 160 disposed within the outer housing 120, configured and arranged to couple with the base 200. Furthermore, in some embodiments, the inner housing 160 can define a chamber 168, and can comprise a first fluid aperture 169*a* positioned substantially adjacent to the base 200 and the lower end 240*a* of the central housing 240, and a second fluid aperture 169*b* positioned substantially adjacent to the upper housing 220 and the upper end 240*b* of the central housing 240.

In some embodiments, the evaporator system 180 can be at least partially disposed within the chamber 168 within the outer housing 120 and the inner housing 160. By positioning the evaporator system 180 within the inner housing 160, and where in some embodiments, the inner housing 160 comprises a material that is substantially opaque or substantially blocking to visible light, the evaporator system 180 can be at least partially obscured from view so that anyone adjacent to the illumination system 10 cannot readily visualize the evaporator system 180. Furthermore, at least some of the fluids or other substances that can be contained within the evaporator system 180 (for instance one or more repellents within the reservoir 192) can be at least partially susceptible to ultra-violet radiation (e.g., sunlight). Accordingly, by disposing the evaporator system 180 within the inner housing 160, the evaporator system 180 can be at least partially removed from direct exposure to ultra-violet radiation.

In some embodiments, at least some sides of the inner housing 160 can comprise substantially angled, bent, or an otherwise non-planar configuration, although, in other embodiments, at least a portion of the sides of the inner housing 160 can comprise a substantially planar configuration. As depicted in FIGS. 17 and 18, in some embodiments, the inner housing 160 can comprise a plurality of coupled portions. For instance, in some embodiments, the inner housing 160 can include at least a first portion 162 and a second portion 164 capable of being coupled together to form the inner housing 160. In some embodiments, the first portion 162 and second portion 164 can be coupled using one or more fasteners 165 (e.g., screws or bolts). In some other embodiments, first portion 162 and second portion 164 can be coupled using brazing, welding, adhesives, conventional fasteners, nails, snap-fittings, springs, etc.).

In some embodiments, the inner housing 160 can be coupled to the base 200 and/or the central housing 240. For example, as shown in FIGS. 17-18, in some embodiments, the inner housing 160 can comprise one or more coupling flanges 170, one or more positioning flanges 172, and one or more positioning recesses 174. Moreover, in some embodiments, the base 200 can comprise one or more receiving apertures for coupling to the inner housing 160. Accordingly, in some embodiments, the inner housing 160 can be inserted within the outer housing 120 so that the coupling flanges 170 of the inner housing 160 substantially align with the receiving apertures of the base 200 so that the two elements can be coupled together (e.g., via coupling structures such as adhesives, conventional fasteners, welds, braze, etc.). Moreover, in some embodiments, the evaporator system 180 can be coupled to at least one of the positioning recesses 174 using one or more screws 222*b*.

Figure 19:
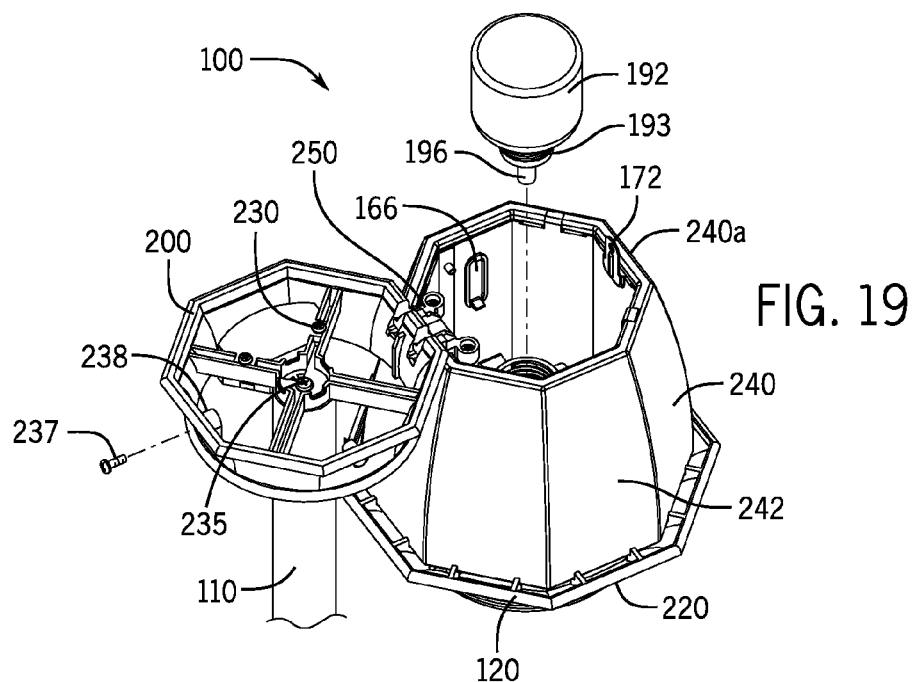
FIG. 19 is a perspective view of the illumination system of FIG. 12A in an open position with a representation of reservoir insertion according to another embodiment of the invention.
Figure 20:
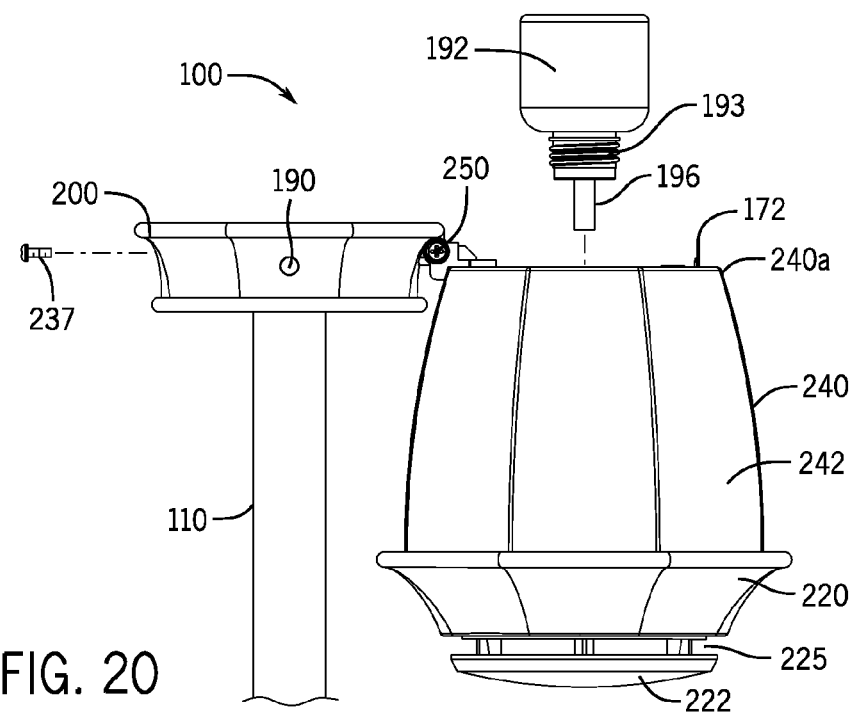
FIG. 20 is a side view of the illumination system of FIG. 12A in an open position with a representation of reservoir insertion according to another embodiment of the invention.

In some embodiments, the base 200 can be reversibly coupled to at least a portion of the inner housing 160. In some embodiments, a user can use the at least one hinge 250 to gain access to the reservoir 192. For example, in some embodiments, a user can insert and/or replace the reservoir 192. In some embodiments, a user can use the at least one hinge 250 to gain access to the reservoir 192 to check the status of the reservoir 192. In some embodiments, the illumination system 100 can be reversible opened by rotating the central housing 240, inner housing 160, and upper housing 220 away from the base 200 using the hinge 250. For example, FIG. 19 is a perspective view of the illumination system 100 of FIG. 12A in an open position with a representation of reservoir insertion according to another embodiment of the invention, and FIG. 20 is a side view of the illumination system 100 of FIG. 12A in an open position with a representation of insertion of the reservoir 192 according to another embodiment of the invention. As described earlier, a user can be provided access to the inside of the illumination system 100 by pivoting the central housing 240, inner housing 160, and upper housing 220 using the at least one hinge 250. Further, as shown in the partial cross-sectional view of the illumination system 100 of FIG. 21, when the illumination system 100 is in a closed position, the lower end 240*a* of the central housing 240 is substantially circumferentially coupled to the base 200, and a removeable coupler 237 can be coupled through a coupling aperture 238 in the base 200 to couple with the flange 172 of the inner housing 160. In this way, a user can deploy the removeable coupler 237 to secure the central housing 240 to the base 200, and/or can remove the coupler 237 when access is required to the chamber 168.

In some embodiments, the reservoir 192 can comprise an opaque or substantially transparent material that can enable a user to assess the amount of fluid (e.g., such as repellent) remaining within the reservoir 192. In some embodiments, a user can check the status of the reservoir 192 without opening the illumination system 100. As described earlier, some specific portions of the at least one window 242 can comprise a viewing region 244. The viewing region 244 can enable a user the option to peer into the illumination system 100 to check the level of fluid remaining within the reservoir 192. Some embodiments of the invention include at least one metal or plastic light reflector that allows a user to view fluid level inside the reservoir 192 in the evaporator system 180 without need to disassemble the illumination system 100. This can serve multiple functions within the illumination system 100. For example, in some embodiments, the reflector can conceal the reservoir 192, provide ease wire management, prevent shadowing on the central housing 240, and guide fluid flow through the system 100. In some embodiments, the reflector is marked or "keyed" to assure alignment with the viewing region 244 in the central housing 240. In this instance, the central housing 240 is also marked or "keyed" to specific engagement with the light reflector. In some embodiments, the inner housing 160 comprises the light reflector. Further, in some embodiments, the light reflector includes at least one viewing aperture 166. In some embodiments, the viewing region 244 is positioned on the at least one window 242 so that at least a portion of the viewing region 244 overlaps a line of sight of a user viewing through the viewing region and to view the at least one viewing aperture 166. In some embodiments, during assembly, the at least one viewing aperture 166 and the viewing region 244 are at least partially aligned to enable a user to view through the viewing region 244 and through the viewing aperture 166 to view the reservoir 192.

In some embodiments, the evaporator system 180 including the support assembly 181 comprising the evaporator support 186 coupled to the evaporator assembly 188 can be configured and arranged to hold a reservoir 192 capable of holding 40 mil of fluid. In some embodiments, the reservoir 192 can be tamper resistant, and can include a collar (thread 193 with attachment cap 194) and at least one wick 196. In some embodiments, the support assembly 181 can allow the reservoir 192 to be removed and replaced periodically without the use of tools (e.g., without the use of screws or fasteners). As depicted in FIG. 21, illustrating a partial cross-sectional view of the illumination system 100, in some embodiments, the at least one wick 196 can be positioned through the evaporator assembly 188. In some embodiments, the at least one wick 196 can transport fluid (e.g., such as a pest repellent) from the reservoir 192 into the evaporator assembly 188. In this instance, the evaporator assembly 188 can heat the fluid and vaporize at least some of the fluid from at least one wick 196, and vaporized fluid can then be transported out of the illumination system through the fluid outlets 225.

Some embodiments of the invention can include repellent dispersal systems that do not include illumination devices. For example, some embodiments of the invention can include a repellent system 300 that comprises a low voltage outdoor fixture with integrated mosquito repellent release device designed for permanent installation. In some embodiments, the repellent is not included, but can be added by a user and/or a reseller, and/or or sold separately for installation in the repellent system 300. In some embodiments, installation of the repellent system 300 can be accomplished using a ground stake or an optional deck mounting flange. In some embodiments, the repellent system 300 can provide mosquito protection over a large radius, with the flexibility to have multiple devices wired in series to cover larger areas. In some embodiments, a control device can permit operation of the repellent device separately or together. Embodiments of the repellent system 300 including a mosquito repellent release device can be designed to secure repellent from children, and enable convenient replacement of a repellent container as needed. In some embodiments, the repellent system 300 includes a repellent fixture that is designed to be mounted with an in-ground stake or optional deck mounting flange for deck rail or post installation (e.g., similar to the system 10 shown in FIG. 4A and system 100 shown in FIGS. 16A and 16B).

Figure 22:
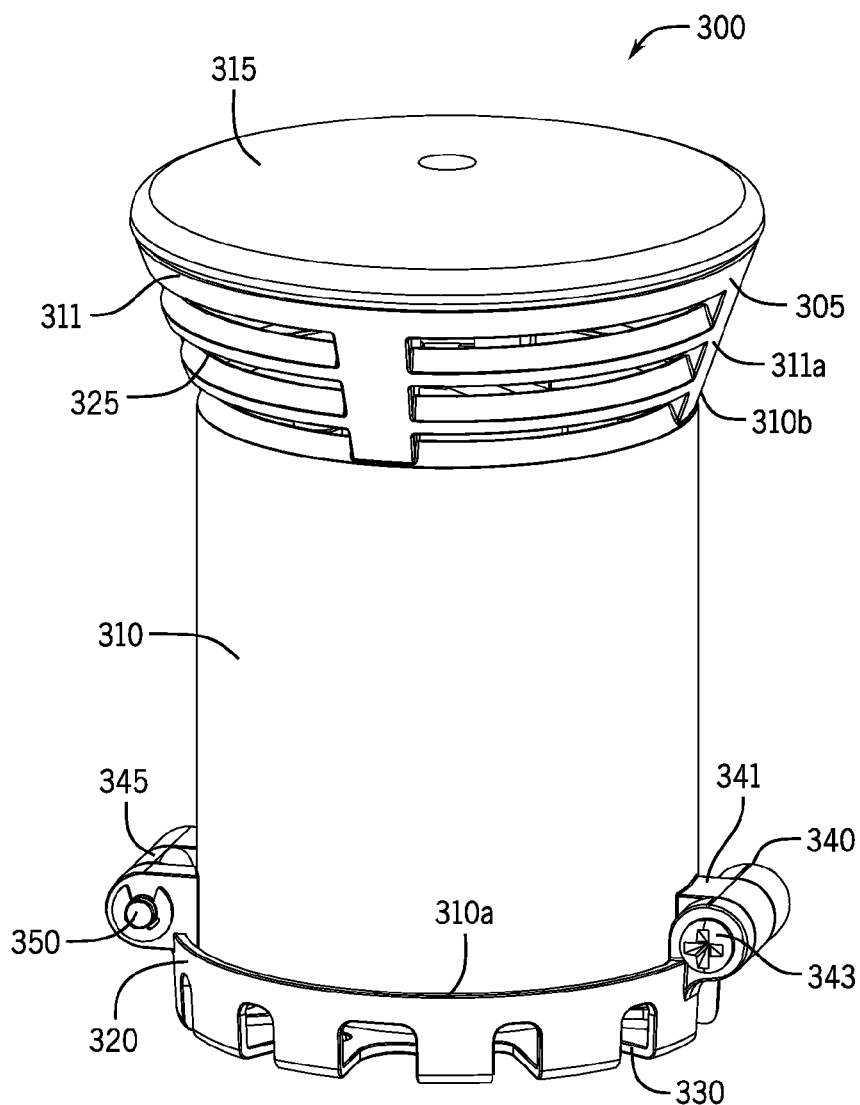
FIG. 22 is a perspective view of a repellent system according to further embodiments of the invention.
Figure 23:
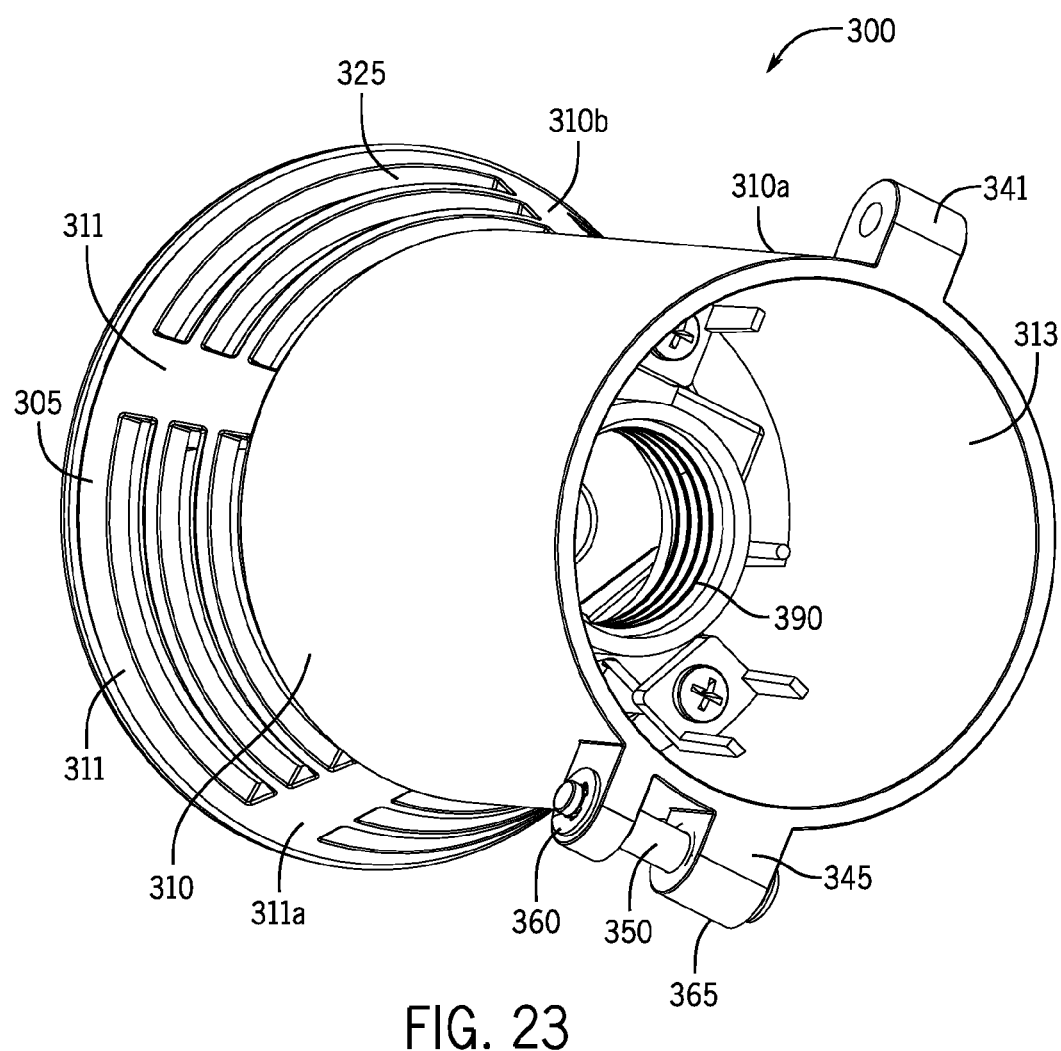
FIG. 23 is a bottom perspective view of the repellent system of FIG. 22 according to further embodiments of the invention.

Some embodiments of the invention can include an outer housing 305 comprising a vented top cover. For example, FIG. 22 is a perspective view of a repellent system 300 including the outer housing 305 that can include a main housing 310 at least partially enclosing an inner region 313 (shown in FIG. 23) that can include one or more functional devices. Some embodiments of the invention can include a main housing 310 that can coupled to a base 320 at the lower end 310a of the main housing 310. In some embodiments, the upper end 310b of the main housing can include an upper portion 311 that comprises at least one fluid outlet 325. In some embodiments, the upper portion 311 can be substantially flared. For example, as shown in FIG. 22, in some embodiments, the upper portion 311 can comprise a conical shape including a flared surface 311 a extending away from the upper end 310b of the main housing 310. In some other embodiments, the upper can comprise alternative shapes including being a cubical or square shape, or spherical, pyramidal, regular or irregular polygonal, or other shapes. In some embodiments, the upper portion 311 can be configured and arranged to take any shape desired by a manufacturer or the user.

Figure 24:
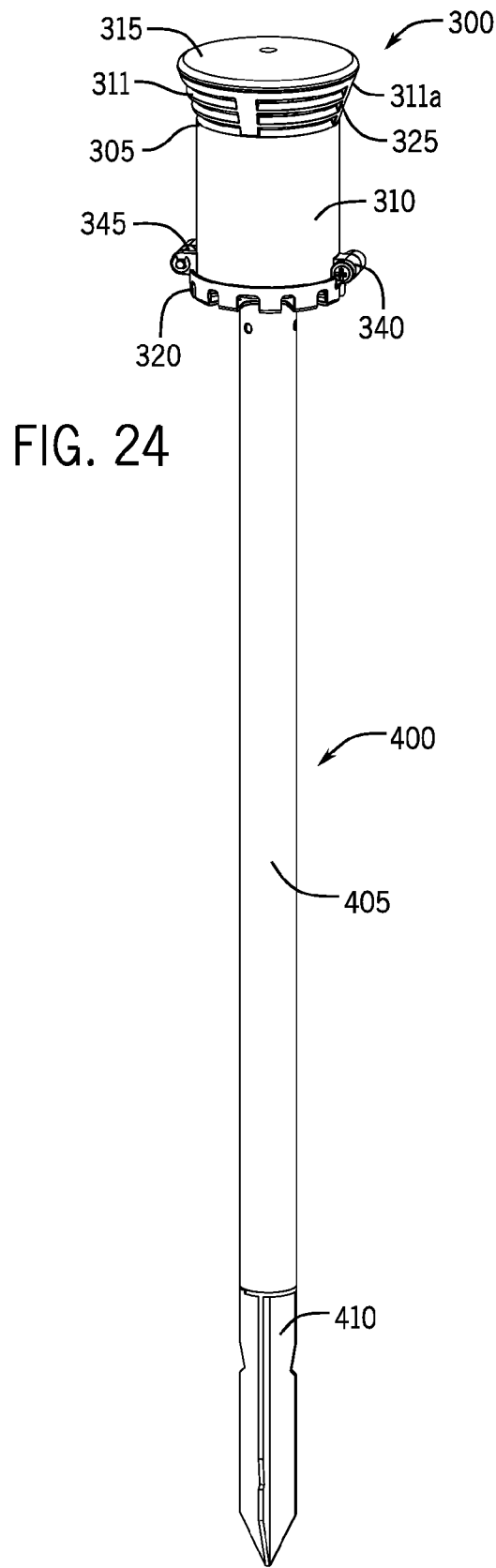
FIG. 24 is a perspective view of the repellent system of FIG. 22 coupled to a support structure according to further embodiments of the invention.

Some embodiments of the invention include a repellent system 300 that can comprise a support structure. FIG. 24 is a perspective view of the repellent system 300 of FIG. 22 coupled to a support structure 400 according to further embodiments of the invention. As illustrated, some embodiments of the invention include a repellent system 300 that can comprise a support structure 400 that includes at least a stem 405 coupled to a ground stake 410. In some embodiments, the ground stake 410 is threaded to couple with threads in the stem 405. In some embodiments, the repellent system 300 can be provided as a completely assembled device except for ground mounting stake 410 and tubular stem 405. In some embodiments of the invention, at least a portion of the support structure 400 can include a tubular metal stem 405. In some embodiments, the stem 405 can comprise a metal with protective finish, and can include a finish and color that comprises a powder coat finish that matches other exterior metal parts of the illumination system 100. In some embodiments, the stem 405 can comprise an approximate size of 25.4 mm outside diameter, and can be 46 cm in length. In some embodiments, the stem 405 can be substantially free of burrs and sharp edges, and can be sized to fit a ground mounting stake 410 and optional deck mounting flange. In some embodiments, connections to the base 320 and ground stake 410 can be made with male and female pipe threads. The threads can be generally free of powder coating, and may not be visible after product is assembled. In some embodiments, the stem 405 can be coupled to the repellent system 300 using one or more fasteners, clips, or other coupling mechanisms.

Figure 25:
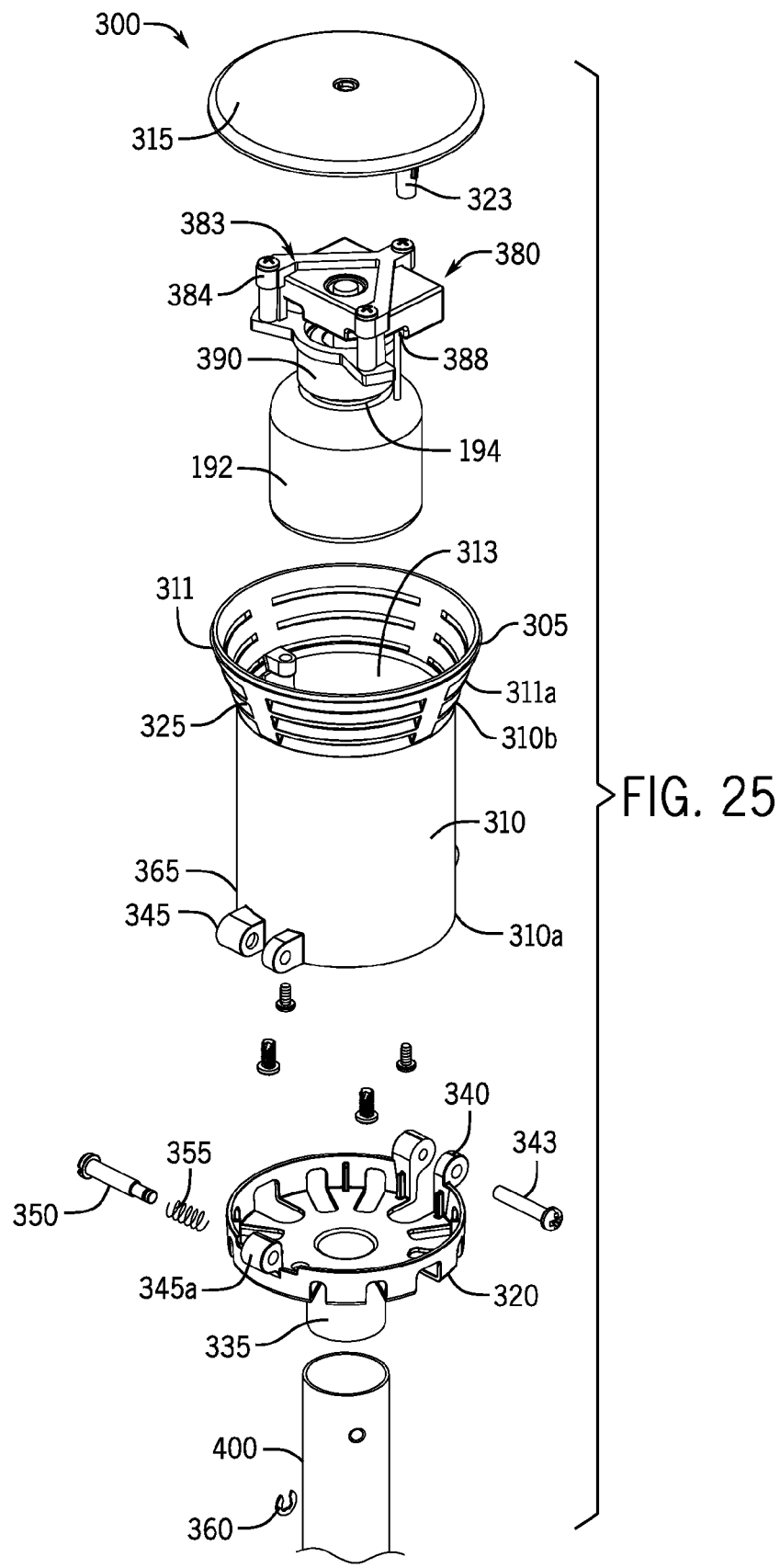
FIG. 25 is an exploded view of the repellent system of FIG. 22 according to further embodiments of the invention.
Figure 26:
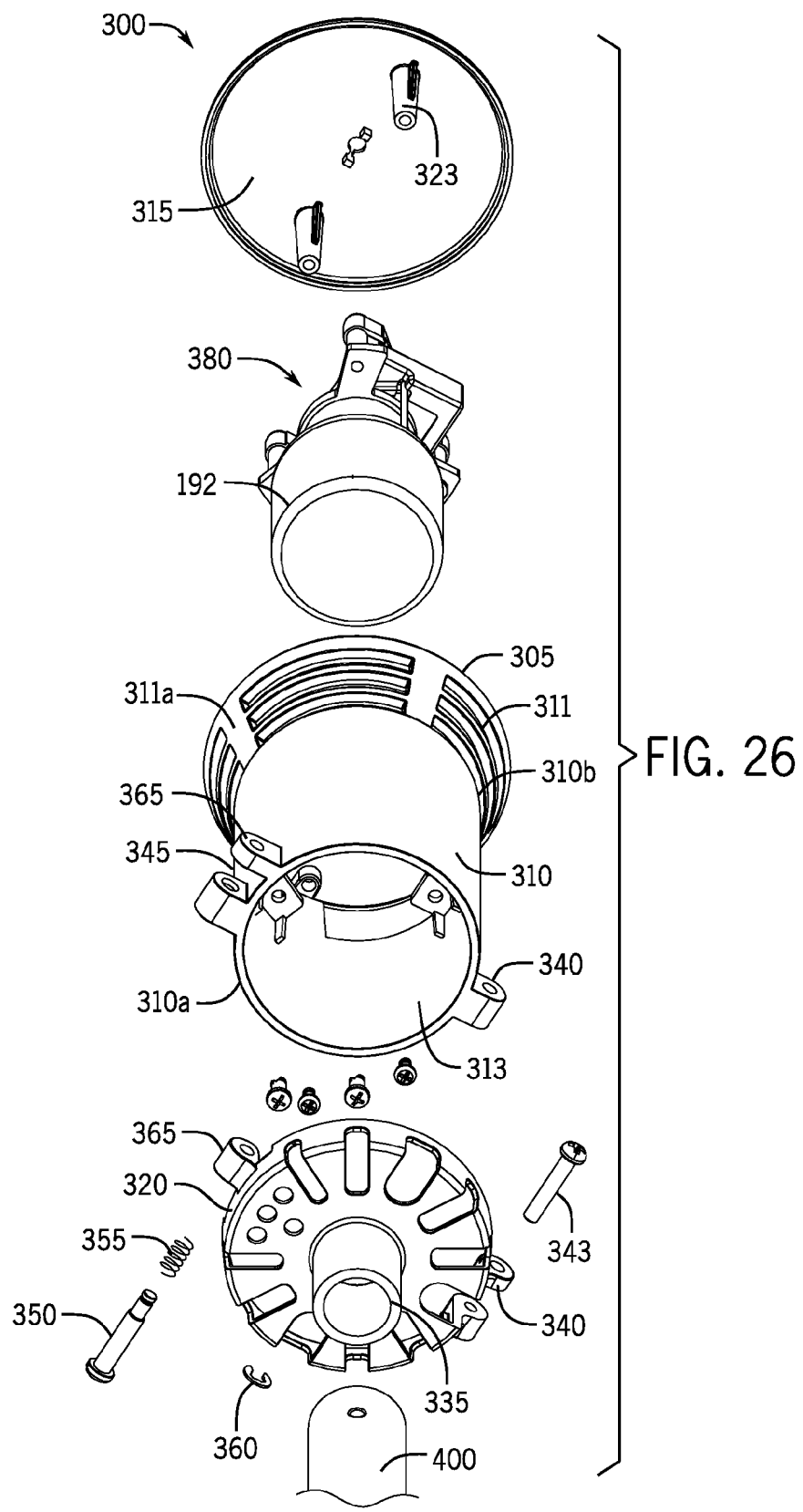
FIG. 26 is an exploded view of the repellent system of FIG. 22 according to further embodiments of the invention.

In some embodiments, the stem 115 can couple to the base 320 using a support in the base 200. FIGS. 25 and 26 show exploded views of the repellent system 300 of FIG. 22, illustrating that in some embodiments, the base 320 can include a support aperture 335 extending from the base 320, and away from the main housing 310. In some embodiments, the stem 405 can couple to the support aperture 335, and can be fastened by one or more conventional screws, bolts, rivets, or latches. In some embodiments, the stem 405 and the support aperture 335 can be reversibly coupled using a pressure fit. In some other embodiments, the stem 405 can be reversibly coupled with the support aperture 335 using a thread.

In some embodiments, the stem 115, 405 and/or the stake 118, 410 can comprise an injection molded, high impact plastic. Some embodiments of the stem 115, 405 and/or the stake 118, 410 can be black with matte and/or can include a glossy finish. Some embodiments include a stake 118, 410 that is capable of being forced into medium density soil without damage to the stake 118, 410. In some embodiments, the stake 118, 410 can include an operating temperature range of −30° F. to 120° F. In some embodiments, one end of stake 118, 410 can include a pointed tip to allow it to be pushed into the ground. In some embodiments, the other end can be threaded to fit mating threads of the stem 115, 405. In some embodiments, a molded-in flanged stop can be provided to prevent the stake 118, 410 from being inserted too far into the stem 115, 405. Some embodiments of the invention include a stem 115, 405 and/or a stake 118, 410 that can include an exit opening for passage of electrical wiring. In some embodiments, the stem 115, 405 can include openings where electrical wiring can enter and exit. For example, in some embodiments, electrical wires can be provided for the illumination devices 140 and the evaporator system 180 in the illumination systems 10, 100, and/or the repellent system 380 in the repellent system 300. For example, in the illumination system 100, electrical wiring can be routed through one or more fixtures in the base 200, and exit through the tubular stem 115 and ground stake 118 or optional deck mounting flange. In some embodiments, low voltage field wiring can exit the illumination system 100 through the tubular metal stem 115, ground stake 118, and optional deck mounting flange.

In some embodiments, the outer housing 305 can include one or more exhaust venting slots. In some embodiments, the upper portion 311 of the main housing can comprise at least one vent or slot forming an air outlet comprising the fluid outlet 325. In some embodiments, the fluid outlet 325 can comprise a single vent or slot. In some further embodiment, the fluid outlet 325 can comprise a plurality of vents or slots. In some embodiments, the fluid outlet 325 can extend around a partial circumference of the upper portion 311 of the main housing 310. In some other embodiments, the fluid outlet 325 can extend around the circumference of the upper portion 311 of the main housing 310. In some embodiments, the combined open area of multiple exhaust venting slots (forming the fluid outlet 325) can be equal or greater than 5.72 square inches.

Some embodiments of the invention include a repellent system 300 including at least one covering. In some embodiments, after assembly, some portions of the outer housing 305 can be substantially fluid resistant or can be configured and arranged to limit fluid influx within the outer housing 305. For example, in some embodiments, a user can employ the repellent system 300 in some outdoor applications, where it can be configured to limit or substantially eliminate precipitation from entering the outer housing 305. For example, ingress of fluid precipitation, dirt or debris into the outer housing 305 of the repellent system 300 can be at least partially prevented using a cap 315. As illustrated in at least FIGS. 22, 24-26, a cap 315 can form a portion of the outer housing 305, and can be coupled to the upper portion 311 of the main housing 310. In some embodiments, the cap 305 can be coupled to the upper portion 311 of the main housing 310 using at least one extension 323. For example, in some embodiments, the cap 315 can be secured to the upper portion 311 using one or more screws, bolts, or other conventional fasteners by coupled through the at least one extension 323.

In some embodiments, the repellent system 300 can include at least one hinge 340 to allow the main housing 310 to be rotated about the base 320 to provide a user with access to the inside of the repellent system 300. Moreover, in some embodiments, the repellent system 300 can also include at least one latch 345 to secure the base 320 to the main housing 310. The at least one hinge 340 can include hinge coupler 341 extending from the main housing 310 (e.g., see FIG. 23) that can be coupled to the base 320 using a hinge bolt 343. In some embodiments, the latch 345 can comprise a latching coupler 365 extending from the main housing 310 and can be coupled to the base 320 by coupling to the latch aperture 345a extending from the base 320. In this instance, a latch bolt 350 can pass through the latching coupler 365 and the latch aperture 345a to couple and secure the main housing 310 to the base 320. As illustrated in FIG. 25, the latch 345 can include at least one spring 355 that can be positioned over a portion of the latch bolt 350. Further, the latch 345 can also include at least one washer 360 coupled to the latch bolt 350 and the latching coupler 365. In this instance, the at least one spring 355 can provide a release force to assist a user in securing and releasing the latch bolt 350, and the at least one washer 360 can assist in coupling the latch bolt within the latch 345.

In some embodiments, the base 320 can include at least one fluid inlet 330. In some embodiments, the base housing 300 can include one or more vents or slots forming the fluid inlet 330. For example, in some embodiments, the base 320 can include at least one fluid inlet 330 forming an air intake. In some embodiments, the at least one fluid inlet 330 can comprise a single vent or slot, and in some further embodiment, the at least one fluid inlet 330 can comprise a plurality of vents or slots. In some embodiments, the at least one fluid inlet 330 can extend around a partial circumference of the base housing 300. In some other embodiments, the at least one fluid inlet 330 can extend around the circumference of the base 320. In some embodiments, the combined open area of multiple air intake slots can be equal or greater than 5.72 square inches.

Some embodiments include at least one repellent source positioned within the repellent system 300. In some embodiments, air entering the at least one fluid intake 330 can pass into a repellent source, and can exhaust out through at least one vent or slot forming the fluid outlet 325. In some embodiments, when the repellent system 300 is provided with a repellent source, one or more pest repellents can flow out of the repellent system 300 through the fluid outlets 325, and fluid (e.g., air) can flow into the repellent system 300 from the at least one fluid inlet 330 in the base 320. As depicted in the exploded assembly views of FIGS. 25 and 26, and in FIGS. 27 and 28, in some embodiments, an evaporator system 380 can be coupled to the repellent system 300 within the inner region 313. In some embodiments, an evaporator system 380 can be at least partially disposed within the main housing 310 so that at least a portion of the evaporator system 380 can be obscured from view. Further, in some embodiments, the main housing comprises a material that is substantially blocking to visible light and/or ultra-violet light. In some embodiments, at least some of the fluids or other substances that can be contained within the evaporator system 380 (for instance one or more repellents within the reservoir 192) can be at least partially susceptible to degradation by ultra-violet radiation (e.g., sunlight). Accordingly, by disposing the evaporator system 380 within the main housing 310, the evaporator system 380 can be at least partially shielded from direct exposure to ultra-violet radiation. In some other embodiments, the main housing 310 can comprise a material that is at least partially translucent or opaque. In this instance, the main housing 310 can comprise glass (e.g., any form of glass, such as substantially frosted glass), polymer, metal or other materials that can at least partially block visible light from entering and exiting the main housing 310.

Figure 27:
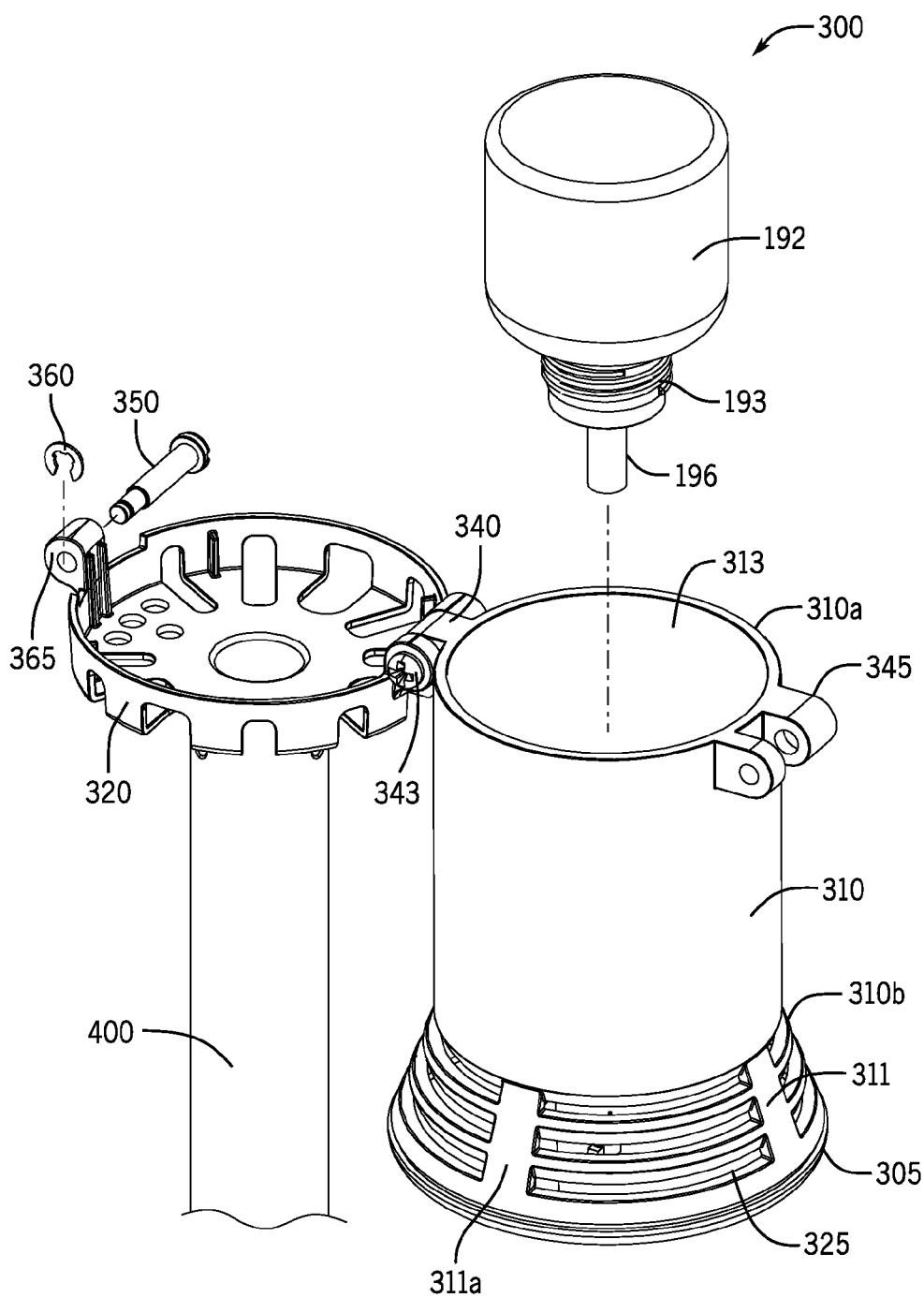
FIG. 27 is a perspective view of the repellent system of FIG. 22 in an open position with a representation of reservoir insertion according to further embodiments of the invention.
Figure 28:
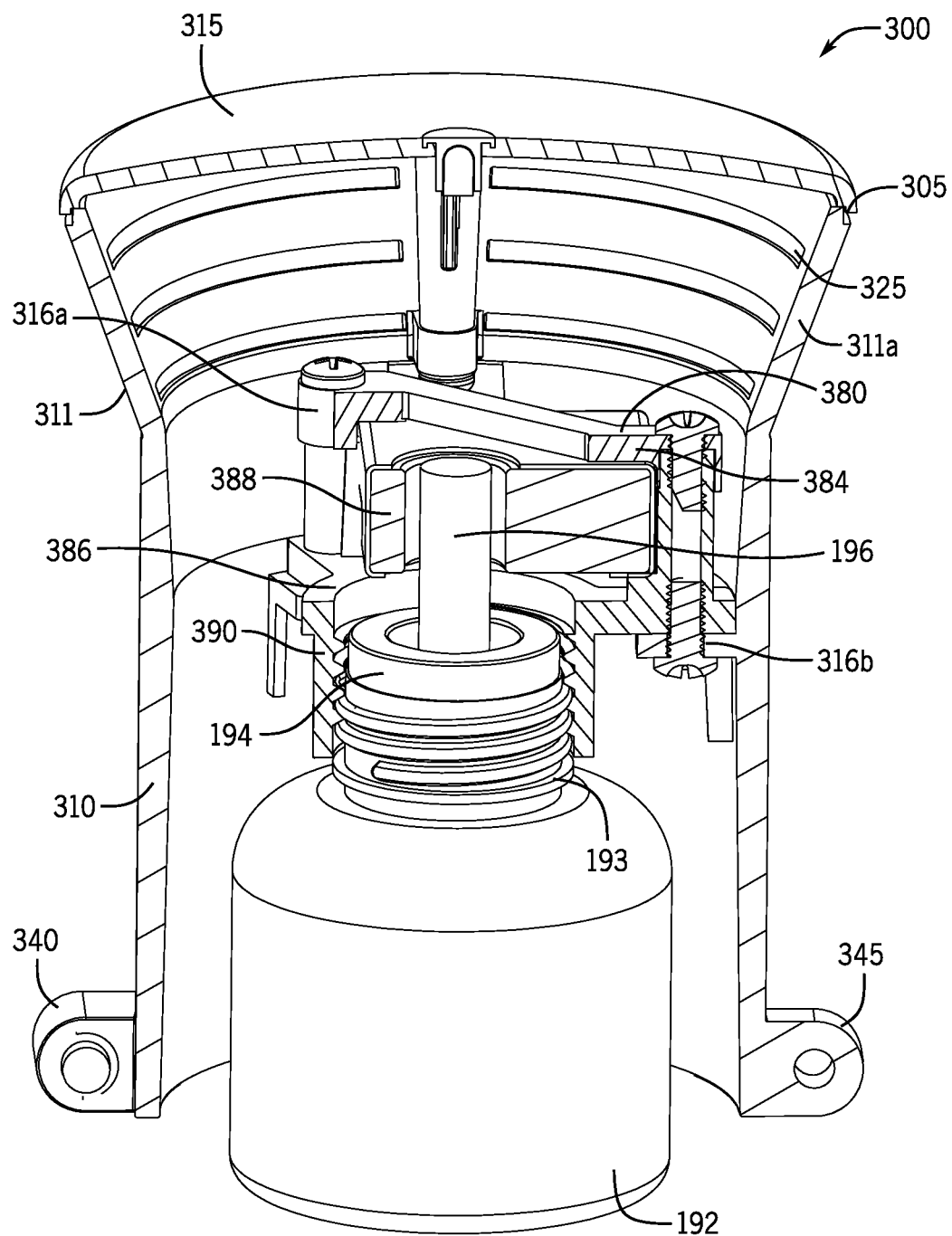
FIG. 28 is a partial cross-sectional view of the repellent system of FIG. 22 showing following the reservoir insertion represented in FIG. 27 according to further embodiments of the invention.

FIG. 27 is a perspective view of the repellent system 300 of FIG. 22 in an open position with a representation of insertion of the reservoir 192 according to further embodiments of the invention. In some embodiments, the repellent system 300 can be opened by a user to insert and/or replace the reservoir 192. In some embodiments, the evaporator system 380 can include a support assembly 382 that comprises at least one support member 384, and an evaporator support 386 that can be coupled to the at least one support member 384. As illustrated in FIG. 28, showing a partial cross-sectional view of the repellent system of FIG. 22, an evaporator assembly 388 can be coupled to and supported by an evaporator support 386, which can be further coupled to a reservoir coupling 390. In some embodiments, a user can install the reservoir 192 by coupling the attachment cap 194 to the reservoir coupling 390. As shown in FIG. 28 illustrating a partial cross-sectional view of the illumination system 100, in some embodiments, the reservoir coupling 390 can be threaded, and the attachment cap 194 can be coupled to the reservoir coupling 390 using the thread 193. As illustrated in FIG. 28, in some embodiments, when the repellent system 300 is closed, the at least one wick 196 can be positioned through the evaporator assembly 388. In some embodiments, at least one wick 196 can be at least partially disposed within the reservoir 192. As shown in FIG. 28, in some embodiments, the at least one wick 196 can extend at least a length of the reservoir 192. For example, in some embodiments, the at least one wick 196 can comprise a length that is greater than the length of the reservoir 192. In some embodiments, the at least one wick 196 can be configured and arranged to enable transfer of the volatile fluid from within the reservoir 192 to a position outside of the reservoir 192. For example, because the at least one wick 196 can at least partially extend out of the reservoir 192, the at least one wick 196 can function to absorb the volatile fluid within the reservoir 192 and transfer the fluid outside of the reservoir 192 (e.g., via capillary action, diffusion, etc.). In this instance, the evaporator assembly 388 can heat the fluid and vaporize at least some of the fluid from at least one wick 196, and vaporized fluid can be transported out of the illumination system through the fluid outlets 325.

In some embodiments of the invention, the at least one wick 62 of system 10, or the at least one wick 196 of systems 100, 300 can comprise any substantially absorbent material such as felt, cotton, cloth, pulp, paper, a porous resin (polypropylene foam, urethane foam, etc.), un-woven fabric, asbestos, porous ceramics, synthetic fiber (nylon, polyester, polypropylene, etc.), natural fibers, (wool, silk, cotton, hemp, etc.), inorganic substances, or any combination thereof.

In some embodiments, the illumination systems 10, 100 and repellent system 300 can include a specific level of performance and/or reliability. For example, in some embodiments, the illumination systems 10, 100 and repellent system 300 can meet an international protection rating IP55. The systems 10, 100 and repellent system 300 can be configured and arranged to be dust protected so that it does not enter in sufficient quantity to interfere with the satisfactory operation of the product. Further, the illumination systems 10, 100 and repellent system 300 can prevent water ingress from a low pressure water jets from all angles, and can include design must drain holes that prevent accumulation. The illumination systems 10, 100 and repellent system 300 can include an operating temperature range that can be −30° F. to 120° F. in direct sunlight. The systems 10, 100 and repellent system 300 can be configured and arranged to so that outside surfaces are able to be cleaned with soap and water. Further, all painted parts and fasteners to can be configured and arranged to pass a 150 hour salt spray test (to oxidation or red rust).

In some embodiments, the systems 10, 100 and repellent system 300 can be available in a black or a bronze colored finish. Some embodiments include metal components that are aluminum with a powder coated finish. Polymer-based components can be injection molded, and can pass a UV resistance test without yellowing for 5 years, and can maintain mechanical properties when operated at temperatures between −30° F. and 120° F., 20% to 100% RH. All fasteners can be metal, minimum #6 with Phillips head, and all exposed fastener heads (visible after unit is assembled) can include a colored finish. In some embodiments, the systems 10, 100 and repellent system 300 can be operated using an operating voltage of 12 volts±2 volts, and the total connected load can be 0.60 amps maximum at 12 volts.

The following description is intended as an example of some operations of the illumination systems 10, 100 and is not intended to limit this disclosure. In some embodiments, the illumination system 10, 100 can provide both illumination and protection from some pests. The systems 10, 100 can provide illumination or pest protection at any given time. For example, the illumination systems 10, 100 can provide illumination only or the illumination systems 10, 100 can provide pest protection only. In some embodiments, the illumination systems 10, 100 can provide both illumination and pest protection.

As previously mentioned, in some embodiments, the reservoir 60, 192 can contain a pest-affecting substance, such as an insecticide or an insect repellent. The pest-affecting substance can comprise one or more of any of the previously-mentioned substances or any other conventional pest-affecting substance. For example, with regard to the illumination system 10, in some embodiments, the user can activate the evaporator member 64 (e.g., via a switch, remotely, automatically via a timer or some other trigger, etc.) and, because the at least one wick 62, which draws up the pest-affecting substance from the reservoir 60, is substantially adjacent to the evaporator member 64, the evaporator member 64 can volatize at least a portion of the pest-affecting substance disposed on or within the at least one wick 62. Further, air can circulate through the inlets 66 and first aperture 50 and receive at least a portion of the volatized pest-affecting substance and carry it out of the illumination system 10 via the outlets 68. Once outside of the outer housing 12, the air flow can disperse the pest-affecting substance within the local environment (e.g., within fifteen feet of the outer housing 12) to kill and/or repel pests (e.g., mosquitoes, ticks, spiders, etc.).

With regard to the illumination system 100 in some embodiments, the user can activate the evaporator system 180 (e.g., via a switch, remotely, automatically via a timer or some other trigger, etc.) and, because the at least one wick 196, which draws up the pest-affecting substance from the reservoir 192, is substantially adjacent to the evaporator assembly 188, the evaporator assembly 188 can volatize at least a portion of the pest-affecting substance disposed on or within the at least one wick 196. Further, air can circulate through the at least one fluid inlets 227, and through into the chamber 168 and over the evaporator assembly 188 so that at least a portion of the volatized pest-affecting substance can be carried out of the illumination system 100 via the at least one fluid outlets 225. Once outside of the outer housing 120, the air flow can disperse the pest-affecting substance within the local environment (e.g., within fifteen feet of the outer housing 120) to kill and/or repel pests (e.g., mosquitoes, ticks, spiders, etc.).

With regard to the repellent system 300, in some embodiments, the user can activate the evaporator system 380 (e.g., via a switch, remotely, automatically via a timer or some other trigger, etc.) and, because the at least one wick 196, which draws up the pest-affecting substance from the reservoir 192, is substantially adjacent to the evaporator assembly 388, the evaporator assembly 388 can volatize at least a portion of the pest-affecting substance disposed on or within the at least one wick 196. Further, air can circulate through the at least one fluid inlets 330, and through into the inner region 313 and over the evaporator assembly 388 so that at least a portion of the volatized pest-affecting substance can be carried out of the repellent system 300 via the at least one fluid outlets 325. Once outside of the main housing 310, the air flow can disperse the pest-affecting substance within the local environment (e.g., within fifteen feet of the main housing 310) to kill and/or repel pests (e.g., mosquitoes, ticks, spiders, etc.).

In some embodiments, a plurality of illumination systems 10, 100, or repellent systems 300 can be combined to provide a substantially pest-free area. For example, as shown in FIG. 5, the illumination systems 10 can be disposed along a perimeter of a desired area (e.g., an outdoor area such as a deck, a patio, or other area capable of human occupation) and each of the illumination systems 10 can produce volatized pest repellent and illumination. In some embodiments, the illumination systems 10 can be disposed a distance apart so that a perimeter of volatized pest repellent released for each of the illumination systems 10 can substantially abut the perimeter of volatized pest repellent released by neighboring illumination systems 10, as represented by the circles shown in FIG. 5. As a result of the substantially continuous perimeter of pest repellent, at least a portion of the pests (e.g., mosquitoes, ticks, spiders, etc.) can be repelled and humans can gather within the perimeter to avoid encounters with the pests. Although FIG. 5 depicts the range of volatized pest repellent as approximately fifteen feet, the illumination system 10 can be configured to produce ranges greater or lesser than fifteen feet (e.g., by modulating the power of the evaporation member 64 when releasing volatized pest repellent). Moreover, the illumination system 10 can also provide illumination for this substantially pest-free area.

Additionally, the illumination system 10, 100, and repellent system 300 can be configured to provide long-term pest protection. In some embodiments, the reservoir 60 of the system 10, and the reservoir 192 of the systems 100, 300 can be configured to contain enough pest repellent for long-term use. For example, the reservoir 60, 192 can be configured to contain about 90 days worth of pest repellent for volatization by the low-voltage evaporator member 64 (system 10), or evaporator assembly 188 (system 100), or evaporator system 388 (system 300). Accordingly, by providing a reservoir 60, 192 configured to contain a volume of pest repellent that can last for a significant portion of an outdoor season, the user can enjoy the benefits of the system 10, 100, 300 without the need for disassembly to routinely re-fill the reservoir 60 (system 10), 192 (system 100, 300).

Figure 29:
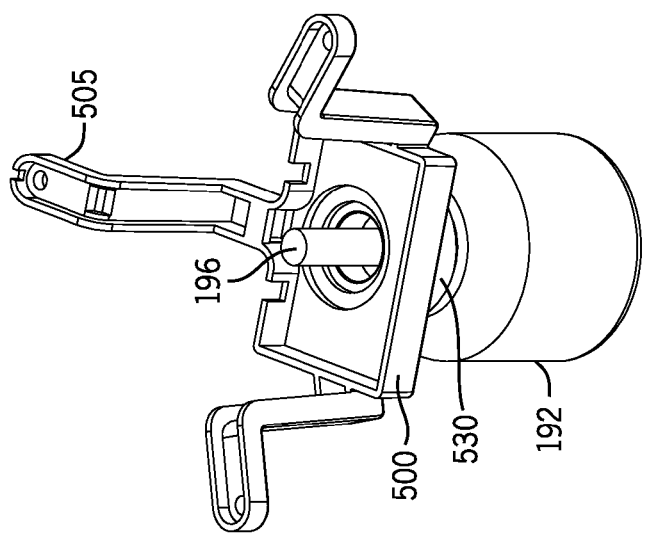
FIG. 29 depicts an evaporator support coupled to a reservoir in accordance with at least one embodiment of the invention.
Figure 32:
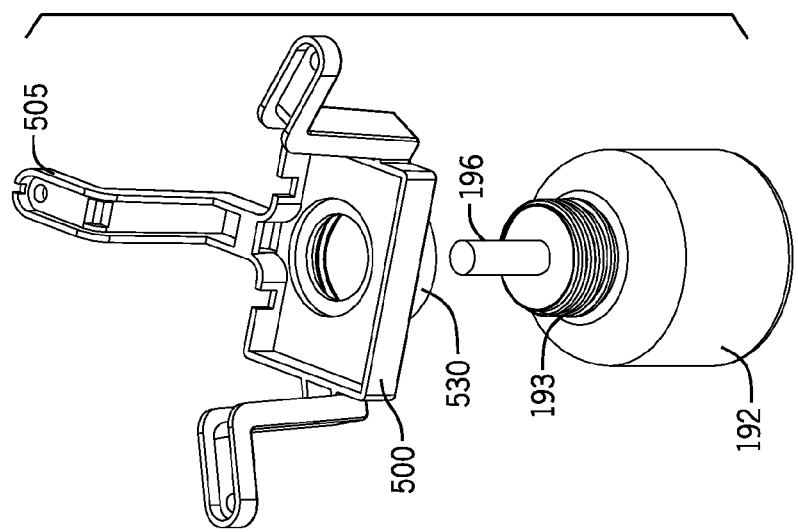
FIG. 32 depicts an assembly perspective view of the evaporator support and reservoir of FIG. 29 in accordance with at least one embodiment of the invention.
Figure 35:
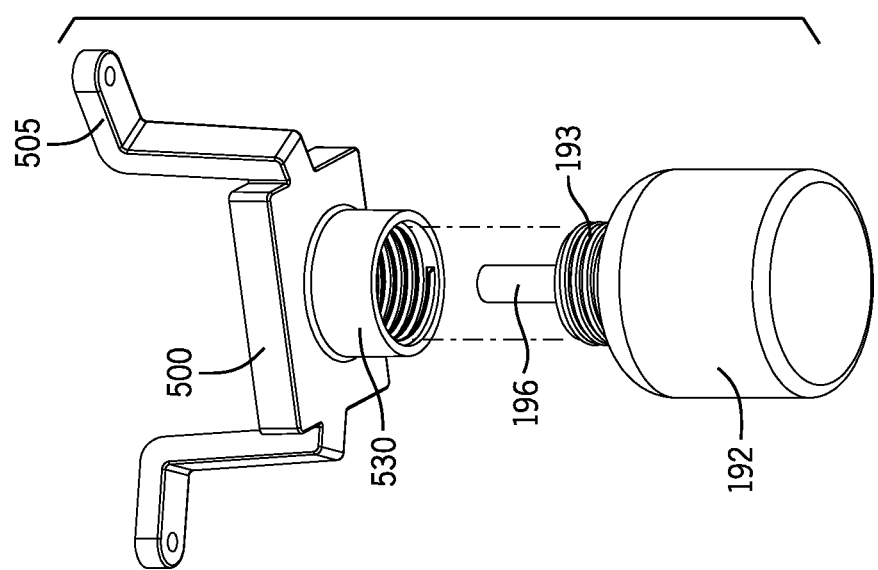
FIG. 35 depicts an assembly perspective view of the evaporator support and reservoir of FIG. 29 in accordance with at least one embodiment of the invention.

In some embodiments, the illumination system 10, 100, and/or the repellent system 300 can be configured to be coupled to refillable reservoirs or non-refillable (i.e. disposable) reservoirs. For example, in some embodiments, the reservoir 60 of the system 10, and/or the reservoir 192 of the systems 100, 300 can be configured to be refillable or non-refillable (i.e. reservoir 60 of the system 10, and/or the reservoir 192 of the systems 100, 300 can be configured to be disposable once empty of fluid). In the instance of refillable systems, a user can refill the reservoirs 60, 192 when they are depleted, or to top-off after partial use. For example, FIG. 29 depicts an evaporator support 500 coupled to a reservoir 192 that can be used with the evaporator assembly 188 of system 100. Further, FIGS. 32 and 35 depict assembly perspective views of the evaporator support 500 and reservoir 192 of FIG. 29 in accordance with at least one embodiment of the invention. As illustrated, in some embodiments the evaporator support 500 can comprise at least one support member 505 (for coupling with a support base 182), and a coupled attachment cap 530 for coupling to the thread 193 of the reservoir 192. As shown in FIG. 29, once the reservoir 192 is coupled to the evaporator support 500, the wick 196 is positioned through the evaporator support 500 to enable it to be positioned within an evaporator assembly (such as the evaporator assembly 188 of the evaporator system 180 of system 100). During use, a user can at any time, decouple the reservoir 192 from the evaporator support 500. In some embodiments, a user can couple a fluid-filled reservoir 192 to the evaporator support 500, and later decouple an empty or partially full reservoir 192 from the evaporator support 500. In some embodiments, a user can refill the reservoir 192, and attach the reservoir 192 to the evaporator support 500.

Figure 31:
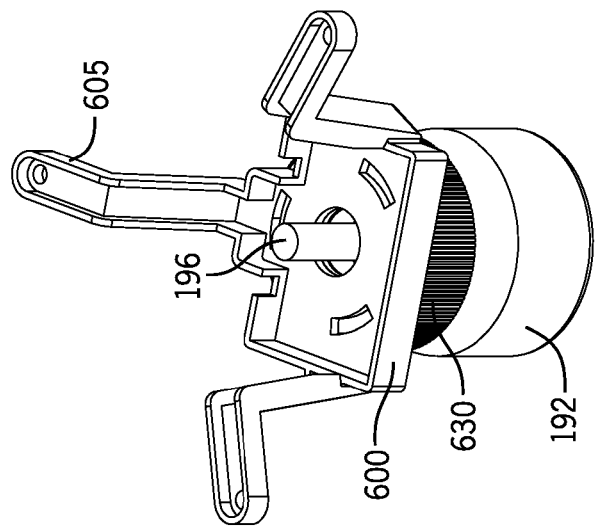
FIG. 31 depicts a lockable evaporator support and attachment cap coupled to a reservoir in accordance with at least one embodiment of the invention.
Figure 30:
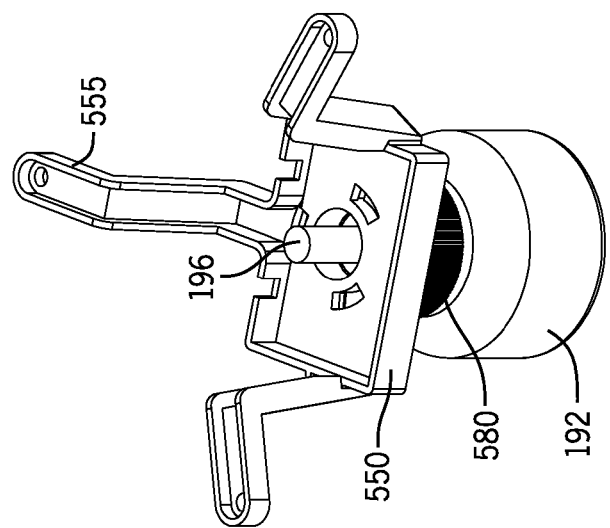
FIG. 30 depicts a lockable evaporator support and attachment cap coupled to a reservoir in accordance with at least one embodiment of the invention.
Figure 34:
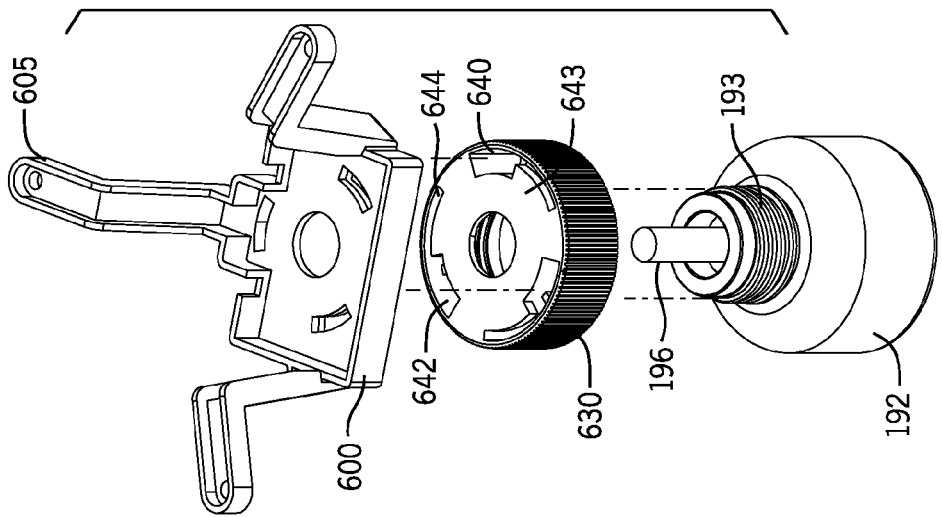
FIG. 34 depicts an assembly perspective view of the lockable evaporator support and attachment cap with reservoir of FIG. 31 in accordance with at least one embodiment of the invention.
Figure 33:
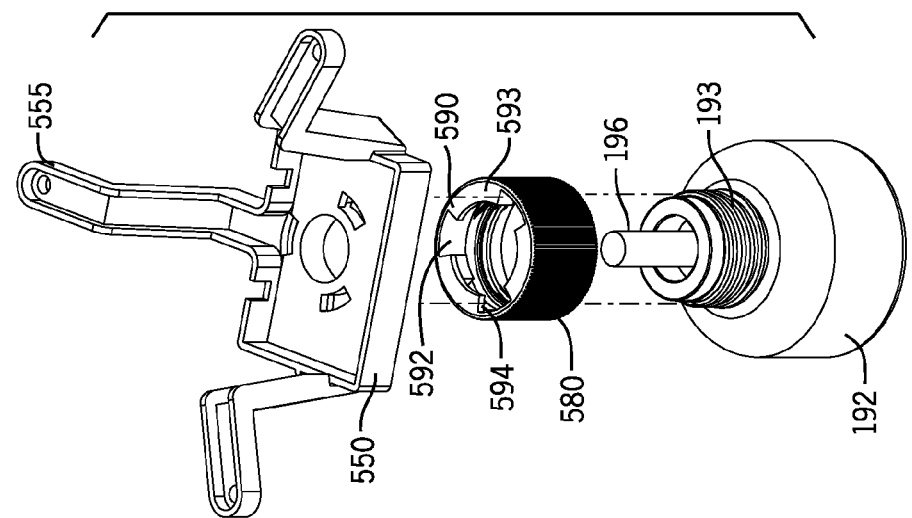
FIG. 33 depicts an assembly perspective view of the lockable evaporator support and attachment cap with reservoir of FIG. 30 in accordance with at least one embodiment of the invention.
Figure 37:
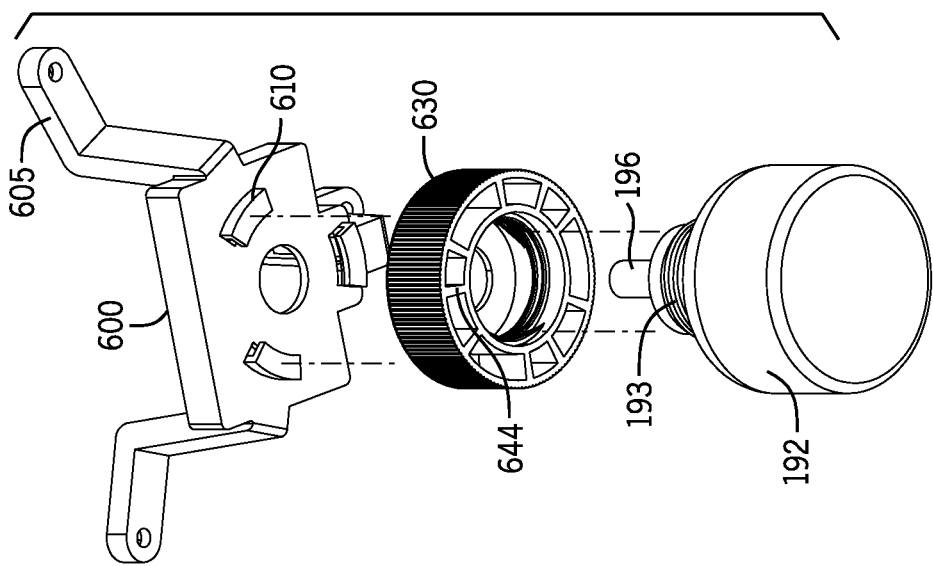
FIG. 37 depicts an assembly perspective view of the lockable evaporator support and attachment cap with reservoir of FIG. 31 in accordance with at least one embodiment of the invention.
Figure 36:
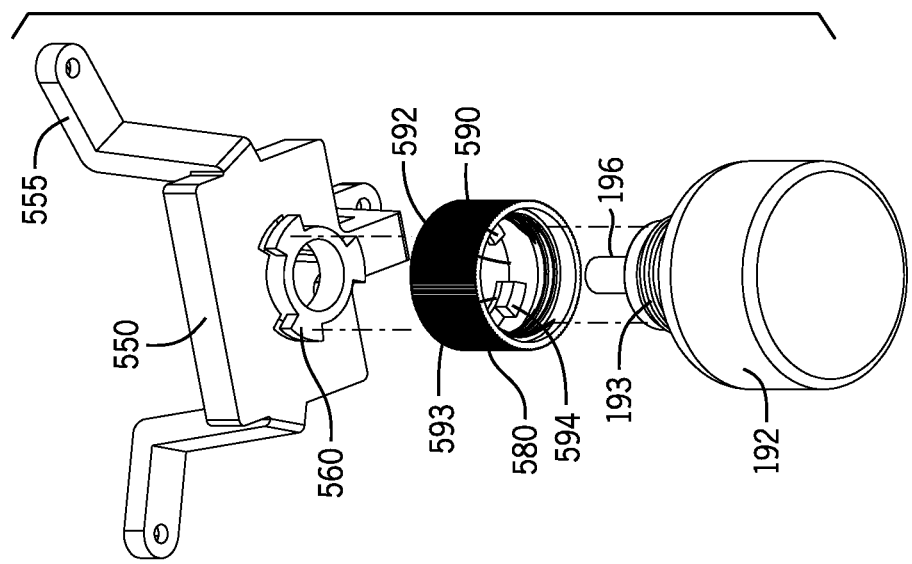
FIG. 36 depicts an assembly perspective view of the lockable evaporator support and attachment cap with reservoir of FIG. 30 in accordance with at least one embodiment of the invention.

In the instance of non-refillable systems, in some embodiments, once the reservoir 60, 192 are locked to the system 10, 100, 300, the reservoir 60, 192 cannot be refilled, and is discarded after use by detachment from the system 10, 100, 300. For example, FIG. 30 depicts a lockable evaporator support 550 and attachment cap 580 coupled to a reservoir 192 in accordance with at least one embodiment of the invention. FIGS. 33 and 36 depict assembly perspective views of the lockable evaporator support 550 and attachment cap 580 with reservoir 192 of FIG. 30 in accordance with at least one embodiment of the invention. FIG. 31 depicts a lockable evaporator support 600 and attachment cap 630 coupled to a reservoir 192 in accordance with another embodiment of the invention. Further, FIGS. 34 and 37 depict assembly perspective views of the lockable evaporator support 600 and attachment cap 630 with reservoir 192 of FIG. 31 in accordance with another embodiment of the invention.

Referring to FIG. 36, in some embodiments, the evaporator support 550 can include at least one key structure 560 capable of locking to at least one lock feature 590 within the attachment cap 580. Similarly, in some embodiments, the evaporator support 600 can include at least one key structure 610 capable of locking to at least one lock feature 640 within the attachment cap 630 (shown in FIG. 34).

In some embodiments, a reservoir 192 coupled to the attachment cap 580 can be locked to the evaporator support 550 using the at least one key structure 560 coupled with the at least one lock feature 590. As shown in FIGS. 33 and 36, in some embodiments, the at least one key structure 560 can comprise a tab extending from the evaporator support 550, and the at least one lock 590 can comprise at least one aperture 592 configured to accept the at least one key structure 560 (i.e. the at least one key structure 560 can be passed into the attachment cap 580 passing below at least one top surface 593). In some embodiments, by rotating the attachment cap 580 with respect to the evaporator support 550, the at least one key structure 560 can rotate within the attachment cap 580, and pass under the at least one top surface 593 towards at least one stop feature 594 thereby locking the attachment cap 580 to the evaporator support 550.

In some embodiments, a reservoir 192 coupled to the attachment cap 630 can be locked to the evaporator support 600 using the at least one key structure 610 coupled with the at least one lock feature 640. As shown in FIGS. 34 and 37, in some embodiments, the at least one key structure 610 can comprise a tab extending from the evaporator support 600, and the at least one lock 640 can comprise at least one aperture 642 configured to accept the at least one key structure 610 (i.e. the at least one key structure 610 can be passed into the attachment cap 630 passing below at least one top surface 643). In some embodiments, by rotating the attachment cap 630 with respect to the evaporator support 600, the at least one key structure 610 can rotate within the attachment cap 630, and pass under the at least one top surface 643 towards at least one stop feature 644 thereby locking the attachment cap 630 to the evaporator support 600.

Figure 38:
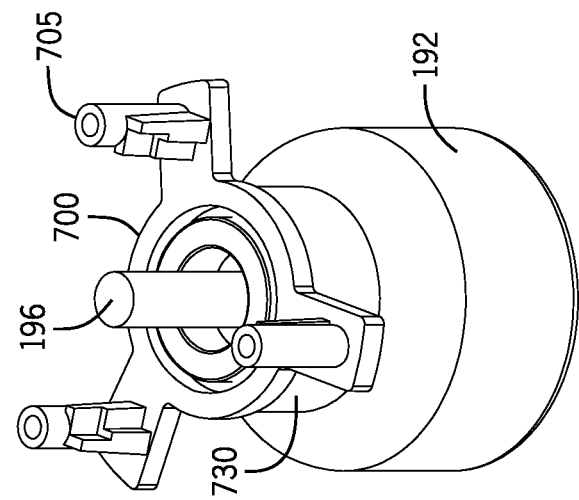
FIG. 38 depicts an evaporator support coupled to a reservoir in accordance with at least one embodiment of the invention.
Figure 41:
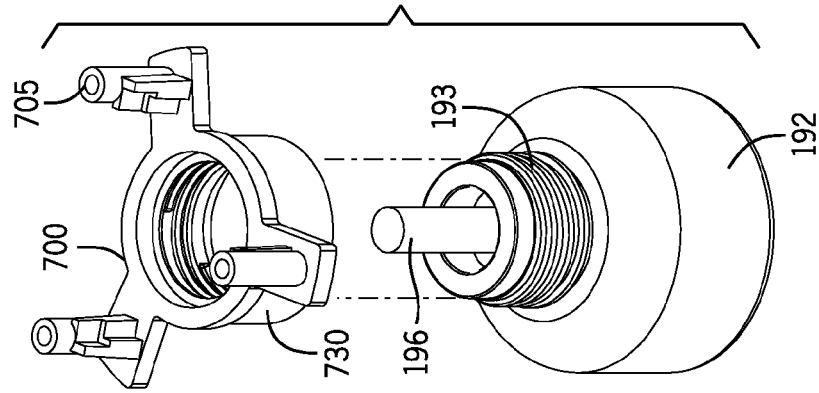
FIG. 41 depicts an assembly perspective view of the evaporator support and reservoir of FIG. 38 in accordance with at least one embodiment of the invention.
Figure 44:
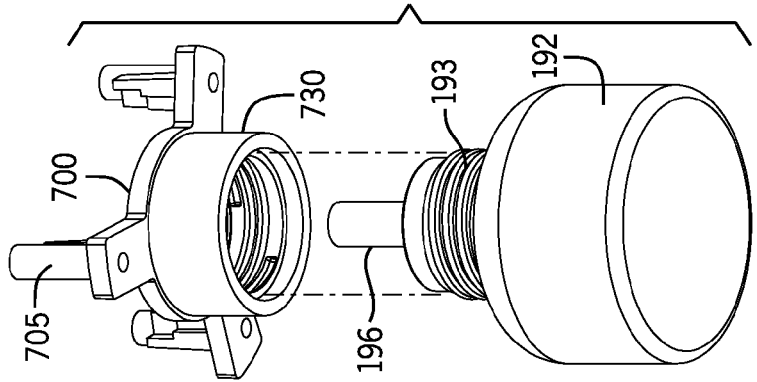
FIG. 44 depicts an assembly perspective view of the evaporator support and reservoir of FIG. 38 in accordance with at least one embodiment of the invention.

In some embodiments, the evaporator assembly 388 of system 300 can be configured to be coupled to refillable reservoirs. For example, FIG. 38 depicts an evaporator support 700 that can be used in the evaporator assembly 388 shown coupled to a reservoir 192 in accordance with at least one embodiment of the invention. Further, FIGS. 41 and 44 depict assembly perspective views of the evaporator support 700 and reservoir 192 of FIG. 38 in accordance with at least one embodiment of the invention. As illustrated, in some embodiments the evaporator support 700 can comprise at least one support member 705 (for coupling with a support assembly 382), and a coupled attachment cap 730 for coupling to the thread 193 of the reservoir 192. As shown in FIG. 38, once the reservoir 192 is coupled to the evaporator support 700, the wick 196 is positioned through the evaporator support 700 to enable it to be positioned within an evaporator assembly (such as the evaporator assembly 388 of system 300). During use, a user can at any time, decouple the reservoir 192 from the evaporator support 700. In some embodiments, a user can couple a fluid-filled reservoir 192 to the evaporator support 700, and later decouple an empty or partially full reservoir 192 from the evaporator support 700. In some embodiments, a user can refill the reservoir 192, and attach the reservoir 192 to the evaporator support 700.

Figure 40:
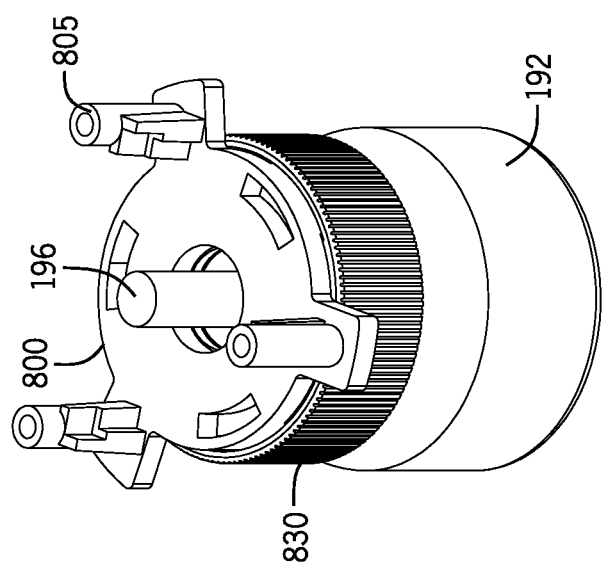
FIG. 40 depicts a lockable evaporator support and attachment cap coupled to a reservoir in accordance with at least one embodiment of the invention.
Figure 39:
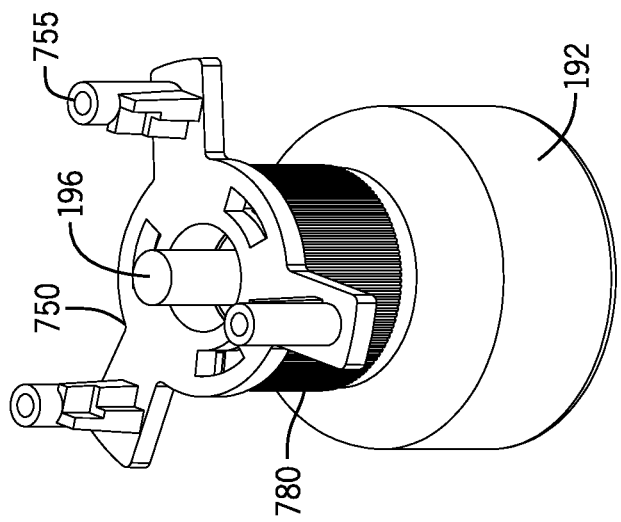
FIG. 39 depicts a lockable evaporator support and attachment cap coupled to a reservoir in accordance with at least one embodiment of the invention.
Figure 43:
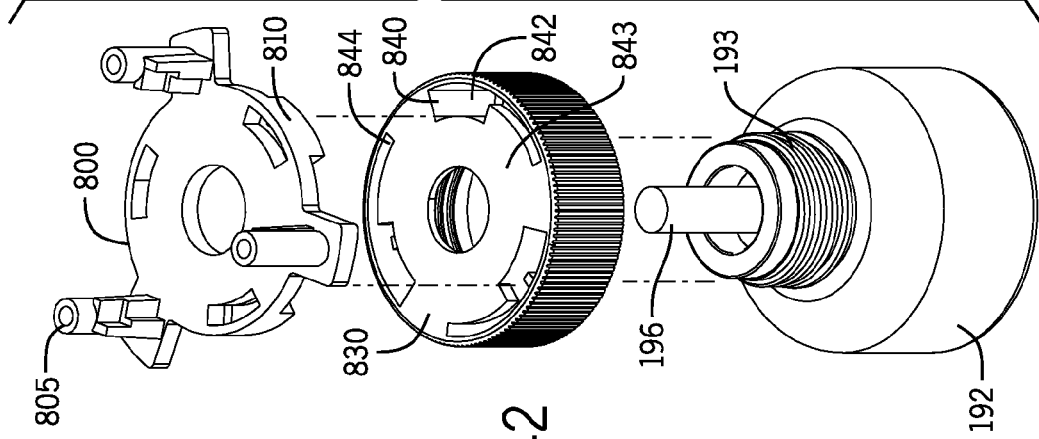
FIG. 43 depicts an assembly perspective view of the lockable evaporator support and attachment cap with reservoir of FIG. 40 in accordance with at least one embodiment of the invention.
Figure 42:
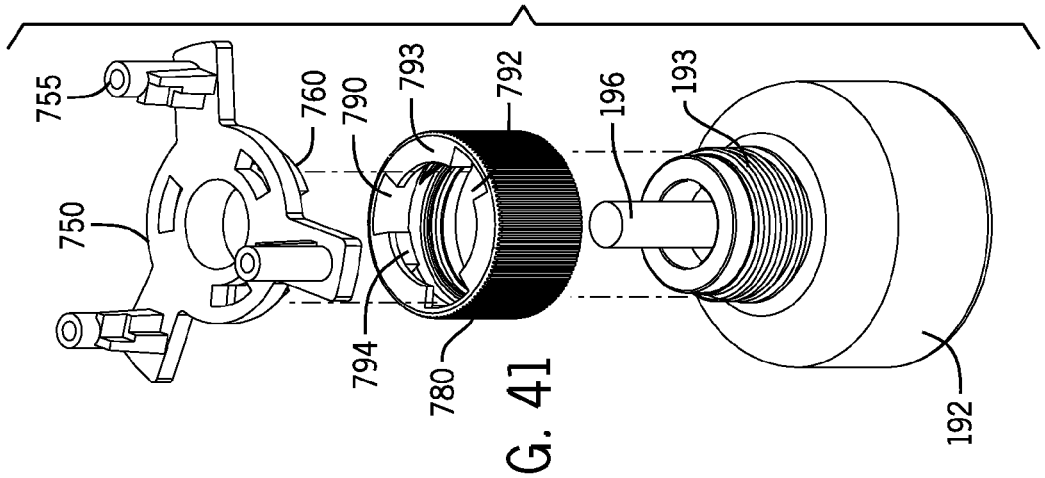
FIG. 42 depicts an assembly perspective view of the lockable evaporator support and attachment cap with reservoir of FIG. 39 in accordance with at least one embodiment of the invention.
Figure 46:
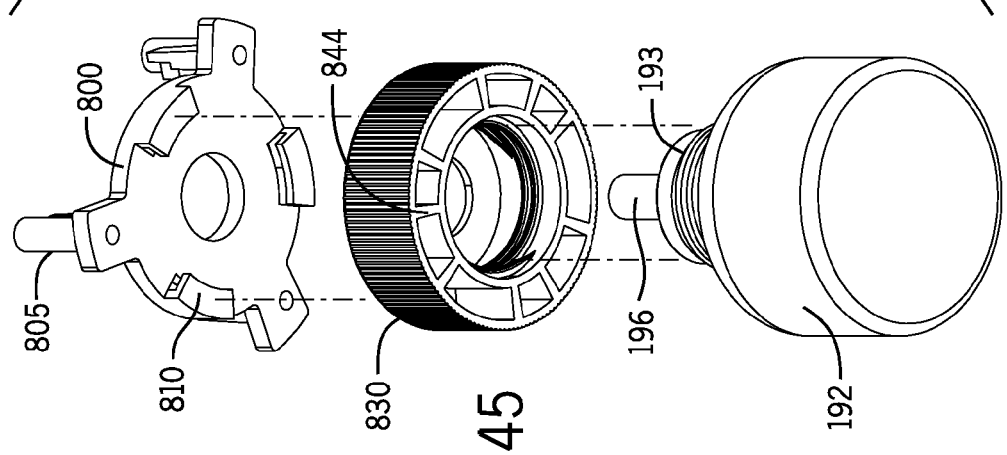
FIG. 46 depicts an assembly perspective view of the lockable evaporator support and attachment cap with reservoir of FIG. 40 in accordance with at least one embodiment of the invention.
Figure 45:
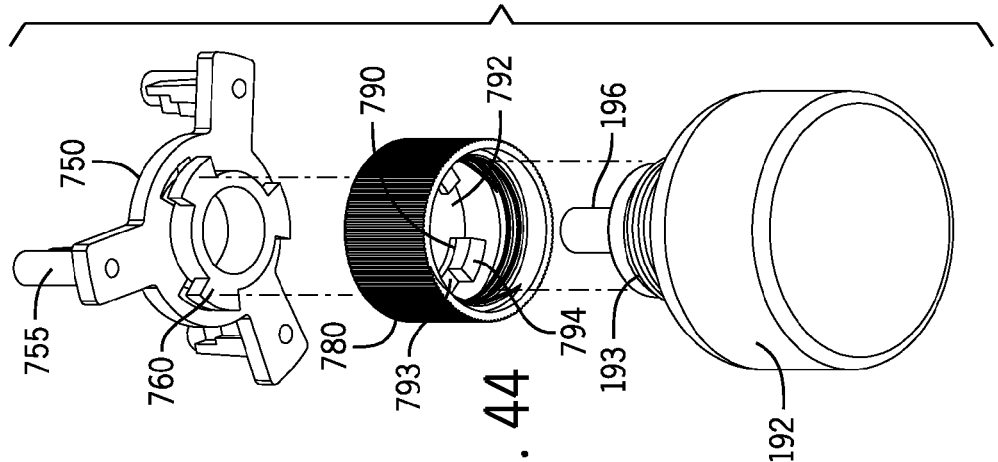
FIG. 45 depicts an assembly perspective view of the lockable evaporator support and attachment cap with reservoir of FIG. 39 in accordance with at least one embodiment of the invention.

Some embodiments of the evaporator assembly 388 of system 300 can include lockable, non-refillable reservoirs. For example, FIG. 39 depicts a lockable evaporator support 750 and attachment cap 780 that can be used in the evaporator assembly 388 shown coupled to a reservoir 192 in accordance with at least one embodiment of the invention. Further, FIGS. 42 and 45 depict assembly perspective views of the lockable evaporator support 750 and attachment cap 780 with reservoir of FIG. 39 in accordance with at least one embodiment of the invention. FIG. 40 depicts a lockable evaporator support 800 and attachment cap 830 that can be used in the evaporator assembly 388 shown coupled to a reservoir 192 in accordance with at least one embodiment of the invention. Further, FIGS. 43 and 46 depict assembly perspective views of the lockable evaporator support 800 and attachment cap 830 with reservoir 192 of FIG. 40 in accordance with at least one embodiment of the invention. In some embodiments the evaporator support 750 can comprise at least one support member 755 (for coupling with a support assembly 382), and a coupled attachment cap 780 for coupling to the thread 193 of the reservoir 192. Further, in some embodiments, the evaporator support 800 can comprise at least one support member 805 (for coupling with a support assembly 382), and a coupled attachment cap 840 for coupling to the thread 193 of the reservoir 192.

Referring to FIGS. 42 and 45, in some embodiments, the evaporator support 750 can include at least one key structure 760 capable of locking to at least one lock feature 790 within the attachment cap 780. Similarly, in some embodiments, the evaporator support 800 can include at least one key structure 810 capable of locking to at least one lock feature 840 within the attachment cap 830 (shown in FIGS. 43 and 46).

In some embodiments, a reservoir 192 coupled to the attachment cap 780 can be locked to the evaporator support 750 using the at least one key structure 760 coupled with the at least one lock feature 790. As shown in FIGS. 42 and 45, in some embodiments, the at least one key structure 760 can comprise a tab extending from the evaporator support 750, and the at least one lock 790 can comprise at least one aperture 792 configured to accept the at least one key structure 760 (i.e. the at least one key structure 760 can be passed into the attachment cap 780 passing below at least one top surface 793). In some embodiments, by rotating the attachment cap 780, the at least one key structure 760 can rotate within the attachment cap 780, and pass under the at least one top surface 793 towards at least one stop feature 794 thereby locking the attachment cap 780 to the evaporator support 750.

In some embodiments, a reservoir 192 coupled to the attachment cap 830 can be locked to the evaporator support 800 using the at least one key structure 810 coupled with the at least one lock feature 840. As shown in FIGS. 43 and 46, in some embodiments, the at least one key structure 810 can comprise a tab extending from the evaporator support 800, and the at least one lock 840 can comprise at least one aperture 842 configured to accept the at least one key structure 810 (i.e. the at least one key structure 810 can be passed into the attachment cap 830 passing below at least one top surface 843). In some embodiments, by rotating the attachment cap 830, the at least one key structure 810 can rotate within the attachment cap 830, and pass under the at least one top surface 843 towards at least one stop feature 844 thereby locking the attachment cap 830 to the evaporator support 800.

In some embodiments, the reservoir 192 can be coupled to other lockable evaporator support structures. For example, FIG. 47 illustrates a perspective view of a lockable evaporator support 900 coupled to a locking cap 1000 in accordance with at least one embodiment of the invention. Further, FIG. 48 illustrates a top view of a lockable evaporator support 900 coupled to a locking cap 1000, and FIG. 49 illustrates an exploded assembly perspective view of a lockable evaporator support 900 a locking cap 1000 in accordance with at least one embodiment of the invention. Further, FIGS. 50-53 illustrate various views of the locking cap 1000, and FIGS. 54-57 illustrate various views of the lockable evaporator support 900.

Figure 54:
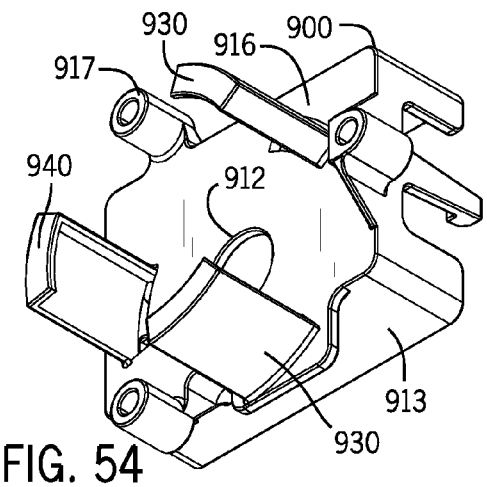
FIG. 54 illustrates a rear perspective view of a lockable evaporator support in accordance with at least one embodiment of the invention.

As shown at least in FIGS. 47, 49, and 54, some embodiments of the invention can comprise a lockable evaporator support 900 comprising a support base 916 coupled to an outer frame 913. In some embodiments, a plurality of cap supports 910 can be coupled to the support base 916. In some embodiments, the plurality of cap supports 910 can extend out from the support base 916, and can be positioned substantially perpendicular from the support base 916. In some embodiments, the plurality of cap supports 910 can comprise a first cap support 920, a second cap support 930, and a third cap support 940. Each of the cap supports 920, 930, 940 can be coupled to the support base 916, and can extend outwardly from the support base 916, and being substantially perpendicular to the support base 916. In some embodiments, the cap supports 920, 930, 940 can comprise sides 923, 933, 943 respectively. In some embodiments, the sides 923, 933, 943 can be generally curved. In some embodiments, the sides 923, 933, 943 can comprise a radius of curvature that is substantially complementary to a radius of curvature of the locking cap 1000. In this instance, a generally tubular locking cap 1000 can be positioned generally central to the sides 923, 933, 943 so that the distance between the sides 923, 933, 943 and the outer surface 1005 of the tubular locking cap 1000 is substantially the same distance.

In some embodiments, each of the sides 923, 933, 943 can support at least one flange suitable for engaging at least a portion of the locking cap 1000. For example, in some embodiments, the first cap support 920 can comprise a cap engagement side 925. Further, the second cap support 930 can comprise a cap engagement side 935, and the third cap support 940 can comprise a cap engagement side 945. In some embodiments, any one of the cap engagement sides 925, 935, 945 can be generally curved. For example, in some embodiments, any one of the cap engagement sides 925, 935, 945 can comprise a radius of curvature that is substantially complementary to a radius of curvature of the locking cap 1000.

Figure 50:
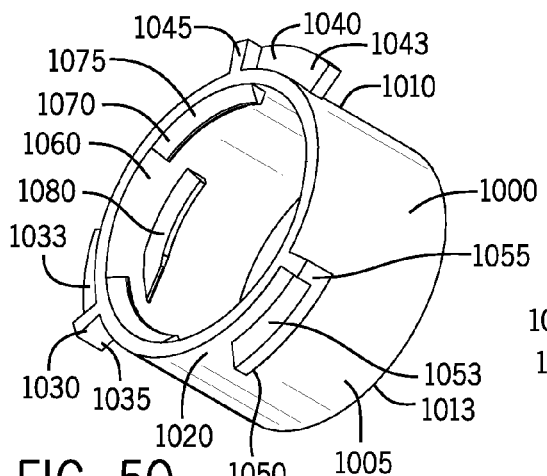
FIG. 50 illustrates a front perspective view of an attachment cap in accordance with at least one embodiment of the invention.
Figure 51:
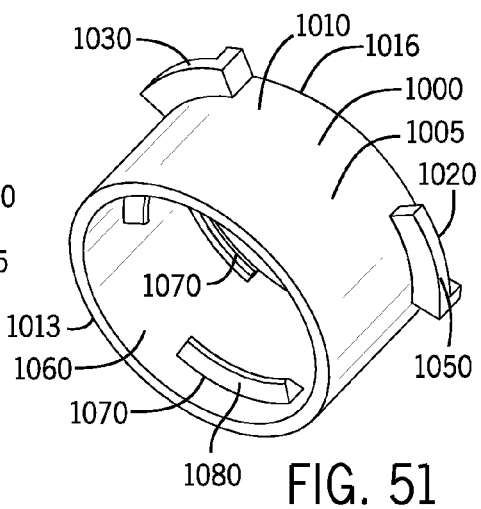
FIG. 51 illustrates a rear perspective view of an attachment cap in accordance with at least one embodiment of the invention.
Figure 52:
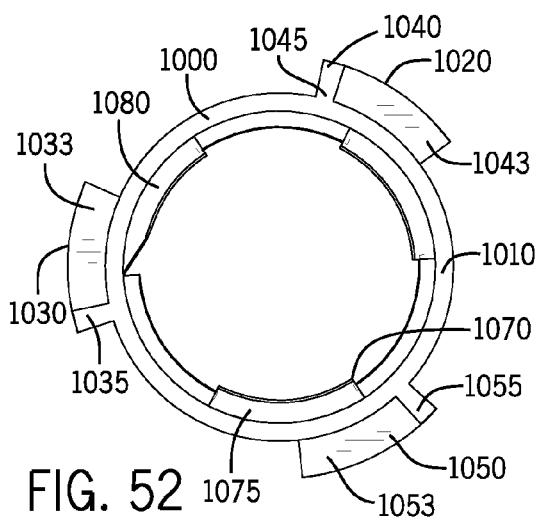
FIG. 52 illustrates a top view of an attachment cap in accordance with at least one embodiment of the invention.
Figure 53:
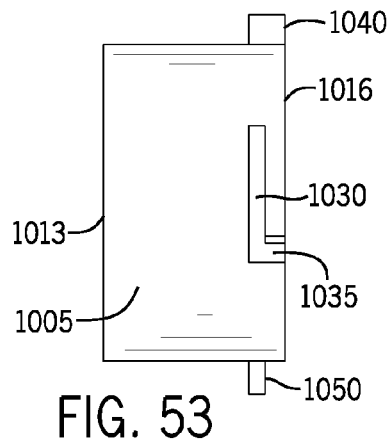
FIG. 53 illustrates a side view of an attachment cap in accordance with at least one embodiment of the invention.

FIG. 50 illustrates a front perspective view of a locking cap 1000 in accordance with at least one embodiment of the invention. FIG. 51 illustrates a rear perspective view of a locking cap 1000, FIG. 52 illustrates a top view of a locking cap 1000, and FIG. 53 illustrates a side view of a locking cap 1000 in accordance with at least one embodiment of the invention. As illustrated, in some embodiments, the locking cap 1000 can comprise a tubular main body 1010 including a first end 1013, a second end 1016, a generally curved outer surface 1005, and a generally curved inner surface 1060. In some embodiments, the locking cap 1000 can comprise a plurality of support engagement flanges 1020 coupled to and extending away from the outer surface 1005 of the tubular main body 1010 at the second end 1016. For example, in some embodiments, the plurality of support engagement flanges 1020 can comprise a first support engagement flange 1030, a second support engagement flange 1040, and a third support engagement flange 1050. Being coupled to the generally curved outer surface 1005, the support engagement flanges 1030, 1040, 1050 can be generally curved. Moreover, the support engagement flanges 1030, 1040, 1050 can comprise a radius of curvature substantially complementary to the radius of curvature of the outer surface 1005, and can circumferentially extend around at least a portion of the main body 1010. Further, in some embodiments, one or more of the support engagement flanges 1030, 1040, 1050 can be coupled to an engagement stop. For example, in some embodiments, an engagement stop 1035 can be coupled to the outer surface 1005 and to an end of the support engagement flange 1030. In some further embodiments, an engagement stop 1045 can be coupled to the outer surface 1005 and an end of the support engagement flanges 1040. In some other embodiments, an engagement stop 1055 can be coupled to the outer surface 1005 and an end of the support engagement flanges 1050.

Figure 55:
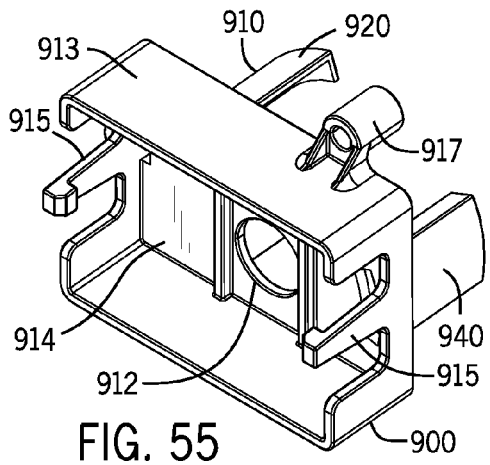
FIG. 55 illustrates a front perspective view of a lockable evaporator support in accordance with at least one embodiment of the invention.
Figure 56:
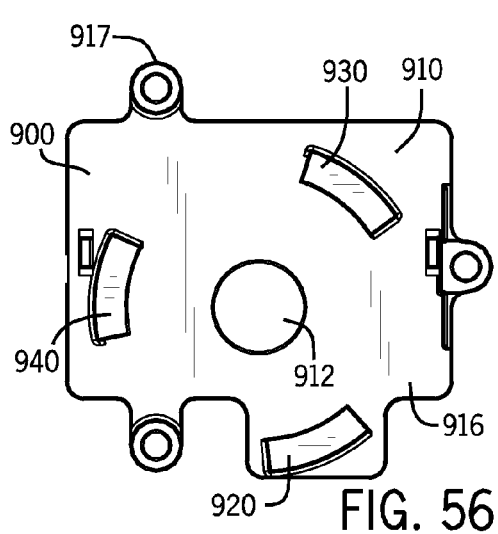
FIG. 56 illustrates a top view of a lockable evaporator support in accordance with at least one embodiment of the invention.
Figure 57:
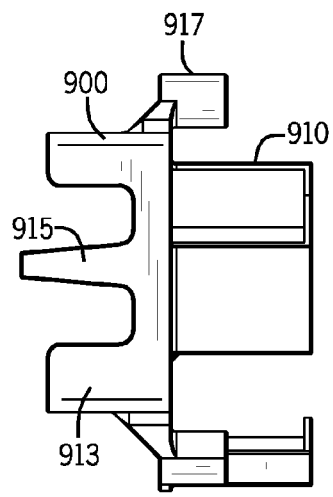
FIG. 57 illustrates a side perspective view of a lockable evaporator support in accordance with at least one embodiment of the invention.

In some embodiments, the lockable evaporator support 900 can provide support for the locking cap 1000 and a coupled a coupled reservoir (e.g., reservoir 192) to be secured into a repellent and/or illumination device (e.g., such as illumination system 100 and/or repellent system 300). For example, FIG. 55 illustrates a front perspective view of a lockable evaporator support 900, and FIG. 56 illustrates a top view of a lockable evaporator support 900, and FIG. 57 illustrates a side perspective view of a lockable evaporator support 900 in accordance with at least one embodiment of the invention. In some embodiments, the outer frame 913 of the lockable evaporator support 900 can at least partially surround a cradle 914, into which at least a portion of an evaporator system can be mounted. For example, in some embodiments, evaporator assembly 388 and/or evaporator assembly 188 can be inserted into the cradle 914 and coupled to the lockable evaporator support 900. Moreover, in some embodiments, latches 915 extending from the support base 916 can be used to couple the lockable evaporator support 900 to portions of the systems 100, 300, enclosing evaporator assembly 188 and/or evaporator assembly 388 respectively. For example, referring to FIG. 28, in some embodiments, coupling mounts 917 can be used to couple to couplers 316a and/or 316b within the repellent system 300.

Figure 58:
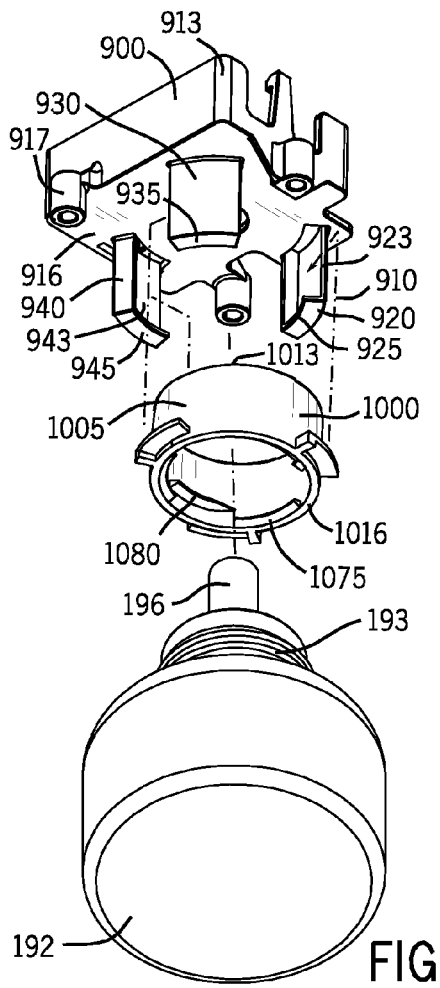
FIG. 58 illustrates an exploded assembly perspective view of a lockable evaporator support and attachment cap in accordance with at least one embodiment of the invention.
Figure 59:
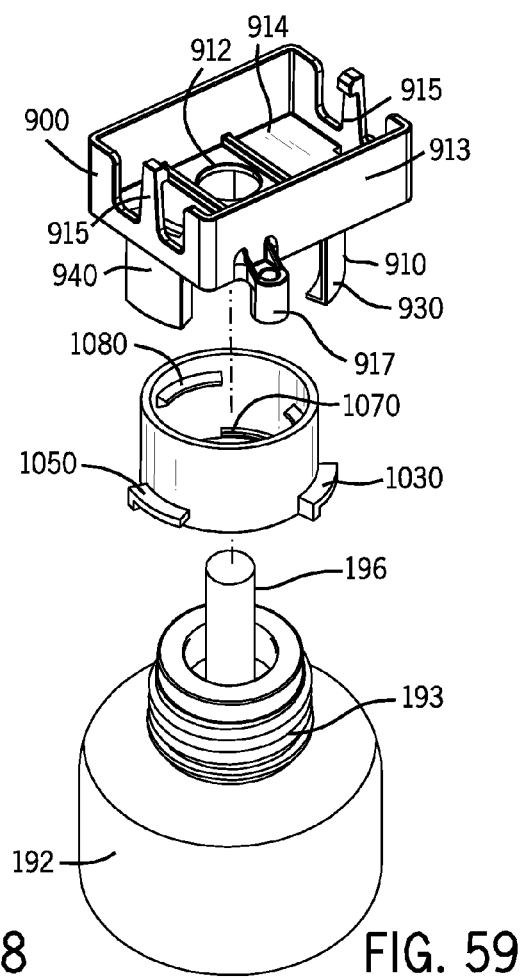
FIG. 59 illustrates an exploded assembly perspective view of a lockable evaporator support and attachment cap in accordance with at least one embodiment of the invention.

In some embodiments, the locking cap 1000 can be mounted to the lockable evaporator support 900. Accordingly, in some embodiments, the cap 1000 can provide support for the lockable evaporator support 900, and further can support a coupled fluid source (such as reservoir 192). FIG. 54 illustrates a rear perspective view of a lockable evaporator support 900, and FIG. 49 illustrates an exploded assembly perspective view of a lockable evaporator support 900 a locking cap 1000 in accordance with at least one embodiment of the invention. In some embodiments, the locking cap 1000 can be coupled to the lockable evaporator support 900. For example, FIGS. 58 and 59 illustrate an exploded assembly perspective view of a lockable evaporator support 900 and attachment cap 1000 in accordance with at least one embodiment of the invention. In some embodiments, a fluid reservoir (e.g., such as reservoir 192) can be coupled to the locking cap 1000, and coupled to the lockable evaporator support 900 to provide a source of fluid to the evaporator assembly 388, and/or evaporator assembly 188. Referring back to FIGS. 50-53, and FIGS. 58 and 59, in some embodiments, the locking cap 1000 can comprise a plurality of reservoir engagement flanges for coupling to a fluid source such as reservoir 192. For example, in some embodiments, the inner surface 1060 can comprise a plurality of reservoir engagement flanges including one or more upper flanges 1075 (adjacent to the second end 1016), and one or more lower flanges 1080 coupled to the inner surface 1060. In some embodiments, one or more upper flanges 1075, and/or one or more lower flanges 1080 can couple to a fluid source such as reservoir 192, thereby coupling the lockable evaporator support 900 to a fluid source. In some embodiments, either one or more upper flanges 1075, and/or one or more lower flanges 1080 can couple to the reservoir 192 by coupling to at least a portion of the thread 193, thereby coupling the lockable evaporator support 900 to a fluid source. In some further embodiments, the locking cap 1000 can be integral to the reservoir 192, and the reservoir 192 can couple to the lockable evaporator support 900 by coupling as described earlier for coupling the locking cap 1000 with the lockable evaporator support 900. In some other embodiments, the lockable evaporator support 900 can couple to the reservoir 192 using other conventional coupling mechanisms.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An illumination system comprising:
an outer housing including a base;
a central housing pivotably coupled to the base, the base including at least one fluid inlet;
an upper housing coupled to the central housing, the upper housing including at least one fluid outlet, and
the central housing comprising at least one side, the at least one side comprising a viewing region; and
an inner housing defining a chamber and being coupled to the base, the inner housing including a first fluid aperture substantially adjacent to the base and a second fluid aperture substantially adjacent to the upper housing and a viewing aperture;
an evaporator system being disposed within the chamber so that the evaporator system is not visible through the outer housing; and
at least one illumination device positioned substantially between the inner housing and the central housing.

2. The illumination system of claim 1, wherein the evaporator system comprises a reservoir, a wick, and an evaporator assembly.

3. The illumination system of claim 2, wherein the reservoir contains at least one of a pest repellent or a pesticide.

4. The illumination system of claim 2, wherein the evaporator assembly is coupled to the reservoir, and the wick is positioned in the evaporator assembly, the evaporator assembly configured and arranged to output thermal energy.

5. The illumination system of claim 2, wherein the evaporator assembly includes a lockable evaporator support comprising at least one key and an attachment cap, the attachment cap including at least one lock configured and arranged to engage the at least one key.

6. The illumination system of claim 5, wherein the attachment cap is configured and arranged to couple the reservoir to the evaporator assembly by rotatably engaging the at least one key with the at least one lock to render the reservoir non-refillable.

7. The illumination system of claim 2, wherein the viewing region is positioned on the at least one side positioned at least partially aligned to the viewing aperture to enable a user to at least partially view the reservoir through the viewing region and the viewing aperture.

8. The illumination system of claim 2, further comprising at least one indicator, the at least one indicator configured and arranged to provide illumination when the evaporator system is operational.

9. The illumination system of claim 1, wherein the illumination device comprises at least one of a light-emitting diode, an incandescent bulb, a compact fluorescent bulb, or a halogen bulb.

10. The illumination system of claim 1, wherein the illumination device is configured and arranged to emit a dynamic illumination event.

11. The illumination system of claim 1, where the inner housing comprises at least partially blocks light transmission.

12. The illumination system of claim 1, and further comprising a support assembly coupled to the base, the support assembly comprising a stem.

13. The illumination system of claim 1, and further comprising a fluid flow path defined by the fluid inlet, the first fluid aperture, the second fluid aperture, and the fluid outlet.

14. The illumination system of claim 13, wherein the fluid flow path passes immediately adjacent to the evaporator system and incorporates at least some fraction of a fluid from the reservoir.

15. The illumination system of claim 13, further comprising at least one hinge coupled to the base and at least one hinge coupling coupled to the central housing.

16. The illumination system of claim 15, wherein the central housing and inner housing and upper housing can be rotated away from the base using the at least one hinge coupled to the at least one hinge coupling.

17. A repellent system comprising:
a base including at least one fluid inlet,
a main housing at least partially enclosing an inner region and including an upper portion comprising at least one fluid outlet, the main housing pivotably coupled to a base with at least one hinge, the hinge including a hinge coupler extending from the main housing and coupled to the base using a hinge bolt;
at least one latch configured and arranged to secure the main housing to the base; and
an evaporator system being disposed within the inner region so that the evaporator system is not visible through the main housing.

18. The repellent system of claim 17, wherein the evaporator system comprises a reservoir, a wick, and an evaporator assembly.

19. The repellent system of claim 18, wherein the reservoir contains at least one of a pest repellent or a pesticide.

20. The repellent system of claim 18, wherein the evaporator assembly is coupled to the reservoir, and the wick is positioned in the evaporator assembly, the evaporator assembly configured and arranged to output thermal energy.

21. The repellent system of claim 18, wherein the evaporator assembly includes a lockable evaporator support comprising at least one key and an attachment cap, the attachment cap including at least one lock configured and arranged to engage the at least one key.

22. The repellent system of claim 21, wherein the attachment cap is configured and arranged to couple the reservoir to the evaporator assembly by rotatably engaging the at least one key with the at least one lock to render the reservoir non-refillable.

23. The repellent system of claim 17, where the main housing at least partially blocks light transmission to prevent a user from seeing the evaporator system.

24. The repellent system of claim 17, and further comprising a support assembly coupled to the base, the support assembly comprising a stem.

25. The repellent system of claim 17, and further comprising a fluid flow path defined by the fluid inlet, the inner region, and the fluid outlet.

26. The repellent system of claim 17, wherein the fluid flow path passes immediately adjacent to the evaporator system and incorporates at least some fraction of a fluid from the reservoir.

27. The repellent system of claim 17, wherein the at least one latch comprises a latching coupler extending from the main housing, the latching coupler configured and arranged to couple to a latch aperture extending from the base.

* * * * *